United States Patent
Bara et al.

(10) Patent No.: US 9,446,348 B2
(45) Date of Patent: Sep. 20, 2016

(54) IMIDAZOLIUM-BASED ROOM-TEMPERATURE IONIC LIQUIDS, POLYMERS, MONOMERS AND MEMBRANES INCORPORATING SAME

(71) Applicant: THE REGENTS OF THE UNIVERSITY OF COLORADO, A BODY CORPORATE, Denver, CO (US)

(72) Inventors: Jason E. Bara, Tuscaloosa, AL (US); Trevor K. Carlisle, Boulder, CO (US); Evan S. Hatakeyama, Richmond, CA (US); Douglas L. Gin, Longmont, CO (US); Richard D. Noble, Boulder, CO (US); Robert L. Kerr, Santa Ana, CA (US); Andrew L. LaFrate, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 14/590,690

(22) Filed: Jan. 6, 2015

(65) Prior Publication Data

US 2016/0175764 A1 Jun. 23, 2016

Related U.S. Application Data

(63) Continuation of application No. 13/386,780, filed as application No. PCT/US2010/043124 on Jul. 23, 2010, now Pat. No. 8,926,732.

(60) Provisional application No. 61/228,699, filed on Jul. 27, 2009, provisional application No. 61/228,433, filed on Jul. 24, 2009.

(51) Int. Cl.
*B01D 53/22* (2006.01)
*B01D 71/64* (2006.01)
(Continued)

(52) U.S. Cl.
CPC .............. *B01D 53/228* (2013.01); *B01D 69/12* (2013.01); *B01D 71/28* (2013.01); *B01D 71/44* (2013.01)

(58) Field of Classification Search
CPC B01D 53/228; B01D 67/0006; B01D 69/10; B01D 69/12; B01D 71/62; B01D 71/64; B01D 2252/30; B01D 2256/10; B01D 2256/16; B01D 2256/22; B01D 2256/245; B01D 2257/102; B01D 2257/108; B01D 2257/504; B01D 2257/7025; B01D 2323/30; B01D 2323/345; B01D 2325/16; C08G 73/0616; C08K 5/3445; C08L 79/04; C09K 19/348; C09K 19/3823; C09K 19/582; B01J 31/06; Y02C 10/10; Y02C 20/20
USPC .......... 95/44, 45, 51; 96/4, 5, 11, 12, 13, 14; 252/364; 502/4, 439
See application file for complete search history.

(56) References Cited

U.S. PATENT DOCUMENTS

| 4,720,343 A | 1/1988 | Walch et al. |
| 6,592,988 B1 | 7/2003 | Thompson et al. |

(Continued)

FOREIGN PATENT DOCUMENTS

| JP | 2002-284767 | 3/2002 |
| JP | 2007-222847 | 6/2007 |
| WO | 2011/072215 | 6/2011 |

OTHER PUBLICATIONS

LaFrate, Andrew L. et al., "High Water Vapor Flux Membranes Based on Novel Diol-Imidazolium Polymers", Ind. Eng. Chem. Res., 49, Mar. 2010, pp. 11914-11919.*

(Continued)

*Primary Examiner* — Jason M Greene
(74) *Attorney, Agent, or Firm* — Saul Ewing LLP; Kathryn Doyle; Domingos J. Silva

(57) ABSTRACT

The present invention provides gels, solutions, films, membranes, compositions, and other materials containing polymerized and/or non-polymerized room-temperature ionic liquids (RTILs). These materials are useful in catalysis, gas separation and as antistatic agents. The RTILs are preferably imidazolium-based RTILs which are optionally substituted, such as with one or more hydroxyl groups. Optionally, the materials of the present invention are composite materials comprising both polymerized and non-polymerized RTILs. The RTIL polymer is formed from polymerized RTIL cations typically synthesized as monomers and polymerized in the presence of the non-polymerized RTIL cations to provide a solid composite material. The non-polymerized RTIL cations are not covalently bound to the cationic polymer but remain as free cations within the composite material able to associate with charged subunits of the polymer. These composite materials are useful in catalysis, gas separation, and antistatic applications.

19 Claims, 12 Drawing Sheets

RTIL-based monomers used for fabrication of poly(RTIL) gas separation membranes.

(51) Int. Cl.
*C09K 3/00* (2006.01)
*B01D 69/12* (2006.01)
*B01D 71/28* (2006.01)
*B01D 71/44* (2006.01)

(56) References Cited

U.S. PATENT DOCUMENTS

| | | | |
|---|---|---|---|
| 7,125,493 | B2 | 10/2006 | Wang et al. |
| 7,316,727 | B2 | 1/2008 | Falconer et al. |
| 7,604,129 | B2 | 10/2009 | Gin et al. |
| 7,828,875 | B2 | 11/2010 | Li et al. |
| 7,931,824 | B2 | 4/2011 | Gin et al. |
| 7,943,543 | B1 | 5/2011 | Liu et al. |
| 8,302,782 | B2 | 11/2012 | Falconer et al. |
| 8,449,652 | B2 | 5/2013 | Randosz et al. |
| 8,926,732 | B2 * | 1/2015 | Bara ............ B01D 53/228 96/4 |
| 2005/0129598 | A1 | 6/2005 | Chinn et al. |
| 2006/0154328 | A1 | 7/2006 | Bruce et al. |
| 2007/0265484 | A1 | 11/2007 | Li et al. |
| 2008/0027231 | A1 | 1/2008 | Armstrong et al. |
| 2009/0171098 | A1 | 7/2009 | Bara et al. |
| 2009/0291872 | A1 | 11/2009 | Bara et al. |
| 2009/0291874 | A1 | 11/2009 | Bara et al. |
| 2011/0014100 | A1 | 1/2011 | Bara et al. |
| 2012/0006194 | A1 | 1/2012 | Falconer et al. |
| 2012/0142830 | A1 | 6/2012 | Dawkins et al. |
| 2012/0186446 | A1 | 7/2012 | Bara et al. |

OTHER PUBLICATIONS

Visser et al. (2000) "Traditional Extractants in Nontraditional Solvents: Groups 1 and 2 extraction by Crown ethers in Room-Temperature Ionic Liquids," Ind. Eng. Chem. Res. 39:3596-3604.
Welton, T. (1999) "Room-Temperature Ionic Liquids. Solvents for Synthesis and Catalysis," Chem. Rev. 99:2071-2083.
Welton, T. (2004) "Ionic Liquids in Catalysis," Coord. Chem. Rev. 248:2459-2477.
Wijmans et al. (1995) "The Solution-Diffusion Model: A Review," J. Memb. Sci. 107:1-21.
Winterton, N. (2006) "Solubilization of Polymers by Ionic Liquids," J. Mater. Chem. 16:4281-4293.
Yoshio et al. (2004) "Self-Assembly of an Ionic Liquid and a Hydroxyl-Terminated Liquid Crystal: Anisotropic Ion Conduction in Layered Nanostructures," Mol. Cryst. Liq. Cryst. 413:2235-2244 (99-108).
Yoshio et al. (2006) "One-Dimensional Ion-Conductive Polymer Films: Alignment and Fixation of Ionic Channels Formed by Self-Organization of Polymerizable Columnar Liquid Crystals," J. Am. Chem. Soc. 128:5570-5577.
Zhao et al. (2008) "Efficient Synthesis of 1,4-diazabicyclo(2.2.2)octane in Ionic Liquids," Catalysis Communications 9:1725-1727.
Anderson et al. (2005) "Structure and Properties of High Stability Geminal Dicationic Ionic Liquids," J. Am. Chem. Soc. 127:593-604.
Anderson et al. (2006) "Measurement of S02 Solubility in Ionic Liquids," J. Phys. Chem. B Letters 110:15059-15062.
Anthony et al. (2004) "Feasibility of Using Ionic Liquids for Carbon Dioxide Capture," Int. J. Environ. Technol. Manage. 4:105-115 (Abstract only).
Arnold et al. (2005) "Thermally Stable Potassium N-Heterocyclic Carbene Complexes with Alkoxide Ligands, and a Polymeric Crystal Structure with Distorted, Bridging Carbenes," C. Chem. Commun. 1743-1745.
Baker, R.W. (2002) "Future Directions of Membrane Gas Separation Technology," Ind. Eng. Chem. Res. 41:1393-1411.
Baltus et al. (2005) "Examination of the Potential of Ionic Liquids for Gas Separations," Sep. Sci. Technol. 40:525-541.

Bara et al. (2007) "Synthesis and Performance of Polymerizable Room-Temperature Ionic Liquids as Gas Separation Membranes," Ind. Eng. Chem. Res. 46:5397-5404.
Bara et al. (2007) "Influence of Nanostructure on Light Gas Separations in Cross-Linked Lyotropic Liquid Crystal Membranes," J. Memb. Sci. 288:13-19.
Bara et al. (2008) "Improving C02 Permeability in Polymerized Room-Temperature Ionic Liquid Gas Separation Membranes Through the Formation of a Solid Composite with a Room-Temperature Ionic Liquid," Polym. Adv. Technol. 19(10):1415-1420.
Bara et al. (2008) "Effect of Anion on Gas Separation Performance of Polymer-Room-Temperature Ionic Liquid Composite Membranes," Ind. Eng. Chem. Res. 47(24):9919-9924.
Bara et al. (2008) "Synthesis and Light Gas Separations in Cross-Linked Gemini Room Temperature Ionic Liquid Polymer Membranes," J. Membr. Sci. 316:186-191.
Bara et al. (2008) "Improving C02 Selectivity in Polymerized Room-Temperature Ionic Liquid Gas Separation Membranes Through Incorporation of Polar Substituents," J. Membrane Sci. 321:3-7.
Bara et al. (2010) "Room-Temperature Ionic Liquids and Composite Materials: Platform Technologies for C02 Capture," Acc. Chem. Res. 43(1):152-159.
Bellina et al. (2009) "Synthesis and Properties of Glycerylimidazolium Based Ionic Liquids: a Promising Class of Task-Specific Ionic Liquids," Green Chem 11:622-629.
Bosman et al. (2007) "Enhancing Task Specific Ionic Liquids' Thermal Stability by Structural Modification," Monatschefte fur Chemie 138:1159-1161.
Cai et al. (2007) "Synthesis and Application of an IL-Supported Diol as Protecting Group for Aldehydes," Chin. Chem. Lett. 18:1205-1208.
Cai et al. (2008) "Efficient Heck Reactions Catalyzed by a Palladium/Diol-Imidazolium Salt in Aerial Atmosphere," Catal. Commun. 9:1209-1213.
Camper et al. (2006) "Bulk-Fluid Solubility and Membrane Feasibility of Rmim-Based Room-Temperature Ionic Liquids," Ind. Eng. Chem. Res. 45:6279-6283.
Camper et al. (2008) "Room-Temperature Ionic Liquid-Amine Solutions: Tunable Solvents for Efficient and Reversible Capture of C02," Ind. Eng. Chem. Res. 47:8496-8498.
Carlise et al. (2008) "Interpretation of C02 Solubility and Selectivity in Nitrile-Functionalized Room-Temperature Ionic Liquids Using a Group Contribution Approach," Ind. Eng Chem. Res. 47:7005-7012.
Ferguson et al. (2007) "Solubility, Diffusivity, and Permeability of Gases in Phosphonium-Based Room Temperature Ionic Liquids: Data and Correlations," Ind. Eng. Chem. Res. 46:1369-1374.
Finotello et al. (2008) "Room-Temperature Ionic Liquids: Temperature Dependence of Gas Solubility Selectivity," Ind. Eng. Chem. Res. 47:3453-3459.
Freeman, B.D. (1999) "Basis of Permeability/Selectivity Tradeoff Relations in Polymeric Gas Separation Membranes," Macromolecules 32:375-380.
Freire et al. (2007) "Mutual Solubilities of Water and Hydrophobic Ionic Liquids," J. Phys. Chem. B. 111:13082-13089.
Fukuhara et al. (2010) "Photochirogenesis in Chiral Ionic Liquid: Enantiodifferentiating [4+4] Photocyclodimerization of 2-Anthracenecarboxylic Acid in (R)-1-Methyl-3-(2,3-Dihydroxypropyl)Imidazolium Bistriflimide," Chem Commun 46:3472-3474.
Gebben, J. (1996) "A Water Vapor-Permeable Membrane from Block Copolymers of Poly(Butylene Terephthalate) and Polyethylene Oxide," J Membr. Sci. 113:323-329.
Guo et al. (2007) "Impact of Fabric Moisture Transport Properties on Physiological Responses when Wearing Protective Clothing," Text. Res. J. 78(12):1057-1069.
Hernandez-Fernandez et al. (2007) "A Novel Application of Supported Liquid Membranes Based on Ionic Liquids to the Selective Simultaneous Separation of the Substrates and Products of a Transesterification Reaction," J. Membr. Sci. 293:73-80.

(56) References Cited

OTHER PUBLICATIONS

Holbrey et al. (2003) "New Ionic Liquids Containing an Appended Hydroxyl Functionality from the Atom-Efficient, One-Pot Reaction of 1-Methylimidazole and Acid with Propylene Oxide," Green Chem. 5:731-736.

Huang et al. (2003) "Water Vapor Sorption and Transport in Dense Polyimide Membranes," J. Appl. Polym. Sci. 87:2306-2317.

Huang et al. (2006) "Reversible Physical Absorption of S02 by Ionic Liquids," Chem. Commun. 38:4027-4029.

Ilconich et al. (2007) "Experimental Investigation of the Permeability and Selectivity of Supported Ionic Liquid Membranes for C02/He Separation at Temperatures up to 125°C," J. Membr. Sci. 298:41-47.

Jiang et al. (2007) "S02 Gas Separation Using Supported Ionic Liquid Membranes," J. Phys. Chem. B. Letters 111 (19):5058-5061.

Jin et al. (2006) "Polyethylene Glycol Functionalized Dicationic Ionic Liquids with Alkyl or Polyfluoroalkyl Substituents as High Temperature Lubricants," J. Mater. Chem. 16:1529-1535.

Kim et al. (2004) "Size-Selective Synthesis of Gold and Platinum Nanoparticles Using Novel Thiol-Functionalized Ionic Liquids," Langmuir 20:556-560.

Lafrate et al. (2009) "Diol-Functionalized Imidazolium-Based Room-Temperature Ionic Liquids with Bis(trifluoromethanesulfonimide) Anions that Exhibit Variable Water Miscibility," Industrial and Engineering Chemistry Research 48(19):8757-8759.

Lafrate et al. (2010) "High Water Vapor Flux Membranes Based on Novel Diol-Imidazolium Polymers," Ind. Eng. Chem. Res. 49:11914-11919.

Mukhopadhyay et al. (2008) "A Review on Designing the Waterproof Breathable Fabrics Part I: Fundamental Principles and Designing Aspects of Breathable Fabrics," J. Ind. Text. 37(3):225-262.

Nakajima et al. (2005) "Preparation of Thermally Stable Polymer Electrolytes from Imidazolium-Type Ionic Liquid Derivatives," Polymer 46:11499-11504.

Ohno, H. (2007) "Design of Ion Conductive Polymers Based on Ionic Liquids," Macromol. Symp. 249/250:551-556.

Pedersen et al. (2001) "Dry Column Vacuum Chromatography," Synthesis 16:2431-2434.

Potreck et al. (2009) "Mixed Water Vapor/Gas Transport Through the Rubbery Polymer PEBAX® 1074," J. Membr. Sci. 338:11-16.

Riisager et al. (2007) "Supported Ionic Liquid Phase Catalysts," Ionic Liquids in Synthesis (2nd ed), Wiley-VCH: Weinheim, Germany, pp. 527-558.

Robeson, L.M. (1991) "Correlation of Separation Factor Versus Permeability for Polymeric Membranes," J. Membr. Sci. 62:165-185.

Robeson, L.M. (2008) "The Upper Bound Revisited," J. Membr. Sci. 320:390-400.

Romero et al. (2009) "Water Transport in Liquid and Vapour Equilibrated Nation(TM) Membranes," J. Membrane Sci. 338:135-144.

Schaefer et al. (2005) "Opportunities for Membrane Separation Processes Using Ionic Liquids," ACS Symposium Series 902 (Ionic Liquids NIB: Fundamentals, Progress, Challenges, and Opportunities), pp. 97-110 (First page only).

Scovazzo et al. (2002) "Supported Ionic Liquid Membranes and Facilitated Ionic Liquid Membranes," ACS Symposium Series 818 (Ionic Liquids), pp. 69-87 (First page only).

Scovazzo et al. (2004) "Gas Separations Using Non-Hexafluorophosphate [PF6]-Anion Supported Ionic Liquid Membranes," J. Membr. Sci. 238:57-63.

Singh et al. (2002) "New Dense Fluroalkyl-Substituted Imidazolium Ionic Liquids," Tetrahedron Letters 43:9497-9499.

\* cited by examiner

| Mebrane | P$_{CO2}$ (Barrers) | P$_{CH4}$ (Barrers) | P$_{N2}$ (Barrers) | P$_{H2}$ (Barrers) | α$_{CO2/CH4}$ | α$_{CO2/N2}$ | α$_{CO2/H2}$ |
|---|---|---|---|---|---|---|---|
| Polymer 1 | 0.11 | n/a | n/a | 0.71 | n/a | n/a | 6.5 |
| Polymer 2 | 5.3 | 0.25 | 0.2 | 5.4 | 22 | 27 | 1 |
| Polymer 3 | 20 | 1.1 | 0.72 | n/a | 18 | 27 | n/a |

Representation of a poly(RTIL)-RTIL composite comprising polymer bound imidazolium cations (+), [Tf$_2$N] anions (-), and unbound [C$_2$mim] cations (also +).

RTIL-based monomers used for fabrication of poly(RTIL) gas separation membranes.

Structure of [C₂mim][Tf2N].

"Robeson Plot" for $CO_2/N_2$ separations in polymer membranes annotated to show performance of RTIL-based materials.

"Robeson Plot" for $CO_2/CH_4$ separations in polymer membranes annotated to show performance of RTIL-based materials.

1a -c: R = Me, Bu, Hx
1d, e: R = -((CH$_2$)$_2$O)$_n$CH$_3$ (n = 1, 2)
1f, g: R = -(CH$_2$)$_n$CN (n = 3, 5)

General structure of styrene-containing, imidazolium-based RTIL monomer.

Components of first poly(RTIL)−RTIL composite gas separation membrane.

X = Tf$_2$N, OTf, dca, SbF$_6$

Structures of monomer 1d and [C$_2$mim][X] salts used to fabricate poly(RTIL)−RTIL composite gas separation membranes in this study.

(a) "Robeson plot" for $CO_2/N_2$ annotated to include poly(RTIL)−RTIL composites from this work. (b) "Robeson plot" for $CO_2/CH_4$ annotated to include poly(RTIL)−RTIL composites from this work.

IMIDAZOLIUM-BASED ROOM-TEMPERATURE IONIC LIQUIDS, POLYMERS, MONOMERS AND MEMBRANES INCORPORATING SAME

CROSS-REFERENCE TO RELATED APPLICATIONS

The present application is a continuation of, and claims priority to, U.S. application Ser. No. 13/386,780, now issued as U.S. Pat. No. 8,926,732, which is a 35 U.S.C. §371 national phase application of, and claims priority to, PCT Application No. PCT/US2010/043124, filed Jul. 23, 2010, which claims priority under 35 U.S.C. §119(e) to U.S. Provisional Patent Applications No. 61/228,699, filed Jul. 27, 2009, and No. 61/228,433, filed Jul. 24, 2009, all of which applications are incorporated herein by reference in their entireties.

STATEMENT REGARDING FEDERALLY SPONSORED RESEARCH

This invention was made with government support under grant number W911NF-07-1-0115 awarded by the U.S. Army Research Office. The government has certain rights in the invention.

BACKGROUND OF THE INVENTION

Room-temperature ionic liquids (RTILs) are organic salts that are liquid at or below 100° C., and are composed entirely of cations and anions (i.e., free of any additional solvents) (Welton, Chem. Rev. 1999, 99: 2071-2083; and Welton, Coord. Chem. Rev. 2004, 248:2459-2477). They have attracted broad interest as novel solvents and liquid media for a number of applications because they have a unique combination of liquid properties. They have very low volatility, relatively low viscosity, high thermal stability, low flammability, high ionic conductivity, tunable polar solvation and transport properties, and in some cases, even catalytic properties. These characteristics have made RTILs excellent candidates as environmentally benign solvents to replace conventional organic solvents in many chemical, electrochemical, and physical extraction/separation processes. In addition, RTILs have been shown to be novel gas separation media in supported liquid membranes (SLMs) and novel catalysts in a number of chemical processes, with performance enhancements in both cases due to the unique properties of RTILs (Scovazzo et al. "Supported Ionic Liquid Membranes and Facilitated Ionic Liquid Membranes," ACS Symposium Series 818 (Ionic Liquids), 2002, 69-87; and Schaefer et al. "Opportunities for Membrane Separation Processes using Ionic Liquids," ACS Symposium Series 902 (Ionic Liquids IIIB: Fundamentals, Progress, Challenges, and Opportunities), 2005, 97-110).

The use of RTILs on polymer supports for membrane applications has primarily been studied for catalysis and gas separations (Riisager and Fehrmann, Ionic Liquids in Synthesis (2nd ed), Wiley-VCH: Weinheim, Germany, 2007; 527-558; Scovazzo et al., J. Membr. Sci. 2004; 238: 57-63; and Jiang et al., J. Phys. Chem. B. 2007; 111: 5058-5061). RTILs can selectively permeate one gas over another (for example, $CO_2/CH_4$, $CO_2/N_2$, and $SO_2/CH_4$) or separate products from a reaction mixture such as during a transesterification reaction (Hernandez-Fernandez et al., J. Membr. Sci. 2007; 293: 73-80). Employment of supported ionic liquid membranes (SILMs) is attractive as RTILs possess negligible vapor pressures and can be impregnated into porous supports without evaporative losses, a hindrance for traditional supported liquid membranes (SLMs). However, regardless of the nature of the liquid in the support (RTILs or others) the SLM configuration can fail if the pressure differential across the membrane is great enough to overcome the liquid-support interactions and push the liquid through the pores of the support. While there are certainly a multitude of research applications where this pressure differential is not an issue, many industrial gas separations occur at much higher pressures than SLMs can withstand, typically only a few atmospheres (Baker, Ind. Eng. Chem. Res. 2002; 41: 1393-1411). In their current forms, SILMs are a more valuable tool for evaluating gas solubility, diffusivity, and separations in RTILs rather than a viable technology for industrial membrane separations (Ferguson et al., Ind. Eng. Chem. Res. 2007; 46: 1369-1374).

However, the idea of encapsulating RTILs in polymers and polymer membranes is not without merit. RTILs may be useful as non-volatile additives for improving polymer processing and properties (Winterton, J. Mater. Chem. 2006; 16: 4281-4293). RTILs could be better stabilized in polymer gas separation membranes if the support matrix is designed to provide enhanced interactions with RTILs. A number of different supports have been used in the study of SILMs for use as gas separation membranes, yet none of these polymers truly resembles the RTILs themselves (Ilconich et al., J. Membr. Sci. 2007; 298: 41-47). While the weak interactions between the RTILs and supports allow for gas diffusion as if it were a neat liquid, this configuration will inherently have limitations to the pressure differential that can be applied. Researchers in conductive polymers and liquid crystals (LCs) have given a good deal of consideration to composite structures where free RTILs are contained within the polymer or LC matrix (Ohno, Macromol. Symp. 2007; 249/250: 551-556; Nakajima et al., Polymer 2005; 46: 11499-11504; Yoshio et al., Mol. Cryst. Liq. Cryst. 2004; 413: 2235-2244; and Yoshio et al., J. Am. Chem. Soc. 2006; 128: 5570-5577).

Research in recent years of RTILs as selective gas separation media has focused primarily on $CO_2$-based separations, with $SO_2$ removal also appearing to be a promising pursuit (Jiang et al., Phys. Chem. B 2007, 111: 5058; Huang et al., Chem. Commun. 2006, 38:4027; and Anderson et al., J. Phys. Chem. B 2006, 110: 15059). RTILs, especially those based on imidazolium cations, exhibit an affinity for $CO_2$ relative to $CH_4$ and $N_2$. $CO_2/CH_4$ separation is of critical importance to natural gas processing and improving fuel quality. $CO_2/N_2$ separation from flue gas streams ($CO_2$ capture and sequestration) is an issue currently garnering significant global attention (Bara et al., Acc. Chem. Res. 2010, 43:152-159). RTILs have been proposed as alternative "green" solvents to replace the volatile organic compounds (VOCs) typically employed in $CO_2$ scrubbing (Baltus et al., Sep. Sci. Technol. 2005, 40: 525; and Anthony et al., Int. J. Environ. Technol. Manage. 2005, 4: 105).

Several different approaches have been employed to exploit the desirable properties of RTILs for gas separation applications. Many experiments have focused on measuring the solubility of various gases of interest in RTILs at a range of pressures. The larger solubility of $CO_2$ compared to $CH_4$ and $N_2$ could perhaps be utilized to achieve separation through pressure swing absorption. $CO_2$ could be selectively absorbed into the RTIL solvent, while the less soluble gas is swept away, creating a $CO_2$-lean stream. $CO_2$ could then be desorbed from solution to produce a $CO_2$-rich stream. This type of configuration appears more viable in RTILs than in traditional VOCs, as there is little risk of volatilizing RTILs in the desorption step. An inherent drawback of such a pressure swing configuration with RTILs is that the volume of solvent required is directly proportional to the volume of gas to be processed and inversely proportional to the concentration (partial pressure) of $CO_2$ in the feed stream. As the largest solubility of $CO_2$ in some common, imidazolium-based RTILs is ca. 0.08 mol $L^{-1}$ $atm^{-1}$ (2.2 $cm^3$ (STP) $cm^{-3}$ $atm^{-1}$) at 40° C.; it becomes apparent that large volumes of RTILs would be required to process large volumes of low pressure $CO_2$ from flue gas streams.

Supported ionic liquid membranes (SILMs) have been examined as a means to process $CO_2$ in a selective RTIL medium without the need for large volumes of fluids (Scovazzo et al., J. Membr. Sci. 2004, 238: 57). SILMs can be prepared by "wetting" a porous polymer (or inorganic) support with an RTIL of interest. The volume of gas that can be processed is directly proportional to the membrane surface area and the feed pressure. Some SILMs exhibit ideal (i.e., single gas) $CO_2$ permeability approaching 1000 barrers and ideal separation factors for $CO_2/N_2$ up to 60 or higher. When viewed on a "Robeson plot", these data indicate that SILMs are highly competitive with polymer membranes and may be an industrially attractive technology for $CO_2/N_2$ separations. SILMs do not appear as viable in $CO_2/CH_4$ separations when examined on a "Robeson plot" for that separation (Camper et al., Ind. Eng. Chem. Res., 2006, 45: 6279; Robeson, L. M., J. Membr. Sci. 2008, 320: 390; and Robeson L. M., J. Membr. Sci. 1991, 62:165-185).

However, as a gas separation membrane platform, SILMs are not without their own drawbacks. In many supports, weak capillary forces hold the RTIL within the matrix. While the lack of strong RTIL-support interactions allows for high gas permeability through the liquid phase, this also negatively impacts the stability of the SILM configuration. The transmembrane pressure differentials that SILMs can withstand appear limited to a few atmospheres, before the RTIL is "squeezed" from the support. The long-term integrity of the support, especially those that are polymer-based, is also of concern.

There are several reports of imidazolium-based room temperature ionic liquids (RTILs) containing primary, secondary, and tertiary alcohol-functionalized cations (Holbrey et al., Green Chem. 2003, 5, 731-736; Camper et al., Ind. Eng. Chem. Res. 2008, 47, 8496-8498; Boesman et al., Monatschefte für Chemie 2007, 138, 1159-1161; and Arnold et al., C. Chem. Commun. 2005, 1743-1745). The primary alcohol functionality has been shown to influence the miscibility of imidazolium-based RTILs with 1° and 2° alkanolamines (Camper et al., Ind. Eng. Chem. Res. 2008, 47, 8496-8498). However, RTILs containing a vicinal diol on the cation are much less common, although they have been used as aldehyde protecting groups and ligands for Pd catalysis (Cai et al., Chin. Chem. Lett. 2007, 18, 1205-1208; and Cai et al., Catal. Commun. 2008, 9, 1209-1213). The vicinal diol-functionalized RTILs used in these studies employed the $PF_6$ anion, which has the liability of hydrolyzing and generating HF under certain conditions (Cai et al., Catal. Commun. 2008, 9, 1209-1213; and Visser et al., Ind. Eng. Chem. Res., 2000, 39, 3596-3960). Polymerizable imidazolium-based RTILs have been reported with bis(trifluoromethansulfonimide) anions and imidazolium-based cations containing a polymerizable styrene group and a n-alkyl chain, an oligo(ethylene glycol) linkage or a nitrile terminated n-alkyl chain (Bara et al., Polym. Adv. Technol., 2008, 19, 1415-1420; and Bara et al., Ind. Eng. Chem. Res., 2008, 47(24), 9919-9924).

RTIL polymers and materials of the present invention also show promise as antistatic agents and materials. An antistatic agent is a compound used for treatment of materials or their surfaces in order to reduce or eliminate buildup of static electricity. Its role is to make the surface or the material itself slightly conductive, either by being conductive itself, or by absorbing moisture from the air and relying on the conductivity of water for charge dissipation.

Electrostatic charge buildup is responsible for a variety of problems in the processing and use of many industrial products and materials (U.S. Pat. No. 6,592,988). Electrostatic charging can cause materials to stick together or to repel one another, which is particularly problematic in fiber and textile processing. In addition, static charge buildup can cause objects to attract unwanted particles such as dirt and dust. Among other things, this can decrease the effectiveness of fluorochemical repellents. Sudden electrostatic discharges from insulating objects can also be a serious problem. With photographic film, such discharges can cause fogging and the appearance of artifacts. When flammable materials are present, such as in high oxygen environments, a static electric discharge can serve as an ignition source, resulting in fires and/or explosions. Static buildup is a particular problem in the electronics industry, where electronic devices can be extremely susceptible to permanent damage by static electric discharges. Typical antistatic additives contain functional groups able to conduct electrical charges and include ethoxylated amines, fatty acids or esters, glycerol mono state, quaternary amines, and ionomers such as methacrylic acid/ethylene/NaI ionomers.

However, conventional antistatic materials have generally not been very effective in combination with fluorochemical repellents and often result in degradation of the antistatic characteristics, and undesirable erosion or interactions with the treated substrate material. For example, amines, ethoxylated amines and quaternary amines can be corrosive to polycarbonate substrates and metals on electronic components. Furthermore, it has been particularly difficult to combine conventional antistatic materials and fluorochemical repellents in polymer melt processing applications, as, for example, the water associated with humectant antistatic materials vaporizes rapidly at melt processing temperatures. This has resulted in the undesirable formation of bubbles in the polymer and has caused screw slippage in extrusion equipment. Many antistatic materials also lack the requisite thermal stability, leading to thermal degradation of the material. Thus, there remains a need in the art for antistatic agents that can be effectively combined to impart both good antistatic characteristics and are compatible to a wider range of substrates.

SUMMARY OF THE INVENTION

This invention is in the field of gels, solutions, films, membranes, compositions and other materials containing polymerized and/or non-polymerized room-temperature ionic liquids (RTILs). These materials are useful in catalysis, gas separation and as antistatic agents. Preferably, the RTILs are imidazolium-based RTILs which are optionally functionalized. In some embodiments, the materials of the present invention are composite materials comprising both polymerized and non-polymerized RTILs.

A. Compositions Using Diol-Functionalized, Imidazolium-Based RTILs

Functionalized RTILs are useful as liquid-phase reaction and transport media in a number of important application areas including catalysis, gas separations, and removal of heavy metals from water. In different aspects, the invention provides diol-functionalized imidazolium-based RTILs and polymerizable RTILs, aqueous solutions containing the RTILs of the invention, membranes and other polymeric materials formed from the RTILs of the invention and methods for making and using the RTILS of the invention.

In one aspect, the invention provides salts with a bis(trifluoromethansulfonimide) ($Tf_2N$) anion and an imidazolium-based cation. In an embodiment, the cation is a substituted imidazolium-based heterocycle with substituents at both nitrogen atoms of the five-membered ring. Substituents may also be present at one or more of the carbon atoms of the ring. In an embodiment, one of the nitrogens in the ring is attached to a group including a vicinal diol group. As referred to herein, a vicinal diol group refers to a group in which an alcohol group is bonded to each of two adjacent carbon atoms in a molecule.

In an embodiment, the salt may be described as including at least three groups ($R_1$-$R_3$) attached to the imidazolium ring. In an embodiment, group $R_1$ includes the vicinal diol group and is attached to one of the nitrogen atoms in the ring, $R_2$ is attached to the carbon between the nitrogen atoms and $R_3$ is attached the other nitrogen atom in the ring. $R_2$ may be hydrogen, while $R_1$ and $R_3$ are other than hydrogen. In an embodiment, $R_3$ is alkyl with the number of carbon atoms between 1 and 10. In different embodiments, $R_3$ may be methyl (Me), ethyl (Et), propyl (Pr), butyl (Bu), or benzyl (Bn). In different embodiments, $R_2$ may be hydrogen or methyl. Formula 1 illustrates a structure where $R_1$ is equal to $CH_2CHOHCH_2OH$.

FORMULA 1

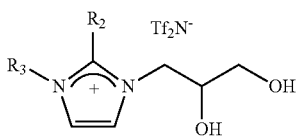

In another aspect, the invention provides a method for synthesizing the water-miscible salts. In one embodiment, the groups attached to the imidazolium ring are selected so that the salt is miscible in water. As used herein, a salt is miscible in water when it is capable of being mixed with water in all proportions without separate phases forming. In an embodiment, $R_1$ is as shown in Formula 1, with $R_2$ being hydrogen and R3 being selected from methyl or ethyl. In another embodiment, $R_2$ may be hydrogen or methyl and $R_3$ may comprise an alcohol group, an amine group, or a nitrile group. In another embodiment, $R_2$ may be hydrogen or methyl and $R_3$ may comprise carboxylic acid, sulfonic acid/sulfonate, carbohydrate, poly(ethylene glycol) (PEG), benzyl or a substituted benzyl derivative.

In another embodiment, $R_3$ may comprise a polymerizable group. In different embodiments, the polymerizable group may be a vinyl or styrene group. Formula 2 illustrates a structure of a vinyl imidazolium-based monomer ($R_2$ is hydrogen, $R_3$ is $CHCH_2$), while Formula 3 illustrates a structure of a styrene imidazolium-based monomer ($R_2$ is hydrogen, $R_3$ is $CH_2PhCHCH_2$).

FORMULA 3

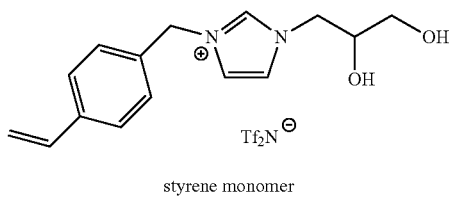

styrene monomer

FORMULA 2

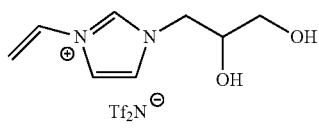

vinyl monomer

In another embodiment, the present invention provides polymers and polymer membranes comprising a plurality of diol-functionalized imidazolium repeating units, the repeating unit being described by the general formula:

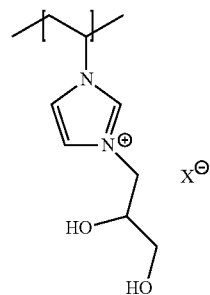

where $X^-$ is an anion selected from the group consisting of a bistrifluoromethylsulfonyl)imide ion ($Tf2N^-$), a halide ion, a hexafluorophosphate ion ($PF_6^-$), a tetrafluoroborate ion ($BF_4^-$), a dicyanamide ion ($N(CN)_2^-$), a sulfonated ion and a fluorinated sulfonated ion. In a further embodiment, $X^-$ is $Tf2N^-$. Suitable halides include, but are not limited to $Cl^-$, $Br^-$, $I^-$. Suitable sulfonates include, but are not limited to mesyalte, triflate, and tosylate. The membrane optionally further comprises repeating crosslink units and the ratio of crosslink repeating units to diol-functionalized imidazolium repeating units is greater than zero and less than or equal to 5%. In a further embodiment, the present invention provides a composite membrane comprising a porous support where the diol-functionalized imidazolium polymer is embedded within the pores of the support. In another embodiment, the porous support is a polymeric porous support, such as a polysulfone support. In an embodiment, the thickness normalized water vapor flux of the membrane is from 100 kg $m^{-2}$ $day^{-1}$ μm to 200 kg $m^{-2}$ $day^{-1}$ μm.

In another aspect, the invention provides a solution comprising water and the water-miscible imidazolium-based cation $Tf_2N$ anion salts of the invention. In an embodiment, the salts are water-miscible at room temperature. In an embodiment, the solution is homogeneous. The percentage (by volume) of the salt in the solution may be 10% to 90%, 20% to 80%, 25% to 75%, 30% to 70%, or 40% to 60%. The solution may also comprise species which can play an active part in a separation process. Such active species include but are not limited to amines including alkanolamines that are widely used for the removal of CO2, H₂S and other "acid" gases from natural gas (CH₄), flue gas from the exhaust of combustion processes, synthesis gas ("syngas" CO/H₂ mixtures) and other industrial gas mixtures. Amines may be combined with the salts with or without water in similar proportions to those described above. Other active species include inorganic salts and other RTILs.

In another aspect, the invention provides a method for synthesizing the water-miscible salts of the invention. In an embodiment, the method comprises the steps of forming a Cl⁻ salt of the desired cation and then ion exchanging the Cl⁻ salt with a Tf₂N⁻ salt in an organic solvent or water. In an embodiment, the Cl⁻ salt of the desired cation can be prepared in a neat (solvent free) reaction. Because this first step can be conducted without the use of organic solvents and without workup steps, this first step of the process can be considered an improvement over conventional reactions of this type. In an embodiment, the Cl⁻ salt of the desired cation can be prepared by stirring 1-chloro-2,3-propanediol with the corresponding imidazole reagent while heating (see Scheme 1, where R' is equivalent to $R_2$ and R is equivalent to $R_3$). In an embodiment, the Tf₂N⁻ salt used in the ion exchange step is selected to have low solubility in the organic solvent. In an embodiment, the salt is KTf₂N. In an embodiment, the organic solvent is CH₃CN. Typically, the final products will be isolated by filtering the byproducts and evaporating the solvent. The final products can be purified by dissolving in methanol and stirring with activated carbon or by column chromatography. The product is isolated by filtration and then concentrated.

In another aspect, the invention provides salts or polymerizable salts with anions other than Tf₂N. In an embodiment, the cation is as shown in Formula 2 or 3 with the anion being tetrafluoroborate BF₄⁻, dicyanamide N(CN)₂⁻, hexafluorophosphate (PF₆⁻), C(CN)₃⁻, B(CN)₄⁻, N(SO₂F)₂⁻, SbF₆⁻, Cl⁻, Br⁻, I⁻, alkyl sulfonate (R—SO₃⁻) and other sulfonates (such as mesylate, tosylate, etc). Salts with bromine anions would be made similarly to salts with chlorine anions, except that chloride is replaced with bromide on the electrophile. Other salts can be prepared by ion exchange in water or other solvents. Anion-exchange can be achieved using alkali metal or ammonium salts of these anions.

In an embodiment, any of the polymerizable salts of the invention may be polymerized into the form of a thin film. In an embodiment, the film thickness is from 50 nm to 200 micrometers. Such a poly(RTIL) film may be used as a membrane for separations.

In another embodiment, the polymerizable salts of the invention may be polymerized in the presence of a non-polymerizable RTIL to form a composite membrane. Composite membranes have been detailed in Bara et al., Polym Adv. Technol. 2008. A variety of RTILs can be employed in such membranes, including commercial ionic liquids and custom made functionalized RTILs.

B. Compositions Comprising Polymerized and Unpolymerized RTILs

Another aspect of the present invention provides compositions and composite materials, such as membranes and films, comprising RTILs in combination with non-polymerized RTILs. The polymer is formed from polymerized RTIL cations typically synthesized as monomers and polymerized in the presence of the non-polymerized RTIL cations to provide a solid composite material. The non-polymerized RTIL cations are not covalently bound to the cationic polymer but remain as free cations within the composite material able to associate with charged subunits of the polymer. The solid composite material may further contain unbound negatively charged anions which are able to associate with positive charges on the polymer or positively charged non-polymerized RTILs. These composite materials are useful in catalysis, gas separation and as antistatic materials.

Polymerized RTILs of the present invention, also referred to herein as "poly(RTIL)s", primarily comprise RTIL cations attached to a polymer backbone. The polymer backbone can be any suitable polymer backbone known in the art, including but not limited to, poly(acrylate) or poly(styrene) backbones. Polyanions such as poly(styrene sulfonic acid salts) have also been employed, along with poly(zwitterions) and copolymers. In one embodiment, two distinct polymer architectures are used to interface with non-polymerized free RTIL cations. The first architecture is a side-chain configuration (Formula 4a) and the second a main-chain or ionene configuration (Formula 4b):

FORMULA 4

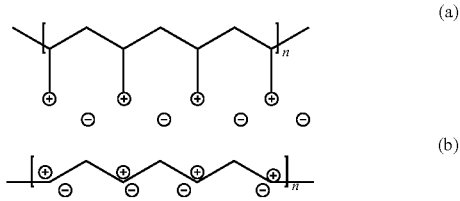

Both types of polymers shown in Formulas 4a and 4b can be utilized with imidazolium-based RTILs or other RTIL cations to form homogeneous, solid composites that do not phase separate. Composite materials comprising polymerized RTILs with unpolymerized RTIL, also referred to herein as "poly(RTIL)-RTIL", contain up to approximately 60 mol % non-polymerized RTIL cations that remain unbound to the polymer chain are readily fabricated.

Polymers of Formula 4a can be swollen with RTILs or other organic solvents before or after polymerization. When employed as a thin film, they may be used as selective membranes. There are no reports in the literature of incorporating non-polymerized RTILs within a polymerized RTIL membrane to enhance transport or capture of a gas. Optionally, the composites of the present invention further include additional transport agents and capture agents within the composite material in addition to the non-polymerized RTILs. Examples of facilitated transport agents include: Co²⁺ and complexes (especially including imidazole —Co²⁺ compounds) for O₂, amines for CO₂, Ag⁺ and complexes for olefins (i.e. ethylene, propylene, etc.). Capture agents include strong bases such as OH⁻ for CO₂, SO₂, H₂S or strong acids such as H⁺ for NH₃. These agents may or may not be designed to be tethered to an RTIL so as to enhance their compatibility with the polymer backbone.

RTIL cations useful as polymerized and non-polymerized RITL cations of the present invention include, but are not limited to, organic cations such as imidazolium, pyridinium, pyrrolidinium, ammonium, and sulfonium ions. The polymerized monomer RTIL cations may be the same or different cations as the non-polymerized RTIL cations. Preferably, the RTIL cation is an imidazolium cation. In one further embodiment, the cation is selected from group consisting of 1-alkyl-3-methylimidazolium, 1-alkylpyridinium, and N-methyl-N-alkylpyrrolidinium ions. In one example, 1-butyl-3-methylimidazolium tetrafluoroborate, or [bmim][BF$_4$], is used with an imidazole skeleton to form a colorless liquid with high viscosity at room temperature with a melting point of about −80° C.

In one embodiment, the composite material has the general formula:

FORMULA 5

RTIL$^+$ X$^-$

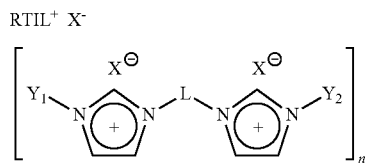

where RTIL$^+$ is a non-polymerized room-temperature ionic liquid cation, n is an integer from 2 to 10,000, X$^-$ is an anion, L is a spacer or linking group which connects two rings, and Y$_1$ and Y$_2$ are independently of each other a hydrophobic tail group attached to each ring and having 1 to 20 carbon atoms and optionally comprises a polymerizable group. Each spacer L is attached to a first nitrogen atom in each of the two linked rings. The attachment may be through a covalent or a non-covalent bond such as an ionic linkage. Each hydrophobic tail group Y is attached to the second (other, non-bridged) nitrogen atom in each ring. Hydrophobic tails may also be attached to one or more carbon atoms of the ring.

In a further embodiment, the composite material has the general formula:

FORMULA 6

RTIL$^+$ X$^-$

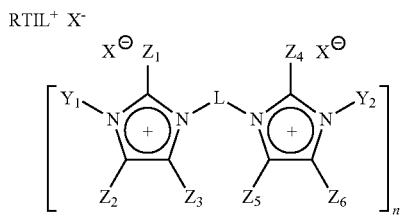

where Z$_1$ through Z$_6$ are individually selected from the group consisting of hydrogen and hydrophobic tail groups, RTIL$^+$ is a non-polymerized room-temperature ionic liquid cation, n is an integer from 2 to 10,000, X$^-$ is an anion, L is a spacer or linking group which connects two rings, and Y$_1$ and Y$_2$ are independently of each other a hydrophobic tail group attached to each ring and having 1 to 20 carbon atoms and optionally comprises a polymerizable group. In an embodiment, the hydrophobic tail group has between one and 12 carbon atoms and optionally comprises a polymerizable group. Attachment of a hydrophobic tail to one or more carbon atoms in the ring in addition to the hydrophobic tail attached to the nitrogen can be used to tune phase structure and curvature.

In one embodiment, the main chain polymer comprises imidazolium-based ionenes and composites. Formula 7 shows imidazolium-based ionenes (Formula 7a), and an imidazolium-based ionene capable of forming a gel with various solvents (Formula 7b):

FORMULA 7

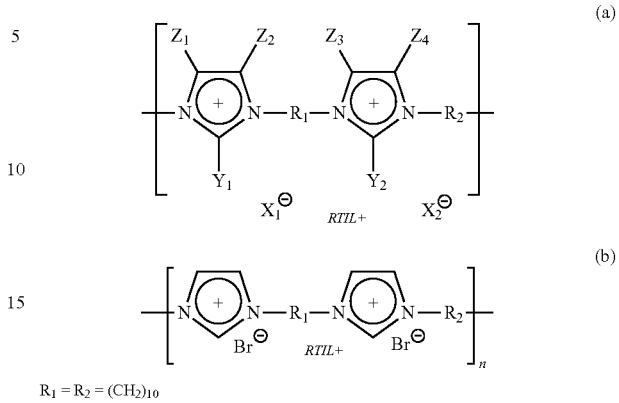

R$_1$ = R$_2$ = (CH$_2$)$_{10}$

Imidazolium based ionenes (Formula 7a) may be synthesized from bis(imidazole) compounds. These polymers are capable of forming stable composites with imidazolium-based RTILs and mixtures of RTILs with active agents. Furthermore, ionenes of Formula 7b are capable of forming a gel with water, alcohols, and other organic solvents.

Initial testing also suggests that these polymers may be useful as gas separation membranes, selective for CO$_2$ and/or H$_2$ relative to N$_2$ and CH$_4$ (see FIGS. 1-4). Additionally, these and other ionenes may be synthesized by a unique method. Typically, the polymers shown in Formula 7a are synthesized from a bis(imidazole) and a di-functional molecule (alkyl dihalide, oligo(ethylene glycol) dihalide, etc.). Unfortunately, the use of tri-functional molecules or greater can produce star polymers and/or crosslinked systems. Typically, anion-exchange would be performed after polymer growth was complete. However, if a salt containing the desired anion is insoluble in the solvent of interest (e.g., KTf$_2$N in acetonitrile) the reactants may be dissolved in solution with the bis(imidazole) and difunctional monomer (typically dihalide or ditosylate). Should the reaction produce a by-product that is insoluble in the solvent of interest (e.g. KCl in acetonitrile), a precipitate will be formed and the final polymer product will not require anion exchange. As many ionenes containing halides (and other anions) may be glassy in nature and hygroscopic and hydrophilic, anion exchange may be beneficial to promote formation of a rubbery polymer and hydrophobicity. Furthermore, this mechanism can eliminate a processing step (ion-exchange) by performing it in situ, and improve polymer synthesis conditions, as certain ionenes will precipitate prematurely from solution before large polymer chains can be produced.

Ammonium-based ionenes (as well as phosphonium and others) may also be useful to interface with RTILs. Ammonium-based ionenes are advantageous because many diamine starting materials are commercially available in large quantities. Ammonium-based ionenes are capable of forming composites with a variety of RTILs. These composites might also find use in antistatic applications, as well as in gas separation membranes and other applications mentioned herein. Synthesis of an ammonium-based ionene, followed by ion-exchange, and interfacing with imidazolium and ammonium-based RTILs is shown in Scheme 1:

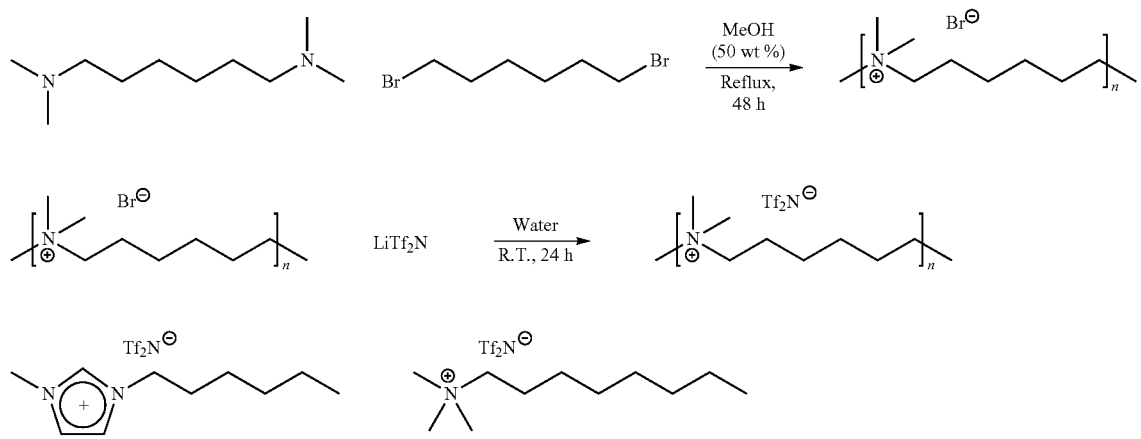

The polymerized RTIL materials disclosed above exhibit many properties desired for improved antistatic materials. The polymerized RTIL materials illustrated in Schemes 2 and 3 below can further be blended with imidazolium-based unpolymerized RTILs to form additional composite materials having desirable properties.

SCHEME 2
Step-growth main-chain poly(imidazolium)

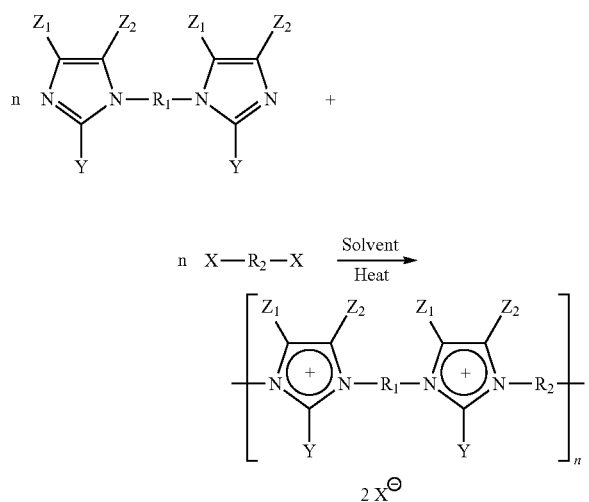

SCHEME 3
Side-chain poly(ionic liquid)

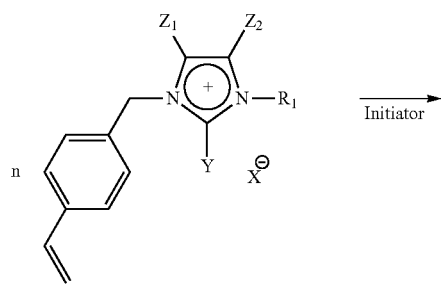

-continued

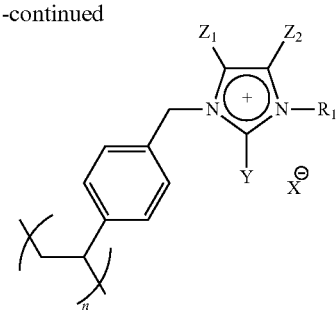

In one embodiment, the present invention provides a composition comprising a polymerized imidazolium RTIL; and an unpolymerized imidazolium RTIL where at least 5 mol % of the RTIL cations of the composite material remains unbound to the cationic polymer (i.e., are unpolymerized RTIL). In further embodiments, at least 10 mol % of the RTIL cations, at least 20 mol % of the RTIL cations, or at least 40 mol % of the RTIL cations of the composite material remains unbound to the cationic polymer. In one embodiment, between approximately 5 mol % and approximately 60 mol % of the RTIL cations of the composite material remains unbound to the cationic polymer. In further embodiments, between approximately 10 mol % and approximately 50 mol %, or between approximately 15 mol % and approximately 25 mol % of the RTIL cations of the composite material remains unbound to the cationic polymer.

In a further embodiment, the present invention provides a composition comprising:

a) a polymerized RTIL having the formula:

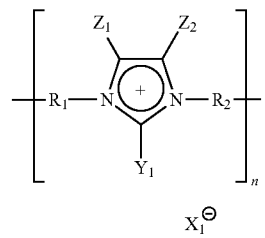

wherein, $R_1$ and $R_2$, independently of one another, are selected from the group consisting of branched and unbranched alkylene, alkenylene, alkynylene and arylene groups having 1 to 20 carbon atoms, $X_1^-$ is an anion, $Y_1$ is selected from the group consisting of hydrogen and branched and unbranched alkyl, alkenyl and alkynyl groups having 1 to 12 carbon atoms, $Z_1$ and $Z_2$, independently of one another, are selected from the group consisting of hydrogen and branched and unbranched alkyl, alkenyl and alkynyl groups having 1 to 12 carbon atoms, and n is an integer from 2 to 100,000; and b) an unpolymerized RTIL having the formula:

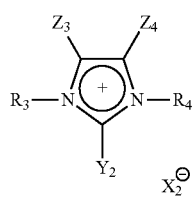

wherein, $R_3$ and $R_4$, independently of one another, are selected from the group consisting of branched and unbranched alkyl, alkenyl, alkynyl, and aryl groups having 1 to 20 carbon atoms, $X_2^-$ is an anion, $Y_2$ is selected from the group consisting of hydrogen and branched and unbranched alkyl, alkenyl, and alkynyl groups having 1 to 12 carbon atoms, $Z_3$ and $Z_4$, independently of one another, are selected from the group consisting of hydrogen and branched and unbranched alkyl, alkenyl, and alkynyl groups having 1 to 12 carbon atoms, and wherein the unpolymerized RTIL is between 5 mol % to 60 mol % of the total RTIL of the composition. In further embodiments, n is an integer from 5 to 100,000, 10 to 100,000, 100 to 100,000, or 10 to 10,000.

Preferably, $Y_1$, $Y_2$, $Z_1$, $Z_2$, $Z_3$, and $Z_4$, independently of one another, are selected from the group consisting of hydrogen and branched and unbranched alkyl groups having 1 to 4 carbon atoms. Optionally, $Y_1$ and $Y_2$ are hydrogen or methyl groups, and $Z_1$, $Z_2$, $Z_3$, and $Z_4$ are hydrogen. $X_1$ and $X_2$ may be the same or different anions.

In a further embodiment, $R_1$ and $R_2$, independently of one another, are selected from the group consisting of branched and unbranched alkylene, alkenylene, alkynylene, and arylene groups having 1 to 10 carbon atoms. Preferably, $R_1$ and $R_2$, independently of one another, are selected from the group consisting of branched and unbranched alkylene, and alkenylene groups having 1 to 10 carbon atoms. In one embodiment, $R_3$ and $R_4$, independently of one another, are selected from the group consisting of branched and unbranched alkyl, alkenyl, alkynyl, and aryl groups having 1 to 10 carbon atoms. Preferably, $R_3$, and $R_4$, independently of one another, are selected from the group consisting of branched and unbranched alkyl and alkenyl groups having 1 to 6 carbon atoms or 1 to 4 carbon atoms. Optionally, at least one of $R_3$ and $R_4$ is a methyl group. Optionally, one or more carbon atoms in at least one of $R_1$, $R_2$, $R_3$, or $R_4$ is substituted. For example, at least one of $R_1$, $R_2$, $R_3$ or $R_4$ contains one or more OH groups.

In a further embodiment, the polymerized RTIL of the composition has the formula:

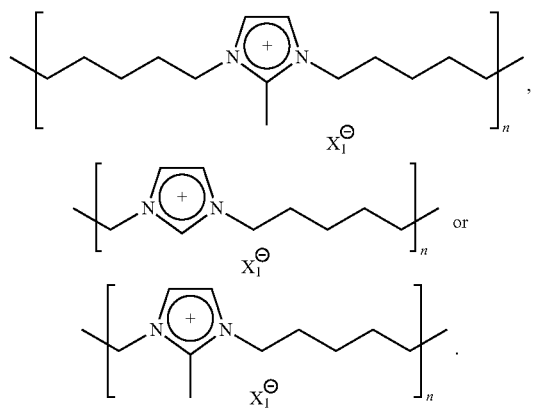

In another embodiment, the present invention provides a composition comprising:

a) a polymerized RTIL comprising a plurality of RTIL-based repeating units, the repeating unit being described by the general formula:

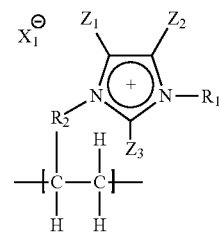

wherein, $R_1$ is selected from the group consisting of hydrogen and branched and unbranched alkyl, alkenyl, alkynyl, and aryl groups having 1 to 20 carbon atoms;

$R_2$ is selected from the group consisting of a bond, branched and unbranched alkylene, alkenylene, alkynylene, and arylene groups having 1 to 12 carbon atoms, $X_1$ is an anion, $Z_1$, $Z_2$ and $Z_3$, independently of one another, are selected from the group consisting of hydrogen and branched and unbranched alkyl, alkenyl, alkynyl, and aryl groups having 1 to 12 carbon atoms, and the number of repeating units in the RTIL polymer is from 2 to 100,000; and b) an unpolymerized RTIL having the formula:

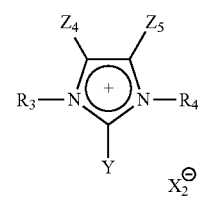

wherein, $R_3$ and $R_4$, independently of one another, are selected from the group consisting of branched and unbranched alkyl, alkenyl, alkynyl, and aryl groups having 1 to 20 carbon atoms, $X_2$ is an anion, Y is selected from the group consisting of hydrogen and branched and unbranched alkyl, alkenyl, and alkynyl groups having 1 to 12 carbon atoms, $Z_4$ and $Z_5$, independently of one another, are selected from the group consisting of hydrogen and branched and unbranched alkyl, alkenyl and alkynyl groups having 1 to 12 carbon atoms, and wherein the unpolymerized RTIL is between 5 mol % to 60 mol % of the total RTIL of the composition. In further embodiments, the number of repeating units in the RTIL polymer is from 5 to 100,000, 10 to 100,000, 100 to 100,000, or 10 to 10,000.

Preferably, Y, $Z_1$, $Z_2$, $Z_3$, $Z_4$, and $Z_5$, independently of one another, are selected from the group consisting of hydrogen and branched and unbranched alkyl groups having 1 to 4 carbon atoms. Optionally, Y is hydrogen or a methyl group, and $Z_2$, $Z_2$, $Z_3$, $Z_4$, and $Z_5$ are hydrogen. $X_1$ and $X_2$ may be the same or different anions.

In the above embodiment, the repeating units can be linked together through the main carbon chain or additionally through cross-linkers. In further embodiments where the repeating units are linked together through the main carbon chain, the polymerized RTIL has the formula:

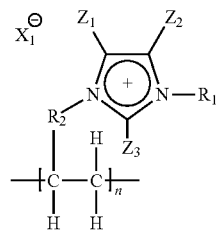

where n is an integer from 2 to 100,000, optionally from 5 to 100,000, 10 to 100,000, 100 to 100,000, or 10 to 10,000.

In a further embodiment, the polymerized RTIL has the formula:

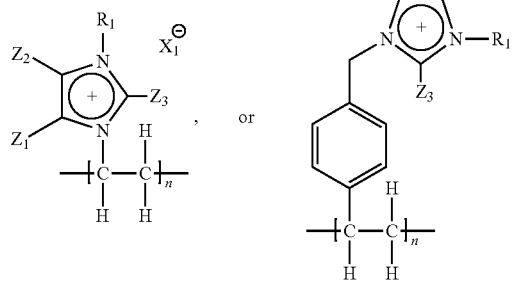

In one embodiment, $R_2$ is selected from the group consisting of a bond, branched and unbranched alkylene, alkenylene, alkynylene, and arylene groups having 1 to 8 carbon atoms. When $R_2$ is a bond, it is understood that this bond is between the carbon atom of the polymer backbone and the nitrogen atom of the imidazolium ring and that an additional atom is not present. In a further embodiment, $R_1$, $R_3$, and $R_4$, independently of one another, are selected from the group consisting of branched and unbranched alkyl, alkenyl, alkynyl and aryl groups having 1 to 10 carbon atoms. Preferably, $R_1$, $R_3$, and $R_4$, independently of one another, are selected from the group consisting of branched and unbranched alkyl and alkenyl groups having 1 to 6 carbon atoms or 1 to 4 carbon atoms. Optionally, at least one of $R_3$ and $R_4$ is a methyl group. Optionally, one or more carbon atoms in at least one of $R_1$, $R_3$, or $R_4$ is substituted. For example, at least one of $R_1$, $R_3$, or $R_4$ contains one or more hydroxyl groups.

In a further embodiment, $R_1$ has the formula:

where n is 0, 1, 3, or 5;

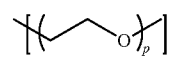

where p is 1 or 2;

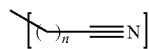

where n is 3 or 5; and

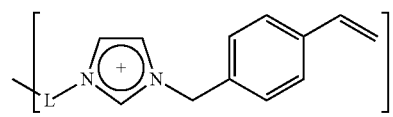

where L is an alkylene, or alkenylene group having 1 to 4 carbon atoms. In a further embodiment, $R_1$ is a diol in that it contains two hydroxyl groups. In a further embodiment, $R_1$ has the formula:

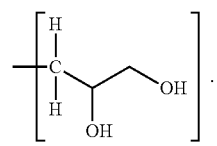

In further embodiments, the unpolymerized RTIL for these compositions has the formula:

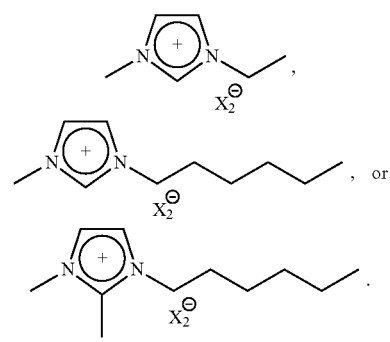

In typical embodiments, the composite material contains anions (represented by $X^-$ in the above formulas) that are not chemically bonded to the main polymer chain and are able to associate with the polymerized and non-polymerized charged RTIL cations. A wide range of anions can be employed, from simple halide anions (i.e., chloride ($Cl^-$), bromide ($Br^-$), and iodide ($I^-$) ions), which generally inflect high melting points, to inorganic anions such as tetrafluoroborate $BF_4^-$, dicyanamide $N(CN)_2^-$, hexafluorophosphate ($PF_6^-$), $C(CN)_3^-$, $B(CN)_4^-$, $N(SO_2F)_2^-$, $OTf^-$, $SbF_6^-$, and to large organic anions like bistriflimide, mesyalte, triflate or tosylate. Ionic liquids with simple non-halogenated organic anions, such as formate, alkylsulfate, alkylphosphate or glycolate, can also be used. In one embodiment, the compositions of the present invention contain bis(trifluoromethansulfonimide) ($Tf_2N^-$) as the anion.

C. Formation of Films and Membranes Comprising RTIL Compositions

The polymerized RTIL and unpolymerized RTIL compositions described herein are used to construct thin films and membranes. In one embodiment, the films and membranes are constructed using a porous support. In an embodiment, the RTIL-based material (polymerized RTIL composition or RTIL-based composite material) is embedded or located within the pores of a support. In the portions of the support containing the RTIL-based material, the RTIL-based material fills enough of the pore space of the support so that separation process is controlled by the RTIL-based material. In an embodiment, RTIL-based material is present throughout the thickness of the support, so that the thickness of the composite membrane may be taken as the thickness of the support. During fabrication of the composite membrane, the monomer mixture may be applied to only a portion of the surface of the support. The RTIL-based material may be retained within the support by mechanical interlocking of the RTIL-based material with the support.

In another embodiment, the RTIL-based material forms a layer on the surface of the support; this layer acts as a membrane. In different embodiments, the thickness of this layer is less than 10 microns, less than 5 microns, less than 2 microns, less than 1 micron, or less than 0.5 micron. Optionally, the membrane or film has a thickness of less than 500 nanometers, less than 200 nanometers, or less than 150 nanometers. In an embodiment, the polymerizable RTIL monomers may be polymerized into the form of a thin film having a thickness from 50 nm to 200 micrometers.

In a further embodiment, the membrane or film comprises a first RTIL polymer layer and an opposing second RTIL polymer layer, where the unbound anions and unpolymerized RTIL cations are between the first and second RTIL polymer layers. Each polymer layer comprises polymerized RTIL cations wherein the positively charged RTIL units of the polymer layer face inward allowing ionic interactions to form between the unbound anions, unbound RTIL cations and polymerized RTIL cations.

In an embodiment, the porous support is hydrophilic. As used herein, a hydrophilic support is wettable by water and capable of spontaneously absorbing water. The hydrophilic nature of the support can be measured by various methods known to those skilled in the art, including measurement of the contact angle of a drop of water placed on the membrane surface, the water absorbency (weight of water absorbed relative to the total weight, U.S. Pat. No. 4,720,343) and the wicking speed (U.S. Pat. No. 7,125,493). The observed macroscopic contact angle of a drop of water placed on the membrane surface may change with time. In different embodiments, the contact angle of a 2 µL drop of water placed on the support surface (measured within 30 seconds) is less than 90 degrees, from 5 degrees to 85 degrees, zero degrees to thirty degrees or is about 70 degrees. In another embodiment, the membrane is fully wetted by water and soaks all the way through the membrane after about one minute. Hydrophilic polymeric supports include supports formed of hydrophilic polymers and supports which have been modified to make them hydrophilic. In another embodiment, the support is hydrophobic.

In an embodiment, the porous support in this system is selected so that the diameter of the pores is less than about 10 microns. In different embodiments, the support is microporous or ultraporous. In different embodiments, the support has a pore size less than about 0.1 micron, from 0.1 micron to 10 microns, from 0.5 micron to 5 microns, or from 0.5 to 1 micron. The characteristic pore size of the membrane may depend on the method used to measure the pore size. Methods used in the art to determine the pore size of membranes include Scanning Electron Microscopy analysis, capillary flow porometry analysis (which gives a mean flow pore size), measurement of the bubble pressure (which gives the largest flow pore size), and porosimetry.

The porous support membrane gives physical strength to the composite structure. The support should also be thermally stable over approximately the same temperature range as the RTIL membranes to be used.

The support is selected to be compatible with the monomer solution, as well as to be compatible with the liquid or gas to be filtered. When the monomer solution and the support are compatible, the support is resistant to swelling and degradation by the monomer solution. In an embodiment, any organic solvent used in the solution and the support are selected to be compatible so that the support is substantially resistant to swelling and degradation by the organic solvent. Swelling and/or degradation of the support by the solvent can lead to changes in the pore structure of the support.

The porous support may be made of any suitable material known to those skilled in the art including polymers, metals, and ceramics. In various embodiments, the porous polymer support comprises polyethylene (including high molecular weight and ultra high molecular weight polyethylene), polytetrafluoroethylene polyacrylonitrile (PAN), polyacrylonitrile-co-polyacrylate, polyacrylonitrile-co-methylacrylate, polysulfone (PSf), Nylon 6, 6, poly(vinylidene difluoride), or polycarbonate. In an embodiment, the support may be a polyethylene support or a support of another polymer mentioned above (which may include surface treatments to affect the wettability of the support). In another embodiment, the support may be a polysulfone support, an example of which is Supor® (Pall Inc, Ann Arbor, Mich.). The support may also be an inorganic support such as a nanoporous alumina disc (Anopore, J Whatman, Ann Arbor, Mich.). The porous support may also be a composite membrane.

In an embodiment, the invention also provides methods for making membranes comprising polymerized RTILs or composites of polymerized RTILs and unpolymerized RTILs. In an embodiment, the invention provides a method for making a composite membrane comprising the steps of: providing a porous support, preparing a monomer mixture comprising a plurality of polymerizable salts of the invention, and a polymerization initiator. In an embodiment, the mixture also comprises a nonpolymerizable RTIL. In an embodiment, no cross-linking agent is used. In another embodiment, the monomer mixture may further comprise an optional cross-linking agent molecule to help promote intermolecular bonding between polymer chains. In an embodiment, the cross-linking agent is soluble in the solvents used to make the membranes and is not a polymer. In an embodiment, the cross-linking agent has less than 10 monomeric repeat units and/or has a weight less than 500 Daltons. Typically, the cross-linking agent or curing agent is a small molecule or monomeric cross linker such as divinyl benzene (DVB). Additional cross-linking agents are known to those skilled in the art, including gemini styrene and vinyl imidazolium crosslinkers (Bara et al., J. Membr. Sci. 2008; 316:186-191). In an embodiment, the maximum amount of cross-linking agent is 10 wt % to 15 wt %. In an embodiment, the amount of cross-linking agent is greater than zero and less than or equal to 10 mol % or greater than zero and less than or equal to 5 mol %.

Solvents useful in the preparation of RTIL membranes of this invention can be any solvent known in the art, including but not limited to dichloromethane, acetonitrile and methanol, that is able to dissolve the desired components. Preferably, any solvent used does not degrade or chemically change the components, or cause unwanted chemical reactions.

In an embodiment where the RTIL-based material is embedded into the support, a quantity of the monomer mixture is placed on a surface of the porous support membrane and then infused into the porous support. In one aspect of the invention, the support is impregnated with the monomer mixture using pressure to drive the monomer mixture into the pores of the support. In some instances, the monomer mixture and support may be heated to decrease the viscosity of the mixture before pressure is applied. When pressure is applied, the LLC mixture and support membrane may be sandwiched between a pair of load transfer plates (e.g., glass plates). Additionally, a pair of polymeric sheets or a hydrophobic coating on the plates may be used to facilitate release of the support mixture and membrane from the load transfer plates. Suitable dense polymeric sheets that are transparent to UV or visible light include, but are not limited to, Mylar® (a biaxially-oriented polyester film made from ethylene glycol and dimethyl teraphthalate). The monomer mixture need not completely fill the pore space of the support, but fills enough of the pore space of the support so that separation process is controlled by the pores of the RTIL-based material. In an embodiment, the monomer mixture is pushed uniformly through the entire support membrane thickness.

After impregnation of the support with the monomer mixture, the RTIL monomers are then polymerized. In an embodiment, the RTIL monomers can be photo-cross-linked by exposure to UV light in the absence of oxygen at ambient temperature. Other temperatures as known by those skilled in the art may be used during the cross-linking process. Other methods of cross-linking as known to those skilled in the art may also be used. For example, thermal cross-linking may be performed using a cationic initiator as a cross-linking agent. The degree of cross-linking can be assessed with infrared (IR) spectroscopy. In different embodiment, the degree of polymerization is greater than 90% or greater than 95%.

In other embodiments, the RTIL-based material is formed as a thin, supported top-film on top of the support. In different embodiments, the coating of the RTIL monomer mixture can be formed by solution-casting the RTIL monomer mixture to make thin films on membrane supports after evaporation of a delivery solvent; doctor-blade draw-casting; or roll-casting. It is preferred that that coating be free of surface defects such as pinholes and scratches. In one embodiment, a commercial foam painting sponge or other such applicator can be used to apply the solution to the support. In another embodiment, the solution can be applied by roller casting. The amount of material on the support can be controlled by the number of applications and the concentration of the casting solution. If desired, more than one layer of solution may be applied to the support to form multiple layers of the RTIL polymer and thereby control the film thickness. Some of the solution may penetrate into the support, with the extent of penetration depending on the nature of the solution, the support, and the application process.

In an embodiment, the membranes of the invention comprise polymerized RTIL monomers, the RTIL monomers comprising a vicinal diol group and a polymerizable group. In an embodiment, the RTIL monomers have a structure according to formula 2 or formula 3. In an embodiment, the as-synthesized monomer is purified before fabrication of the membrane. Additional purification techniques include, but are not limited to, removal of impurities with liquid-liquid extraction and stirring with activated charcoal, dry column vacuum chromatography, and combinations thereof. In an embodiment, the thickness-normalized to 1 µm water vapor flux as measured by evaporation into an environment with 1% humidity is greater than 50 $kgm^{-2}$ $day^{-1}$ from 75 to 200 $kgm^{-2}$ $day^{-1}$ µm, from 100 to 200 $kgm^{-2}$ $day^{-1}$ µm or from 75 to 150 $kgm^{-2}$ $day^{-1}$ µm. The polymerized RTIL monomer may be supported or unsupported.

D. Properties and Uses of Films and Membranes Comprising RTIL Compositions

Membranes and films comprising RTILs present a number of unique opportunities for the processing and tailoring of polymer materials for applications including ion conduction polymers, antistatic materials, catalysis, gas separations and water vapor-permeable materials. Perhaps most importantly, RTILs synthesized as monomers and polymerized in the presence of non-polymerizable RTILs provide composite materials with enhanced properties. These features allow for the formation of poly(RTIL)-RTIL composite gas separation membranes, exhibiting hybrid properties of both RTILs and polymers. For example, incorporation of just 20 mol % free RTIL in the cationic polymer membrane yields a stable composite material with a $CO_2$ permeability increase of approximately 400% with a 33% improvement to $CO_2/N_2$ selectivity relative to the analogous poly(RTIL) membrane lacking any unbound RTIL cations. The composite membranes also show a significant improvement in $CO_2/CH_4$ separation compared to other poly(RTILs) when analyzed via "Robeson Plots." This new approach to polymer gas separation membranes provides a powerful method to improve the performance of current materials without intensive organic synthesis.

For gas separation applications, important parameters are the permeability (the degree to which the membrane admits a flow of a particular gas through the membrane) and the separation selectivity provided by the membrane. For the selectivity of components i over j, $S_{i/j}$ is the permeability of component i divided by the permeability of component j. The ideal selectivity is the ratio of the permeabilitys obtained from single gas permeation experiments. The actual selectivity (also called separation selectivity) for a gas mixture may differ from the ideal selectivity. For two gas components i and j, a separation selectivity $S_{i/j}$ greater than one implies that the membrane is selectively permeable to component i. If a feedstream containing both components is applied to one side of the membrane, the permeate stream exiting the other side of the membrane will be enriched in component i and depleted in component j. The greater the separation selectivity, the greater enrichment of the permeate stream in component i.

In one embodiment, the membranes of the present invention have a carbon dioxide/methane ($CO_2/CH_4$) separation selectivity of 20 or greater, 32 or greater; 37 or greater, or 40 or greater. In other embodiments, the membranes have a carbon dioxide/methane ($CO_2/CH_4$) separation selectivity of 17-50, 24-40, or 27-38.

In one embodiment, the membranes of the present invention have a carbon dioxide/nitrogen ($CO_2/N_2$) separation selectivity of 20 or greater, 32 or greater, 40 or greater, or 44 or greater. In other embodiments, the membranes have a carbon dioxide/nitrogen ($CO_2/N_2$) separation selectivity of 19-44, 36-41, 22-41, and 22-33.

In one embodiment, the membranes of the present invention have a $CO_2$ permeability of 4 to 108 barrers. In a further embodiment, the membranes have a $CO_2$ permeability of 4 to 60 barrers, 9 to 44 barrers, 16 to 44 barrers, or 16 to 22 barrers. In other embodiments, the membranes have a $CO_2$ permeability of 9 barrers or greater, 16 barrers or greater; 40 barrers or greater. In a further embodiment, the membranes have a $CO_2$ permeability of 16 or greater, a carbon dioxide/methane ($CO_2/CH_4$) separation selectivity of 28 or greater, and a carbon dioxide/nitrogen ($CO_2/N_2$) separation selectivity of 17 or greater. In a further embodiment, the membranes have a $CO_2$ permeability of 22 or greater, a carbon dioxide/methane ($CO_2/CH_4$) separation selectivity of 32 or greater, and a carbon dioxide/nitrogen ($CO_2/N_2$) separation selectivity of 32 or greater.

In another embodiment, the present invention provides a method for separating a first gas component from a gas mixture containing at least a first and a second gas component, the method comprising the steps of: a) providing a membrane or film comprising a polymerized RTIL-unpolymerized RTIL composition as described above; the membrane or film having a feed side and a permeate side and being selectively permeable to the first gas component over the second gas component; b) applying a feed stream including the first and the second gas components to the feed side of the membrane; and c) providing a driving force sufficient for permeation of the first gas component through the membrane, thereby producing a permeate stream enriched in the first gas component from the permeate side of the membrane. Preferably the first gas component is carbon dioxide ($CO_2$) and the second gas component is methane ($CH_4$) or nitrogen ($N_2$).

In another embodiment, the composite materials of the present invention are utilized as catalysts. It has been pointed out that in many synthetic processes using transition metal catalysts, metal nanoparticles play an important role as the actual catalyst or as a catalyst reservoir. It also has been shown that ionic liquids (ILs), including RTILs, are an appealing medium for the formation and stabilization of catalytically active transition metal nanoparticles. More importantly, ILs can be made that incorporate coordinating groups, for example, with nitrile groups on either the cation or anion (CN-IL). In various C—C coupling reactions catalyzed by palladium catalyst, it has been found the palladium nanoparticles are better stabilized in CN-IL compared to non-functionalized ionic liquids; thus enhanced catalytic activity and recyclability are realized.

In another embodiment, the present invention provides membranes and films having antistatic properties or static dissipative properties. Typically antistatic materials are considered to have a surface resistivity between approximately $10^9$ and $10^{14}$ ohm/cm², while static dissipative materials have a surface resistivity between approximately $10^6$ and $10^9$ ohm/cm². Below a surface resistivity of $10^9$ ohm/cm², charge dissipation can become uncontrolled and allow flammable sources to ignite or physically damage electronic circuits and components. In some instances, however, this type of charge dissipation may be desired, for example, if the component is electrically grounded or if low resistance methods to dissipate building charges are required. Accordingly, it is desirable to provide materials having a wide range of antistatic and charge dissipative properties.

The polymerized RTIL antistatic materials of the present invention can be formed using readily available imidazole materials, linkers, tails and polymerizeable groups, and thus are relatively inexpensive to produce. Additionally, the polymerized RTIL antistatic materials can be produced using simple chemistry and environmentally friendlier starting materials than current antistatic additives. The antistatic behavior can be maximized through phase formation, and the compatibility of the polymerized RTIL and poly(RTIL)-RTIL materials can also be adjusted by changing the bridging linker between the RTIL monomers in the polymer. For example, the counterions utilized with the present antistatic materials are easily changed allowing the antistatic material to be modified according to use with specific host polymers or substrates. In one embodiment, the index of refraction of the antistatic materials can be provided to be similar to the host polymer or substrate allowing the optical-contact clarity and opacity to be fine tuned. The polymerized RTIL antistatic materials can create a leaching form as dimer, trimer, or oligomeric forms for liquid injections markets but have little to no leaching in the polymeric form. Accordingly, the polymerized RTIL antistatic materials can acquire FDA Food Contact/USP VI certifications by selecting the right anion and non-leaching characteristics as well as utilizing imidazolium as the base building block.

The poly(RTIL) and poly(RTIL)-RTIL materials have similar properties to ionomers currently used as antistatic agents, including surface resistivity greater than $10^9$ Ohms/cm². Additionally, the polymerized RTIL antistatic materials provide good heat sealing characteristics similar to ionomers. However, the materials of the present invention are non-metallic and can provide a higher loading of the antistatic component relative to currently used ionomers (approximately a maximum of 20%). Additionally, the antistatic materials of the present invention have much higher thermal stability than most low molecular weight additives, allowing for use in applications such as injection molding polycarbonates at temperatures greater than 200° C. The polymerized RTIL antistatic materials are also less likely to react to blowing agents to produce urethane and olefin foam products like currently used antistatic additives. In embodiments utilizing imidazolium as the polymerized and non-polymerized RTIL cation, the material should prove to be much less corrosive than current antistatic additives.

In one embodiment, the present invention provides a membrane or film comprising a polymerized RTIL-unpolymerized RTIL composition as described above where the membrane or film has a surface resistivity of $1.0 \times 10^9$ ohm/cm² or greater, or $4.0 \times 10^9$ ohm/cm² or greater at a 10 or 100 volt potential. In a further embodiment, the membrane or film has a surface resistivity of $4.9 \times 10^9$ ohm/cm² or greater at a 10 volt potential, and/or a surface resistivity of $4.2 \times 10^9$ ohm/cm² or greater at a 100 volt potential.

DETAILED DESCRIPTION OF THE INVENTION

Definitions

Figure 1:
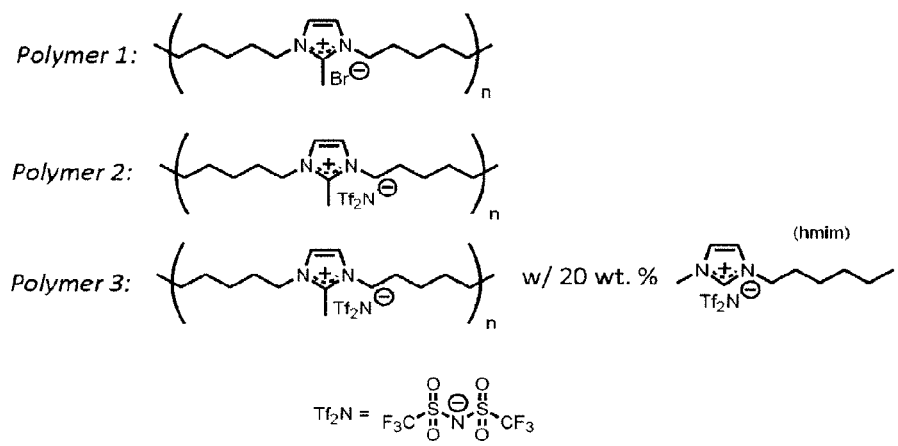
FIG. 1 shows the gas permeabilities and selectivities for three RTIL polymers. Polymer 1 and Polymer 2 are the same except for the anion ($BR^-$ and $Tf_2N^-$, respectively). Polymer 3 is the same as Polymer 2 except that Polymer 3 further comprises 20 mol % of a non-polymerized RTIL (hmim).

As used herein, the term "alkyl" refers to a monoradical of a branched or unbranched (straight-chain or linear) saturated hydrocarbon and to cycloalkyl groups having one or more rings. Alkyl groups as used herein include those having from 1 to 20 carbon atoms, preferably having from 1 to 10 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-20 carbon atoms. Cyclic alkyl groups include those having one or more rings. Cyclic alkyl groups include those having a 3-, 4-, 5-, 6-, 7-, 8-, 9- or 10-member carbon ring and particularly those having a 3-, 4-, 5-, 6-, or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include hydroxyl groups, diol groups, and alkoxy groups. An alkoxy group is an alkyl group linked to oxygen and can be represented by the formula R—O. Examples of alkoxy groups include, but are not limited to, methoxy, ethoxy, propoxy, butoxy, and heptoxy. Alkoxy groups include substituted alkoxy groups wherein the alky portion of the groups is substituted as provided herein in connection with the description of alkyl groups.

The term "alkenyl" refers to a monoradical of a branched or unbranched unsaturated hydrocarbon group having one or more double bonds and to cycloalkenyl groups having one or more rings wherein at least one ring contains a double bond. Alkenyl groups include those having 1, 2 or more double bonds and those in which two or more of the double bonds are conjugated double bonds. Alkenyl groups include those having from 1 to 20 carbon atoms, preferably having from 1 to 10 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cyclic alkenyl groups include those having one or more rings. Cyclic alkenyl groups include those in which a double bond is in the ring or in an alkenyl group attached to a ring. Cyclic alkenyl groups include those having a 3-, 4-, 5-, 6-, 7-, 8-, 9- or 10-member carbon ring and particularly those having a 3-, 4-, 5-, 6- or 7-member ring. The carbon rings in cyclic alkenyl groups can also carry alkyl groups. Cyclic alkenyl groups can include bicyclic and tricyclic alkyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cyclo-prop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms.

The term "alkynyl" refers to a monoradical of an unsaturated hydrocarbon having one or more triple bonds (C≡C) and to cycloalkynyl groups having one or more rings wherein at least one ring contains a triple bond. Alkynyl groups include those having from 2 to 20 carbon atoms, preferably having from 2 to 10 carbon atoms. Alkynyl groups include small alkynyl groups having 2 to 3 carbon atoms. Alkynyl groups include medium length alkynyl groups having from 4-10 carbon atoms. Alkynyl groups include long alkynyl groups having more than 10 carbon atoms, particularly those having 10-20 carbon atoms. The term "cycloalkynyl" refers to cyclic alkynyl groups of from 3 to 20 carbon atoms having a single cyclic ring or multiple condensed rings in which at least one ring contains a triple bond (C≡C). Descriptions herein with respect to alkynyl groups apply generally to cycloalkynyl groups. Alkynyl groups are optionally substituted. Substituted alkynyl groups include among others those which are substituted with alkyl, alkenyl or aryl groups, which groups in turn can be optionally substituted. Substituted alkynyl groups include fully halogenated or semi-halogenated alkynyl groups, such as alkynyl groups having one or more hydrogens replaced with one or more fluorine atoms, chlorine atoms, bromine atoms and/or iodine atoms.

The term "aryl" refers to a chemical group having one or more 5-, 6- or 7-member aromatic or heterocyclic aromatic rings. An aromatic hydrocarbon is a hydrocarbon with a conjugated cyclic molecular structure. Aryl groups include those having from 6 to 20 carbon atoms. Aryl groups can contain a single ring (e.g., phenyl), one or more rings (e.g., biphenyl) or multiple condensed (fused) rings, wherein at least one ring is aromatic (e.g., naphthyl, dihydrophenanthrenyl, fluorenyl, or anthryl). Heterocyclic aromatic rings can include one or more N, O, or S atoms in the ring. Heterocyclic aromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms.

Optional substituents for alkyl, alkenyl and aryl groups include among others:

—COOR where R is a hydrogen or an alkyl group or an aryl group and more specifically where R is methyl, ethyl, propyl, butyl, or phenyl groups all of which are optionally substituted;

—COR where R is a hydrogen, or an alkyl group or an aryl groups and more where R is methyl, ethyl, propyl, butyl, or phenyl groups all of which groups are optionally substituted;

—CR(OH)$_2$ where R is a branched alkyl group;

—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—N(R)$_2$ where each R, independently of each other R, is an alkyl group, acyl group or an aryl group and more specifically where R is methyl, ethyl, propyl, butyl, or phenyl or acetyl groups all of which are optionally substituted; or R and R can form a ring which may contain one or more double bonds.

—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;

—OCOOR where R is an alkyl group or an aryl groups;

—SO$_2$N(R)$_2$ where R is a hydrogen, an alkyl group, or an aryl group and R and R can form a ring.

As used herein, the term "alkylene" refers to a divalent radical derived from an alkyl group or as defined herein. Alkylene groups in some embodiments function as attaching and/or spacer groups in the present compositions. Compounds of the present invention include substituted and unsubstituted $C_1$-$C_{20}$ alkylene, $C_1$-$C_{10}$ alkylene and $C_1$-$C_4$ alkylene groups. The term "alkylene" includes cycloalkylene and non-cyclic alkylene groups. As used herein, the term "cycloalkylene" refers to a divalent radical derived from a cycloalkyl group as defined herein.

As used herein, the term "alkenylene" refers to a divalent radical derived from an alkenyl group as defined herein. Alkenylene groups in some embodiments function as attaching and/or spacer groups in the present compositions. Compounds of the present invention include substituted and unsubstituted $C_1$-$C_{20}$ alkenylene, $C_1$-$C_{10}$ alkenylene and $C_1$-$C_5$ alkenylene groups. The term "alkenylene" includes cycloalkenylene and non-cyclic alkenylene groups. As used herein, the term "cylcoalkenylene" refers to a divalent radical derived from a cylcoalkenyl group as defined herein. Cycloalkenylene groups in some embodiments function as attaching and/or spacer groups in the present compositions.

As used herein, the term "alkynylene" refers to a divalent radical derived from an alkynyl group as defined herein. Alkynylene groups in some embodiments function as attaching and/or spacer groups in the present compositions. Compounds of the present invention include substituted and unsubstituted $C_2$-$C_{20}$ alkynylene, $C_2$-$C_{10}$ alkynylene and $C_2$-$C_5$ alkynylene groups. The term "alkynylene" includes cycloalkynylene and non-cyclic alkynylene groups.

As used herein, the term "arylene" refers to a divalent radical derived from an aryl group as defined herein. Arylene groups in some embodiments function as attaching and/or spacer groups in the present compositions. Compounds of the present invention include substituted and unsubstituted $C_2$-$C_{20}$ arylene, $C_2$-$C_{10}$ arylene and $C_2$-$C_5$ arylene groups.

As used herein, a "polymerized RTIL" refers to a polymer comprising multiple repeating units having RTIL cations and any associated anions. The polymerized RTIL can be formed by polymerizing RTIL monomers which have one or more polymerizable groups which allow covalent bonding of the monomer to another molecule such as another monomer, polymer or cross-linking agent. Suitable polymerizable groups include acrylate, methacrylate, diene, vinyl, (halovinyl), styrenes, vinylether, hydroxy groups, epoxy or other oxiranes (halooxirane), dienoyls, diacetylenes, styrenes, terminal olefins, isocyanides, acrylamides, and cinamoyl groups. The RTIL polymer may also comprise an initiator and/or a cross-linking agent.

Polymerized RTILs, Gas Permeability and Selectivity

Polymerized RTILs, also referred to herein as "poly (RTILs)", have been studied as neat materials for ion conduction, gas sorption, and gas separation membranes. These polymers have largely consisted of poly(acrylate) or poly (styrene) backbones with imidazolium or ammonium cations tethered as side chains. (Ohno, Macromol. Symp. 2007;

249/250: 551-556; Nakajima et al., Polymer 2005; 46: 11499-11504; Yoshio et al., Mol. Cryst. Liq. Cryst. 2004; 413: 2235-2244). In this configuration, the anion is not chemically bonded to the main polymer chain. Polyanions such as poly(styrene sulfonic acid salts) have also been employed, along with poly-(zwitterions) and copolymers. The most successful support matrices to incorporate RTILs within a solid material have featured polymer-bound, immobilized imidazolium cations and/or hydrogen bond donors such as primary alcohols. The present invention provides a number of RTIL polymers that are capable of interfacing with non-polymerized RTILs that remain unbound from the polymer. Additionally, active agents, such as metal complexes, acids or bases, can be added with the non-polymerized RTIL, creating an active material. Uses of these poly(RTIL)-RTIL composites may include antistatic materials, gas separation membranes, and gels.

Figure 6:
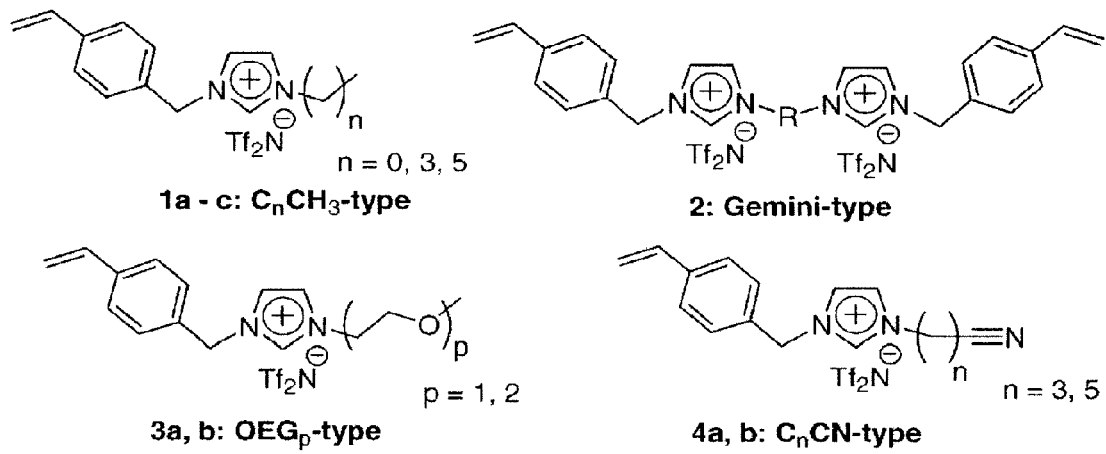
FIG. 6 shows RTIL-based monomers used for fabrication of poly(RTIL) and poly(RTIL)-RTIL gas separation membranes in some embodiments of the present invention.
Figure 10:
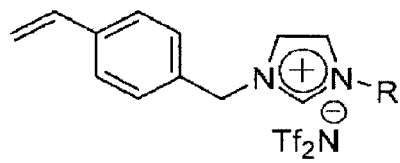
FIG. 10 shows the general structure of a styrene-containing, imidazolium-based RTIL monomer used to make poly(RTIL)-RTIL composite membranes.

The effects of structure on permeability and $CO_2/N_2$ and $CO_2/CH_4$ separation performance in solid, poly(RTIL) gas separation membranes has been studied using a variety of functionalized RTIL monomers containing alkyl, oligo(ethylene) glycol, and nitrile-terminated alkyl groups, as well as self-crosslinking "gemini" RTIL (GRTIL) monomers (Bara et al., Ind. Eng. Chem. Res. 2007; 46: 5397-5404; Bara et al., J. Memb. Sci. 2008; 316: 186-191; Bara et al., J. Memb. Sci. 2007; doi:10.1016/j.memsci.2007.12.033). A representation of the various RTIL monomers used to form poly(RTIL) membranes of the present invention is shown in FIGS. 1, 6 and 10.

FIG. 1 shows the gas permeabilities and selectivities for three RTIL polymers. The RTIL monomer is the same for each polymer:

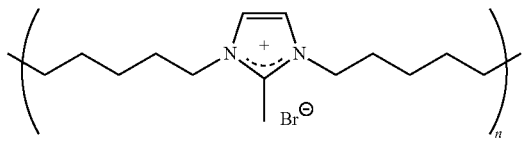

However, the associated anion is different between Polymer 1 and Polymer 2 (Br⁻ and $Tf_2N^-$, respectively). Polymer 3 uses the same anion ($Tf_2N^-$) as Polymer 2 but further comprises 20 mol % of a non-polymerized RTIL (hmim):

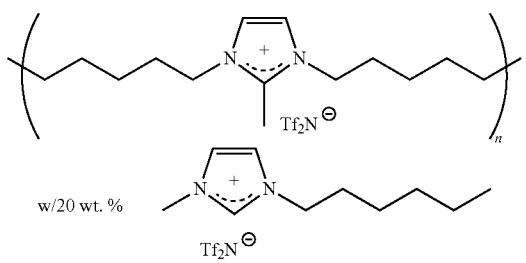

The results in FIG. 1 indicate that changing the anion of the composite can be used to adjust the gas permeability and selectivity. Additionally, the presence of the non-polymerized RTIL can be used to enhance the gas permeability and/or the gas pair selectivity.

Figure 2:
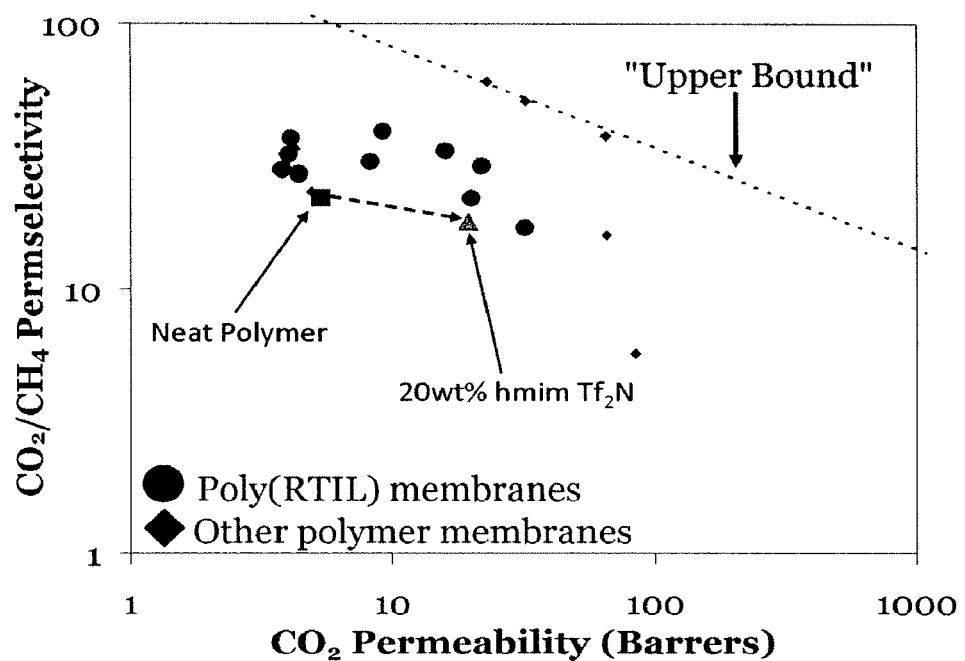
FIG. 2 shows a "Robeson Plot" for $CO_2/CH_4$ separations using the poly(RTIL) and poly(RTIL)-RTIL materials of FIG. 1.
Figure 3:
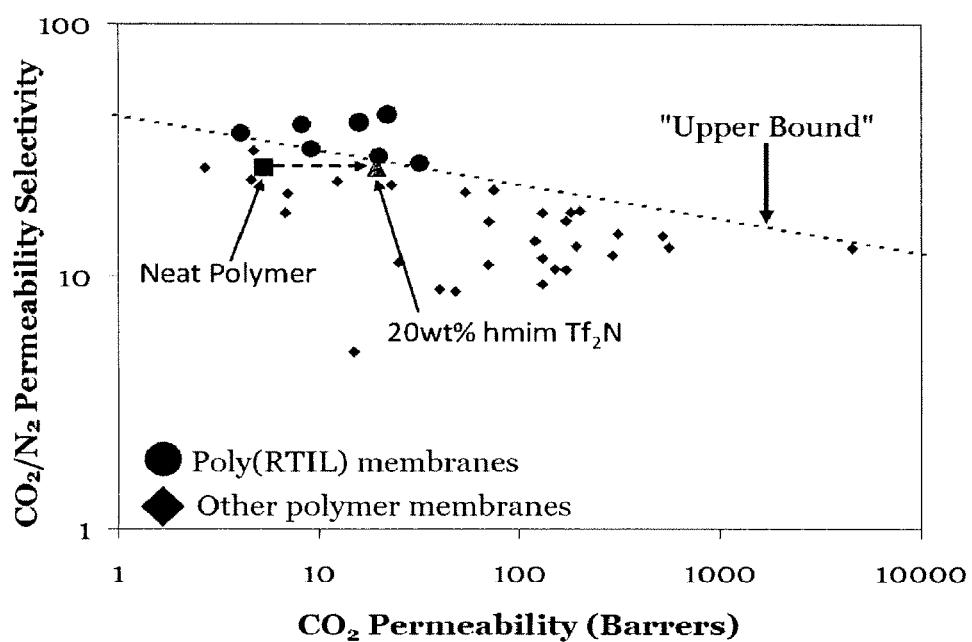
FIG. 3 shows a "Robeson Plot" for $CO_2/N_2$ separations using the poly(RTIL) and poly(RTIL)-RTIL materials of FIG. 1.
Figure 4:
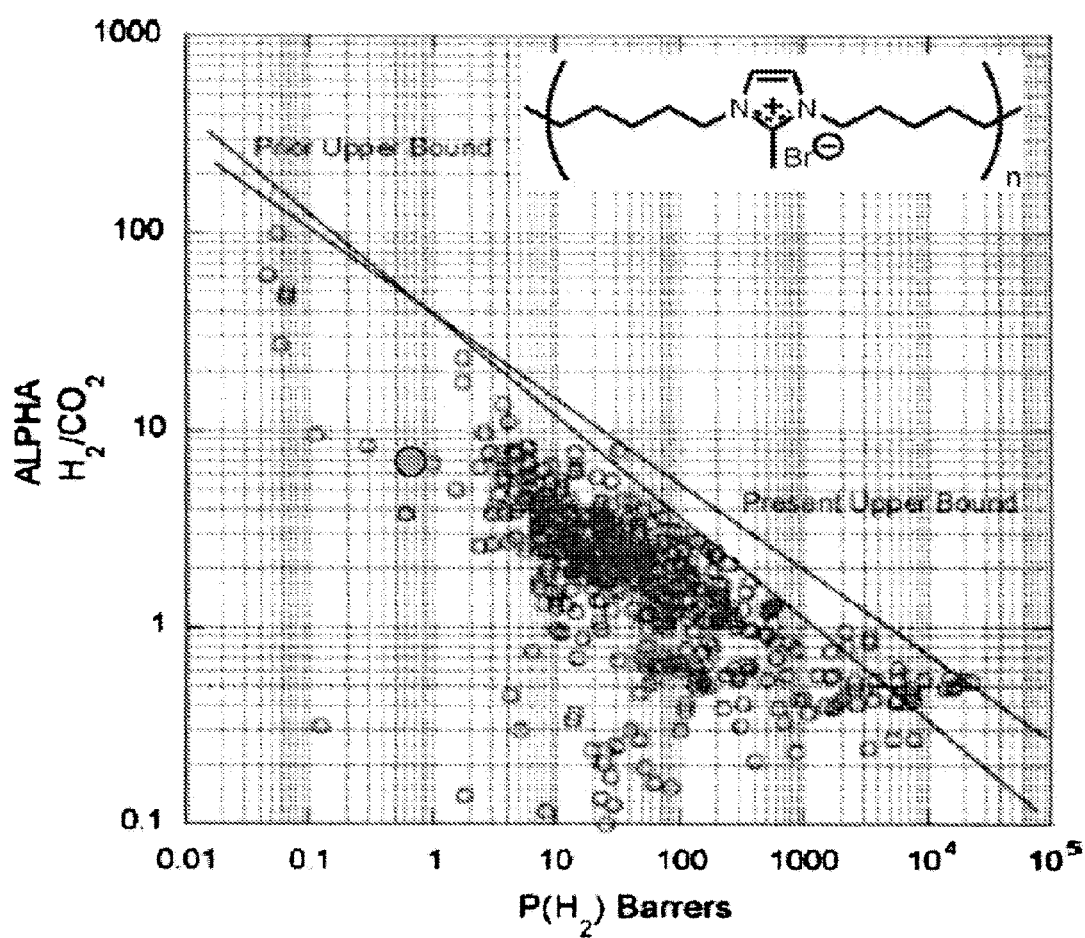
FIG. 4 shows a "Robeson Plot" for $H_2/CO_2$ separations with Polymer 1 from FIG. 1.

"Robeson Plots" are widely used for gauging the progress of polymer gas separation membranes (Robeson L M, J. Memb. Sci. 1991; 62:165-185). These log-log charts plot ideal permselectivity for a gas pair against the ideal permeability of the more permeable gas. The "upper bound" can be viewed as a target for researchers to exceed in the development of new membranes. The further to the upper right a material lies is one indicator of its potential for industrial implementation (Baker, R W, Ind. Eng. Chem. Res. 2002; 41: 1393-1411). The "upper bound" has traditionally been defined by glassy polymers with large diffusion selectivities (Robeson L M, J. Membr. Sci. 1991; 62:165-185; Freeman B D., Macromolecules 1999; 32: 375-380). In recent years, many polymers, especially those composed of polymers with polar linkages, such as poly(ethylene glycol) (PEG) derivatives have exceeded the "upper bound" as they exhibit large solubility selectivities, while allowing for the rapid permeation of each gas. Gas permeability and permselectivity data for these poly(RTIL) membranes, including poly(RTIL)-RTIL membranes, are shown in FIGS. 2-4.

Poly(RTILs) can be formed as powders but are also able to be formed as thin films, allowing for the these materials to be used as gas separation membranes or in other thin film applications. For example, poly(RTILs) are an attractive alternative platform to SILMs, as the chemistry of RTILs can be utilized for selective $CO_2$ transport, while significantly improving the mechanical stability of the membrane. Such membranes are structurally stable and can further be generated to be optically transparent.

Significant changes in gas permeability and gas pair selectivity can occur with small changes to the structure of the cationic polymer primarily through modification of the imidazolium cation in its parent monomer. The most permeable membranes typically have been those with longer side chains on the imidazolium cation, and the most selective materials typically have been those with polar, oligo(ethylene glycol) appendages. Analogous poly(RTIL) monomers (FIG. 6) with styrene or acrylate (not shown) backbones exhibited very similar properties. Examples of RTILs and polymerizable RTILs with two joined (i.e., gemini) imidazolium headgroups has been reported in the literature (Anderson et al., J. Am. Chem. Soc. 2005, 127: 593-604; Jin et al., J. Mater. Chem. 2006, 16:1529-1535; Nakajima et al., Polymer 2005, 46:11499-11504). "Gemini" or poly(GRTILs) were not found to have high permeability or selectivity, as they are highly crosslinked and restrict the movement of all gases.

While tailoring the imidazolium based monomers to improve gas selectivity in the poly(RTIL) membrane has been successful, the permeabilities of poly(RTIL) membranes fall far short of their molten, RTIL counterparts. Table 1 illustrates the vast differences in $CO_2$ permeability between a series of poly(RTIL) membranes and a widely used non-polymerized RTIL, 1-ethyl-3-methylimidazolium and bis(trifluoromethane)sulfonimide, $[C_2mim][Tf_2N]$ (shown in FIG. 7). The ideal separation factors are taken to be the ratio of the ideal permeability of $CO_2$ to that of the other gas of interest.

Table 1. $CO_2$ permeability and $CO_2/N_2$ and $CO_2/CH_4$ selectivities in different classes of poly(RTIL) membranes and a widely studied RTIL ($C_2$mim). Poly(1-4) refer to the polymers disclosed in FIG. 6.

TABLE 1

CO$_2$ permeability and CO$_2$/N$_2$ and CO$_2$/CH$_4$ selectivities in different classes of poly(RTIL) membranes and a widely studied RTIL (C$_2$mim). Poly(1-4) refer to the polymers disclosed in FIG. 6.

| Membrane | CO$_2$ permeability[a] | CO$_2$/N$_2$ | CO$_2$/CH$_4$ |
|---|---|---|---|
| Poly(1a-c): C$_n$CH$_3$ | 9-32 | 28-32 | 17-39 |
| Poly(2): Gemini | 4 | 22-28 | 27-32 |
| Poly(3a, b)OEG$_p$ | 16-22 | 41-44 | 29-33 |
| Poly(4): C$_n$CN | 4-8 | 37-40 | 30-37 |
| [C$_2$min][Tf$_2$N] | 1000 | 21 | 11 |

[a]CO$_2$ permeability in barrers. 1 barrer = 10$^{-10}$ cm$^3$ (STP)cm/cm$^2$ s cm Hg.

The major factor retarding the rate gases transport through poly(RTIL) membranes relative to those observed in SILMs has been a large decrease in gas diffusion through the solid material. For example, the diffusion coefficient for CO$_2$ in [C$_2$mim][Tf$_2$N] at 303K has been measured as 8×10$^{-6}$ cm$^2$/s, and experiments with poly(RTILs) show that diffusion coefficients for CO$_2$ can range from approximately 1×10$^{-9}$ to 1×10$^{-7}$ cm$^2$/s in the polymer membranes. Polymerizing RTILs causes a very large decrease in gas diffusion and, in turn, permeability of ca. 2-3 orders of magnitude. While gas diffusion through a dense, solid film is expected to be several orders of magnitude less than that through a dense liquid film, it is believed development into improving gas diffusion (while maintaining mechanical integrity) in poly(RTIL) membranes is the next step toward making them a competitive gas separation technology. The incorporation of a "free" RTIL component into the poly(RTIL) matrix has been shown to be successful in improving ion conductivity in poly(RTIL) films, and appears to be an interesting approach to improve gas permeability through similar materials.

Figure 7:
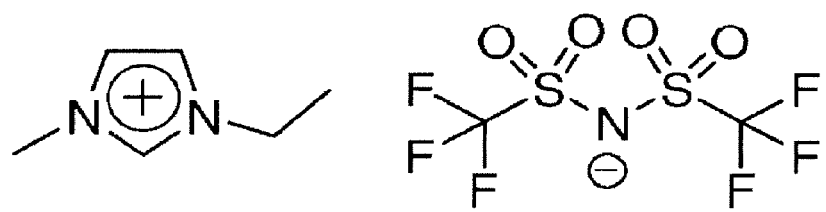
FIG. 7 shows the structure of [$C_2mim$][$Tf_2N$], a non-polymerized RTIL cation and anion used in some composites of the present invention as well as a molten RTIL.

To this end, a poly(RTIL)-RTIL composite membrane is fabricated through the photopolymerization of a simple imidazolium-based RTIL monomer (such as shown as polymer 1a in FIG. 6) in the presence of [C$_2$mim][Tf$_2$N] (structures shown in FIG. 7). Monomer 1a of FIG. 6 was chosen as it represents perhaps the simplest possible photopolymerizable RTIL monomer. [C$_2$mim][Tf$_2$N] was selected as it is a widely studied RTIL, and is miscible with the monomers of FIG. 6.

Figure 5:
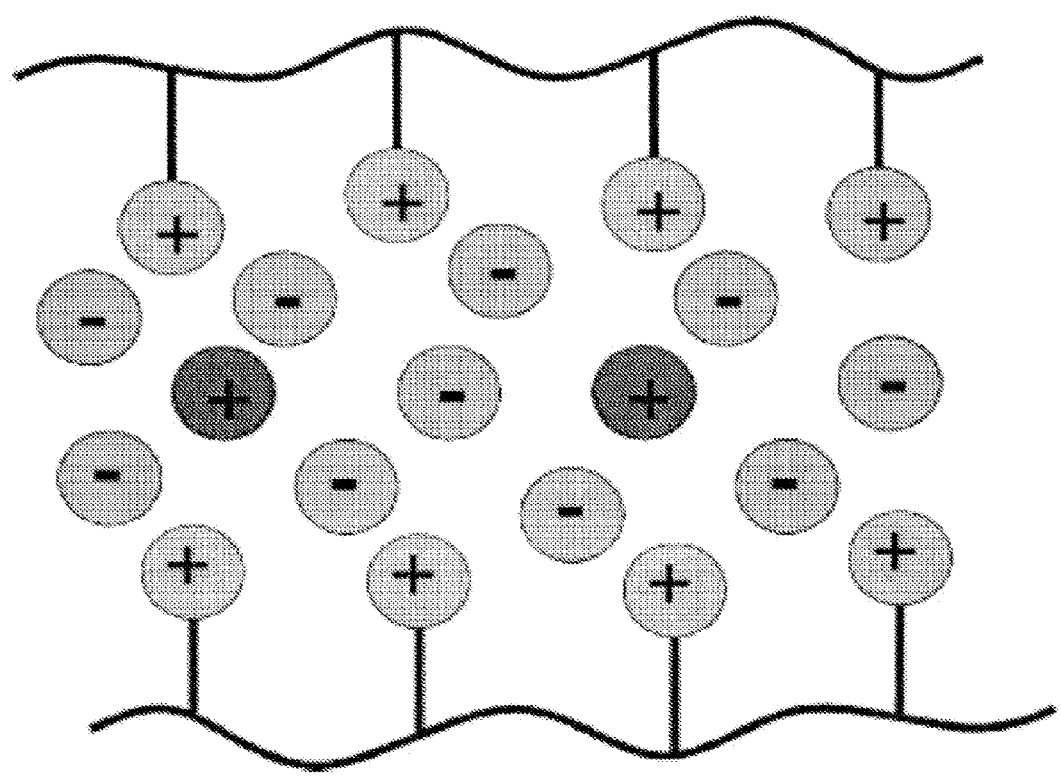
FIG. 5 shows a representation of a poly(RTIL)-RTIL composite material of the present invention containing two opposing layers of polymer bound imidazolium cations (+), [$Tf_2N$] anions (−), and free [$C_2mim$] cations (also +) between the polymer layers.

While a large number of poly(RTIL)-RTIL combinations are possible, these simple, readily synthesized components can provide great insight into how poly(RTIL)-RTIL composites might function on a basic level, before more complex systems are designed to optimize performance. The composite studied in this work contains 80 mol % imidazolium cations bound to the polystyrene chain with 20 mol % of the imidazolium cations remaining as "free" within the material along with "free" anions, and is generally illustrated in FIG. 5.

The neat poly(RTIL) formed from the monomers of FIG. 6 exhibited a CO$_2$ permeability of nine barrers with ideal separation factors for CO$_2$/N$_2$=32 and CO$_2$/CH$_4$=38. The composite material with 20 mol % free cations showed an ideal CO$_2$ permeability of 44 barrers with ideal separation factors of CO$_2$/N$_2$=40 and CO$_2$/CH$_4$=28. Through the use of a poly(RTIL)-RTIL composite membrane for gas separations, CO$_2$ permeability increased by approximately 400% and CO$_2$/N$_2$ selectivity increased by approximately 25% relative to the neat poly(RTIL), and the membrane exceeds the "upper bound" of a "Robeson Plot" for this separation. While CO$_2$/CH$_4$ separation did decrease by approximately 33%, the gains in CO$_2$ permeability still represent progress for this separation through poly(RTIL)-based membranes, as the performance moved closer to the "upper bound" of a "Robeson Plot" for CO$_2$/CH$_4$, relative to the neat poly (RTIL). These initial performance data illustrate that poly (RTILs) may be an ideal support matrix for stabilizing RTILs within polymer gas separation membranes, with the composite membranes exhibiting highly improved performance in CO$_2$-based separations.

One of the most attractive features of imidazolium-based RTILs is their ability to be chemically tailored to improve performance in particular applications. The influences of various functional groups on the interactions of RTILs with CO$_2$ and other gases have been previously explored. Early work focused on the effect of alkyl chain length and/or anion in imidazolium-based RTILs. However, given the range of functional groups known to impact gas solubility in molecular solvents (i.e., CH$_3$CN, MeOH, acetone, etc.), it became apparent that the study of RTILs for gas separations should not be limited to strictly alkyl-functionalized systems. The incorporation of polar functional groups such as oligo(ethylene glycol) units and nitrile-terminated alkyl chains has been reported to increase CO$_2$/N$_2$ and CO$_2$/CH$_4$ solubility selectivity in RTILs, with little detriment to CO$_2$ solubility. RTILs containing fluoroalkyl groups have also been shown to provide modest improvements in CO$_2$ solubility relative to their alkyl-functionalized analogues. When tested in an SILM configuration, fluoroalkyl-functionalized RTILs displayed improved CO$_2$/CH$_4$ selectivity relative to alkyl-functionalized RTILs but diminished CO$_2$/N$_2$ selectivity. Also, an imidazolium-based RTIL featuring a primary amine tethered to the cation has been shown to be capable of reversible CO$_2$ capture.

RTIL monomers can be synthesized to contain a variety of chemical groups (R groups in FIG. 10) in addition to the polymerizable unit. Imidazolium-based monomers containing n-alkyl chains (polymers 1a-c in FIG. 10), short oligo (ethylene glycol) linkages (polymers 1d and 1e in FIG. 10), and nitrile-terminated n-alkyl chains (polymers 1f and 1g in FIG. 10) have been successfully synthesized. "Gemini" or difunctional RTIL monomers are also possible. Monomers that were previously synthesized featured bis-(trifluoromethane)sulfonimide (Tf$_2$N) anions. The chemical nature of the polymerizable RTIL monomer has significant effects on the gas separation performance of the resultant poly (RTIL) gas separation membrane. Increasing the length of the nonpolymerizable substituent (R groups in FIG. 10) results in increased permeability for all gases. For n-alkyl chains, increasing the length of the substituent resulted in decreased ideal selectivity in CO$_2$/N$_2$ and CO$_2$/CH$_4$ separations.

The ideal permeability of CO$_2$ in poly(RTIL) membranes with oligo(ethylene glycol) substituents was similar to that observed in poly(RTILs) containing n-alkyl substituents. However, with increasing length of oligo(ethylene glycol) substituent, the ideal selectivity of CO$_2$/N$_2$ was observed to increase, while CO$_2$/CH$_2$ decreased. A similar trend in ideal selectivity behavior was observed in poly(RTIL) membranes containing alkyl-terminated nitrile groups, but those poly (RTIL) membranes suffered from CO$_2$ permeabilities that were less than the original alkyl-functionalized systems. Permeability in poly(RTIL) membranes ranged from 4 to 39 barrers, with CO$_2$/N$_2$ selectivities ranging from 28 to 44 and CO$_2$/CH$_4$ selectivities of 17-39. Alkyl-functionalized poly (RTILs) approximate the "upper bound" of the "Robeson plot" for CO$_2$/N$_2$ while those with oligo(ethylene glycol) and nitrile-terminated alkyl groups exceed an "upper bound" for this separation. None of the poly(RTIL) membranes have been observed to exceed the "upper bound" for $CO_2/CH_4$ separation. All types of poly(RTIL) membranes exhibited $CO_2$ permeabilities of only 1-10% of that of the most permeable SILMs, primarily as a result of slower gas diffusion in solids than liquids.

Modification of the substituent on the imidazolium cation in poly(RTILs) is observed to have a much greater effect on the selectivity of the membrane than on the permeability of $CO_2$. While an understanding of how to improve the $CO_2$ selectivity of poly(RTILs) through substituent modification has been achieved, it is also very desirable to improve $CO_2$ permeability through poly(RTIL) membranes to better compete with the high permeability of SILMs and high-performance polymer membranes in general. One possible approach is to increase the length of the substituent group on the RTIL monomer. This method could increase permeability at the expense of the diminished concentration of ions within the membrane, losing many of the desirable properties of the RTIL platform. The resulting polymers would more resemble the substituent (i.e., PE or PEG) rather than a poly(RTIL). However, the formation of poly(RTIL)-RTIL composite membranes is an even more straightforward approach to improving $CO_2$ permeability.

Figure 11:
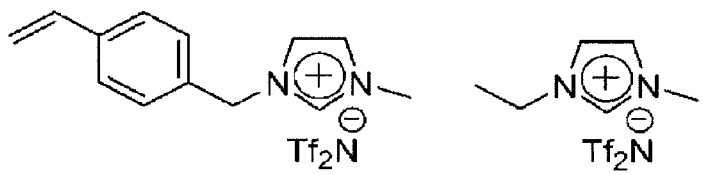
FIG. 11 shows exemplary components of a poly(RTIL)-RTIL composite membrane using monomer 1a from FIG. 10 and [$C_2mim$][$Tf_2$].

For example, as illustrated in FIG. 11, the RTIL monomer depicted as polymer 1a in FIG. 10 was polymerized in the presence of 20 mol % of 1-ethyl-3-methylimidazolium bis (trifluoromethane)-sulfonimide, also referred to herein as [$C_2$mim][$Tf_2$N], a common RTIL (shown in FIG. 7). The resulting solid poly(RTIL)-RTIL composite was homogeneous and exhibited no evidence of phase separation, even after many months of storage at ambient conditions. RTILs within poly(RTIL) matrices should be viewed as very different from traditional additives or plasticizers in conventional polymers. Not only are RTILs nonvolatile, they also experience significant ionic interactions with poly(RTILs). It is proposed that the charged backbone of poly(RTILs) strongly holds RTILs within the matrix and prevents phase separation.

The permeability of $CO_2$ of a polymer made from monomer 1a of FIG. 6 (without non-polymerized RTIL) was first reported to be 9.2 barrers, while the composite of polymer 1a and [$C_2$mim][$Tf_2$N] was found to have a $CO_2$ permeability of 44 barrers, approximately a 400% increase. $CH_4$ and $N_2$ exhibited 600% and 300% increases in their respective permeabilities. The increased permeabilities were attributed to more rapid gas diffusion through a composite with "free" or mobile ions. As a result, $CO_2/N_2$ selectivity in the composite membrane was found to be greater than that of the polymer alone, with values 40 and 32, respectively. $CO_2/CH_4$ selectivity experienced a decline in the composite relative to just the polymer, falling from a value of 39 for just the polymer to 28 in the composite. However, an ideal $CO_2/CH_4$ selectivity of 28 still represents an improvement over many poly(RTIL) membranes.

The nature of the anion associated with the "free" RTIL component has a dramatic effect on gas permeability. A poly(RTIL)-RTIL composite membrane containing exclusively $Tf_2N$ anions was observed to have an ideal $CO_2$ permeability of 60 barrers. Poly(RTIL)-RTIL composite membranes containing mixed anion systems with OTf, dca, or $SbF_6$ were all found to have very similar ideal $CO_2$ permeabilities of ca. 40 barrers. The nature of the anion was found to have a very subtle effect on ideal permeability selectivity for $CO_2/N_2$ and $CO_2/CH_4$ separations, which ranged from 36 to 39 and 24 to 27, respectively. The composite containing only $Tf_2N$ anions defined the lower limit of ideal selectivity in both separations. Plotting the performance of these poly(RTIL)-RTIL composites on "Robeson plots" reveals that $CO_2/N_2$ separations exceed the "upper bound" of the chart and that these poly(RTIL)-RTIL composites represent a significant improvement to previous poly(RTIL) membranes (see FIG. 13a). When the same is done for a similar chart of $CO_2/CH_4$ performance, poly (RTIL)-RTIL composites are also shown as an improvement upon previous poly(RTIL) membranes (see FIG. 13b). While poly(RTIL)-RTIL membranes are also below the "upper bound" of this "Robeson plot", they are closer to that line than previous poly(RTIL) membranes.

$Tf_2N$ anions have been typically used in the poly-(RTIL) membranes as the parent RTIL monomers with those anions are most convenient to synthesize. However, RTILs with a wide variety of anions are readily synthesized or are commercially available. While the effect of substituent groups on poly(RTIL) gas separation membranes have already explored, how those substituents will interact with "free" RTILs in the composite materials is not always clear. Thus, the effect of the type of anion in the "free" RTIL, as well as the structure of the cation, can vary and is of interest. Additionally, the concentration of "free" RTIL in the composite may have the most dramatic effect on performance, as the permeability differences between poly(RTILs) and RTILs span a range of nearly 3 orders of magnitude.

EXAMPLES

Example 1

Membrane Fabrication

[$C_2$mim][$Tf_2$N] (0.614 g, 1.57 mmol) was added to monomer 1a of FIG. 6 (3.00 g, 6.26 mmol) and the 1:4 (mol:mol) mixture was homogenized to a single liquid phase on a vibrating mixer. Divinylbenzene (0.034 g, 0.33 mmol) was added and the mixing step repeated. Finally, 2-hydroxy-2-methylpropiophenone (0.030 g, 0.18 mmol) was added to the solution and the mixing step repeated a final time. The solution was cast onto a 50×50 $cm^2$ piece of a porous polymer support (Supor200, Pall, AnnArbor, Mich., USA) on top of a quartz plate. A second, identical quartz plate was placed on top and pressure was applied manually to spread the monomer evenly through the support. The excess monomer remained between the quartz plates. The plates were then placed under a 365 nm UV light for 30 min. After this time, the plates were separated with a clean razor blade and the supported polymer film peeled from the surface. The supported area was then punched with a 47 mm diameter stainless steel die. The mass of the membrane and support was found to be 0.574 g. The mass of a 47 mm diameter section of the support has been found to be 0.070 g on average. Thus, the amount of poly(RTIL)-RTIL composite on the support was 0.504 g. The density of the composite was determined to be 1.42 $g/cm^3$. The thickness of the membrane was found to be approximately 200 µm.

[$C_2$mim][$Tf_2$N] and monomer 1a of FIG. 6 were synthesized according to previously published methods (Bara et al., Ind. Eng. Chem. Res. 2007; 46: 5397-5404; Finotello et al., Ind. Eng. Chem. Res. 2008; 47: 3453-3459). All other chemicals were used as received from Sigma-Alrdich (Milwaukee, Wis., USA). All gases were purchased from AirGas (Radnor, Pa., USA) and were of at least 99.99% purity.

Example 2

Gas Permeability Experiments

Ideal (single) single gas permeability experiments of the polymers of Example 1 with $CO_2$, $N_2$, and $CH_4$ were carried out at 295K using a time-lag apparatus. Details on the construction, operation, and calculations associated with this equipment can be found as published by our group (Bara et al., Ind. Eng. Chem. Res. 2007; 46: 5397-5404; Bara et al., J. Memb. Sci. 2007; 288:13-19). The membrane was degassed under dynamic vacuum of <1 torr for at least 16 hr between experiments. A driving force of ca. 2 atm was applied against initial vacuum downstream. Automated data collection was performed using LabView (National Instruments, Austin, Tex., USA). The ideal permeability for $CO_2$, $N_2$, and $CH_4$ along with the ideal permselectivities of $CO_2/N_2$ and $CO_2/CH_4$ are presented in Table 2.

TABLE 2

Ideal gas permeabilities and permselectivities in the composite membrane and the neat polymer

| Poly(RTIL) membrane | Permeability (barrers) | | | Permselectivity | |
|---|---|---|---|---|---|
| | $CO_2$ | $N_2$ | $CH_4$ | $CO_2/N_2$ | $CO_2/CH_4$ |
| Poly(1a) | 9.2 ± 05 | 0.29 ± 0.01 | 0.24 ± 0.01 | 32 | 39 |
| Poly(1a) + 20 mol % [$C_2$mim][$Tf_2$N] | 44 ± 3 | 1.1 ± 0.1 | 1.6 ± 0.1 | 39 | 27 |

Assuming solution-diffusion is the mode of transport through poly(RTILs) and poly(RTIL)-RTIL composite membranes, the permeability of a single gas (Pi) can be broken down as the product of its solubility (Si) and diffusivity (Di) through the material (equation 1, Wijmans et al., J. Memb. Sci. 1995; 107: 1-21):

$$Pi = Si \cdot Di$$

The ideal permeselectivity ($\alpha_{i,j}$) is taken as the ratio of the permeability of the more permeable gas (i) to that of the less permeable species (j). The permselectivity can be broken down into S and D contributions (equation 2):

$$\alpha_{i,j} = \frac{Pi}{Pj} = \frac{Si}{Sj} \cdot \frac{Di}{Dj}$$

As can be seen from the table, the permeability of all gases increased dramatically in the poly(RTIL)-RTIL composite membrane, indicating that the addition of only 20 mol % free [$C_2$mim][$Tf_2$N] into the polymer can have large effects on gas permeability. The permeability increases for $CO_2$, $N_2$, and $CH_4$ were roughly 400%, 300%, and 600%, respectively. The observed permeability of $CO_2$ in the composite membrane is beyond what has been observed in any of the poly(RTIL) membranes thus far.

Increased gas permeability may be attributed to the presence of the non-polymerizable component, [$C_2$mim][$Tf_2$N]. The free ion pairs serve to create and fill volume between the polymer chains, increasing the diffusivity, and in turn, permeability of each gas through the membrane. Furthermore, as [$C_2$mim][$Tf_2$N] does not have any covalent bonds to the polymer backbone, it may exhibit some mobility through the membrane. These free ions should further increase gas diffusion, as would be expected from a liquid component encapsulated in a polymer film. However, [$C_2$mim][$Tf_2$N], and other RTILs, cannot be viewed as a traditional liquid phase additive or plasticizer when inside a poly(RTIL) matrix. The RTIL component is non-volatile and cannot escape the membrane when subjected to vacuum or sweep gas. As salts, RTILs should also undergo significant non-covalent interactions with the charges associated with the polymer backbone, and at low concentrations are not expected to be leached from polymer in any appreciable manner by forces such as the pressure differential across the membrane. After the above experiments were completed, no residual liquid RTIL was found present inside the membrane apparatus, and the mass of the membrane was the same as it was before gas permeability testing began. Furthermore, no phase separation was observed after storing the membrane under ambient conditions for several months. These observations indicate that these composites are stable to at least 20 mol % of RTIL. While the permeability values for the composite membrane are still much lower than the permeability of neat [$C_2$mim][$Tf_2$N] this new composite material represents a simple method to improve $CO_2$ permeability through poly(RTIL)-based membranes without sacrificing the $CO_2/N_2$ selectivity.

In fact, ideal $CO_2/N_2$ permselectivity actually exhibits a slight increase when [$C_2$mim][$Tf_2$N] is incorporated in the polymer structure. Initial work with the neat polymer found that the diffusion of $N_2$ was faster than $CO_2$ through the poly(RTIL) membrane, and separation selectivity was favored by large solubility differences between the two gases. In bulk liquid RTILs, it is expected that there is little or no difference in diffusion rates among $CO_2$, $N_2$, and $CH_4$, and separation is achieved solely through $CO_2$ solubility being much higher than that of $N_2$, and to a lesser extent $CH_4$. In the case of a poly(RTIL)-RTIL composite membrane, the restriction of $CO_2$ diffusion may be eased, and the diffusion of $CO_2$ now is less of an impediment to the separation of $CO_2/N_2$. In contrast, $CO_2/CH_4$ permselectivity decreased by ca. 25%. In the neat polymer, there were favorable differences in both solubility and selectivity for $CO_2$ separation from $CH_4$. The neat polymer monomer 1a of FIG. 6 did not allow $CH_4$ to dissolve at levels observed in analogous polymers of monomers 1b and 1c of FIG. 6, as there was most likely very little free volume for it to fit within the compact and ionic structure.

This large solubility selectivity was not present in poly (RTIL) membranes made from monomers 1b and 1c of FIG. 6, where $CO_2/CH_4$ solubility selectivity returned to levels typically found in bulk fluid RTILs. However, those poly (RTIL) membranes did also exhibit favorable diffusion selectivity for $CO_2/CH_4$. In the case of this poly(RTIL)-RTIL composite, diffusion selectivity was expected to play a role in the separation of $CO_2/CH_4$, as the poly(styrene) backbone has been successful at slowing the diffusion of the larger $CH_4$ molecule regardless of the other chemical substituents present on the imidazolium cation bound to the backbone. The presence of the RTIL component should lessen the $CO_2/CH_4$ solubility selectivity in the material, and is most likely the reason the composite poly(RTIL)-RTIL membrane exhibits lower $CO_2/CH_4$ permselectivity than its counterpart membrane of monomer 1a, which lacks the free ion pairs.

Example 3

Performance Relative to Other Poly(RTILs) and General Polymer Membranes

Figure 8:
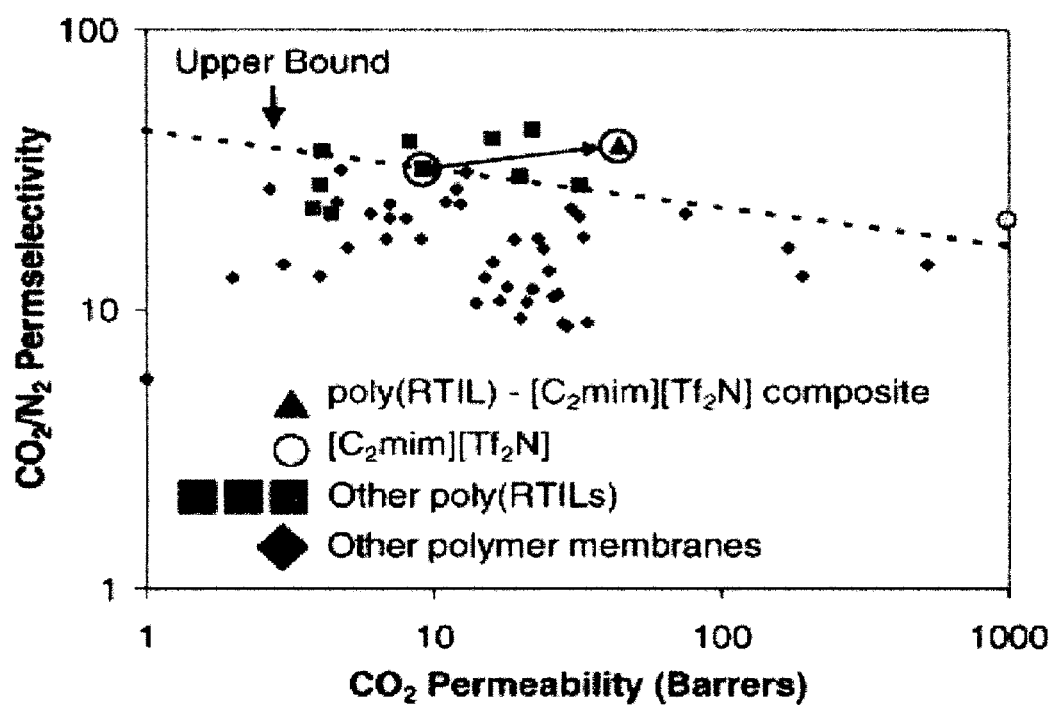
FIG. 8 shows a "Robeson Plot" for $CO_2/N_2$ separations for poly(RTIL) membranes and poly(RTIL)-[$C_2mim$][$Tf_2$] composite membranes.
Figure 9:
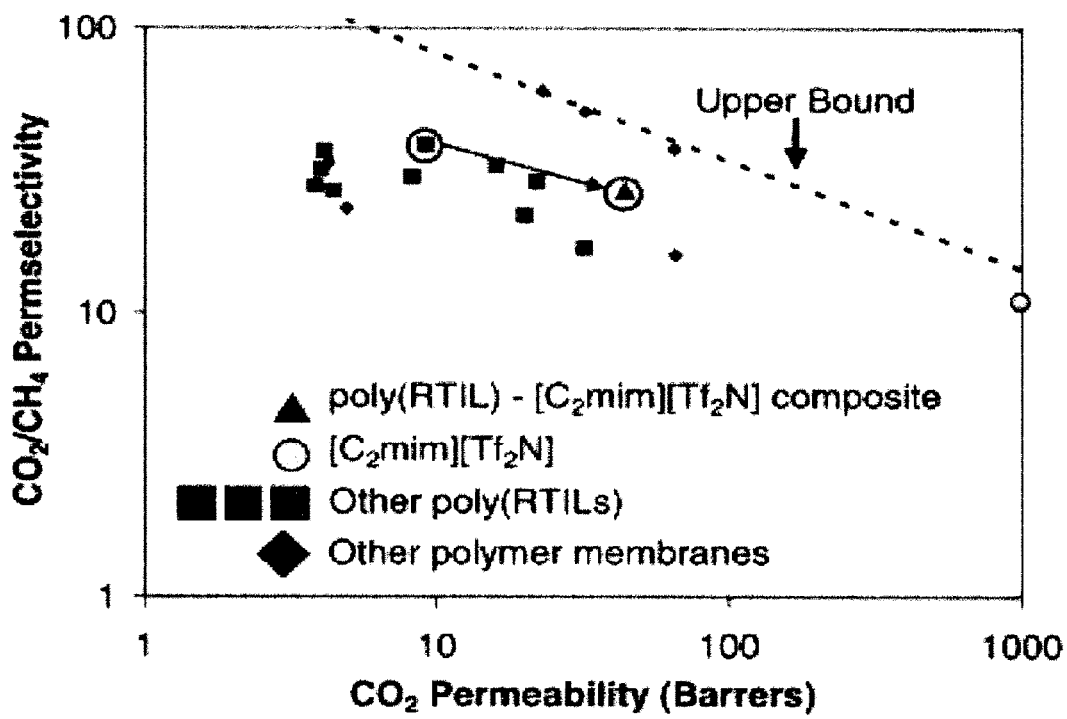
FIG. 9 shows a "Robeson Plot" for $CO_2/CH_4$ separations for poly(RTIL) membranes and poly(RTIL)-[$C_2mim$][$Tf_2$] composite membranes.

"Robeson Plots" are widely used for gauging the progress of polymer gas separation membranes (Robeson L M, J. Memb. Sci. 1991; 62:165-185). These log-log charts plot ideal permselectivity for a gas pair against the ideal permeability of the more permeable gas. The "upper bound" can be viewed as a target for researchers to exceed in the development of new membranes. The further to the upper right a material lies is one indicator of its potential for industrial implementation (Baker, R W, Ind. Eng. Chem. Res. 2002; 41: 1393-1411). The "upper bound" has traditionally been defined by glassy polymers with large diffusion selectivities (Robeson L M, J. Membr. Sci. 1991; 62:165-185; Freeman B D., Macromolecules 1999; 32: 375-380). In recent years, many polymers, especially those composed of polymers with polar linkages, such as poly(ethylene glycol) (PEG) derivatives have exceeded the "upper bound" as they exhibit large solubility selectivities, while allowing for the rapid permeation of each gas. The performance of the composite poly(RTIL)-RTIL membrane and other poly(RTIL) membranes are plotted on "Robeson Plots" for $CO_2/N_2$ and $CO_2/CH_4$ (FIGS. 8 and 9). In each chart, the performance increase of the membrane formed from the poly(RTIL) of monomer 1a and the poly(RTIL)-RTIL composite is indicated by the red arrow.

Poly(RTIL) membranes have obviously fared better in $CO_2/N_2$ separations, as the positions of each material lie at or above the "upper bound". In $CO_2/CH_4$ separation, they fall short of the mark, but the poly(RTIL)-RTIL composite membrane represents an improvement over past poly (RTILs) in this application, as the materials are approaching the "upper bound". However, these poly(RTIL)-RTIL composites represent progress in both separations for imidazolium-based materials. These initial results with poly(RTIL)-RTIL composites are very promising and suggest continued work on these materials in systematic studies to push $CO_2$ permeability higher without sacrificing to selectivity. Furthermore, as there are seemingly infinite combinations of poly(RTIL) and RTILs to be tested, there is high interest in identifying ideal candidate molecules for poly(RTIL)-RTIL composite membranes. It is believed these results provide an excellent set of tools to understand the chemical and physical factors that can be utilized to drive and improve gas separations in poly(-RTIL)-based membranes.

Example 4

Preparation of Additional Poly(RTIL)-RTIL Composite Membranes

Figure 12:
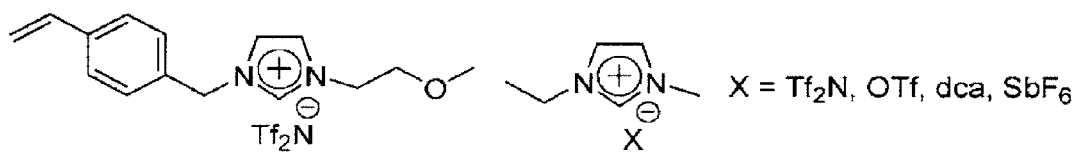
FIG. 12 shows structures of monomer 1d from FIG. 10 and [$C_2mim$][X−] salts used to fabricate exemplary poly (RTIL)-RTIL composite gas separation membranes.

A systematic study of poly(RTIL)-RTIL composite gas separation membranes was performed, examining the effect of anion in the "free" RTIL component on the gas permeability and selectivity of poly(RTIL) matrices fabricated from the monomer 1d of FIG. 10 and a variety of $[C_2mim]$ [X] salts at 20 mol % (FIG. 12).

The RTIL monomer 1d depicted in FIG. 10 (2.50 g, 47.5 mmol) and a $[C_2mim][X -]$ RTIL of interest were mixed in a 4:1 molar ratio, and the mixture homogenized on a vibrating mixer. Divinylbenzene (0.0325 g, 2.50 mmol) was then added, and the mixture homogenized again. Finally, a photoinitiator, 2-hydroxy-2-methylpropiophenone (0.0250 g, 0.152 mmol), was added and the mixing step repeated a final time. The solution was cast on to a 50 cm×50 cm piece of porous poly(ether sulfone) support (Supor 200, Pall, Ann Arbor, Mich.) on top of a Rain-X-coated quartz plate. Rain-X is a commercially available, hydrophobic coating for glass surfaces, which aids in the removal of the film after the photopolymerization is completed. A second, identical quartz plate was placed on top to spread the monomer completely through the support with excess flowing beyond the support but remained within the quartz plates. The plates were placed under a 365 nm UV light for 30 min. After this time, the plates were separated with a clean razor blade. The supported area was liberated from the freestanding polymer. The support was cut with a 47 mm diameter stainless steel die. The freestanding section was collected for determining polymer density. Membrane thicknesses ranged from 150 to 190 μm. No phase separation between the poly(RTIL) and "free" RTIL components has been observed after storing these membranes at ambient conditions for several months.

Densities of poly(RTIL)-RTIL composites were determined using a straightforward, volumetric method. Approximately 1.00 g of composite was added to a 10.00±0.02 mL, Class A volumetric flask of known mass. The mass of the polymer was recorded and hexanes (mixture of isomers) were added to the flask, and the mass of hexanes added was noted. The volume of hexanes added was calculated from its density (0.672 g/mL at 25° C.) and that value subtracted from the volume of the empty flask. The difference was taken to be the volume of the composite. The density of the composite was taken as the quotient of its mass and volume. Physical properties for each RTIL used and the densities of neat poly(1d) and the four composites studied are presented below (Table 3).

TABLE 3

Physical Properties of RTILs and Densities of Poly(RTIL) Composites

| Cation | anion | density (g/cm³) | MW (g/mol) | Vm (cm³/mol) | composite density (g/cm³) |
|---|---|---|---|---|---|
| $[C_2mim]$ | $Tf_2N$ | 1.52 | 391.31 | 257 | 1.32 |
|  | dca | 1.08 | 177.21 | 164 | 1.27 |
|  | OTf | 1.36 | 260.23 | 191 | 1.33 |
|  | $SbF_6$ | 1.85 | 346.92 | 188 | 1.52 |
| poly(1d) |  | 1.29 |  |  |  |

Single-gas permeation experiments using $CO_2$, $N_2$, and $CH_4$ were carried out at 295 K using a time-lag apparatus. Construction and operation of this equipment have been detailed in our previous works relating to poly(RTILs) and other polymer gas separation membranes. Experiments were performed with a driving force of approximately 2 atm upstream against initial vacuum downstream. Membranes were degassed under dynamic vacuum (<1 Torr) for 18-22 h between runs. LabView (National Instruments, Austin, Tex.) was utilized for automated data collection.

Example 5

Selecting Components for Poly(RTIL)-RTIL Composites

Monomer 1d of FIG. 10 was chosen as the polymerizable component for this study, as poly(RTIL) membranes made from this monomer were previously shown to exhibit $CO_2$ permeability of 16 barrers, with improved $CO_2/N_2$ and $CO_2/CH_4$ selectivity relative to poly(RTILs) with alkyl substituents. Relative to all of the other "neat" poly(RTIL) gas separation membranes, poly(1d) had the best combination of properties for $CO_2$ separations, and thus, it was selected as the matrix for further studies on composite systems. The anion, X, associated with the "free" imidazolium salt has been shown to have a dramatic effect on the gas separation properties of $[C_2mim]$-based RTILs. RTILs with smaller anions, such as triflate (OTf) and dicyanamide (dca), improve $CO_2/N_2$ and $CO_2/CH_4$ ideal solubility selectivities relative to those with $Tf_2N$ anions (no data have been reported yet for RTILs containing the $SbF_6$ anion). This behavior has been explained as a function of molar volume through the use of regular solution theory. Imidazolium-based RTILs with smaller molar volumes have greater solubility selectivity for $CO_2$ relative to $N_2$ and $CH_4$. However, the solubility of $CO_2$ is greater in RTILs with larger molar volumes, and this is also well-explained by RST.

Synthesis of RTIL-based monomers containing anions other than $Tf_2N$ is more challenging, as the ion exchange and purification of imidazolium-based salts with anions such as OTf, dca, $BF_4$, etc., is less convenient. Several imidazolium-based monomers with these types of anions have been reported to exist as solids at room temperature. As solid monomers are more difficult to process into thin films for subsequent photopolymerization, only imidazolium-based monomers that exist as molten salts at ambient conditions have been used in fabricating poly(RTILs). Thus, the effects of various anions on the gas separation properties of poly (RTIL) membranes have not yet been explored. Use of poly(RTIL)-RTIL composites allows for the inclusion of anions other than and in addition to $Tf_2N$ in poly(RTIL)-based membranes, providing a means to study various anions within poly(RTIL) gas separation membranes. In mixed anion poly(RTIL)-RTIL composites, the two anionic species should not preferentially associate with the cations bound to the polymer chain or the "free" cations. "Free" RTILs were included at 20 mol % relative to the polymerizable RTIL so as to keep the polymer as the major component of the membrane and determine the effects that small amounts of "free" RTILs might have on the performance of these membranes.

Example 6

Ideal Gas Permeability and Selectivity in Poly(RTIL)-RTIL Composite Membranes

Table 4 presents the ideal permeabilities of $CO_2$, $N_2$, and $CH_4$ as well as the ideal separation factors for $CO_2/N_2$ and $CO_2/CH_4$ in neat poly(1d) of FIG. 10 and in composites of poly(1d) with four $[C_2mim][X]$ RTILs. Ideal selectivities were calculated as the ratio of ideal permeabilities.

TABLE 4

Ideal Gas Permeabilities and Selectivities in Composite Membranes

| Membrane | | Ideal Permeability (barrers) | | | Ideal Selectivity | |
|---|---|---|---|---|---|---|
| | | $CO_2$ | $N_2$ | $CH_4$ | $CO_2/N_2$ | $CO_2/CH_4$ |
| poly(1d) | | 16 ± 1 | 0.39 ± 0.02 | 0.48 ± 0.01 | 41 | 33 |
| poly(1d) with 20 mol % $[C_2mim]$ | $Tf_2N$ | 60 ± 2 | 1.7 ± 0.1 | 2.6 ± 0.1 | 36 | 24 |
| | dca | 41 ± 1 | 1.1 ± 0.1 | 1.6 ± 0.1 | 39 | 25 |
| | OTf | 43 ± 1 | 1.2 ± 0.1 | 21.7 ± 0.1 | 37 | 25 |
| | $SbF_6$ | 42 ± 1 | 1.1 ± 0.1 | 1.5 ± 0.1 | 39 | 27 |

Composite membranes exhibited gas permeabilities several times larger than neat poly(1d) alone. The inclusion of "free" RTILs that are not covalently bound to the polymer backbone should serve to increase gas diffusion and, in turn, permeability, as solution diffusion is assumed to be the transport mechanism in these membranes according to the equation:

$$P = SD$$

"Free" RTILs fill volume between polymer chains, creating domains where gases may diffuse more rapidly than in poly(RTIL) matrices without "free" RTILs present. This behavior is akin to plasticization effects in membranes made from traditional polymers, where the inclusion of a plasticizer (i.e., water, organic solvent, or gas) can increase the gas diffusion and permeability of the membrane. However, the interactions occurring in poly(RTIL)-RTIL composites are unlike traditional polymers and plasticizers, as "free" RTILs are nonvolatile and are held within the poly(RTIL) matrix by ionic forces, thus severely limiting their ability to escape.

The inclusion of "free" $[C_2mim][Tf_2N]$ had the most dramatic effect on gas permeability in these composite membranes. In the composite membrane containing 20 mol % $[C_2mim][Tf_2N]$, permeabilities for $CO_2$, $N_2$, and $CH_4$ increased relative to neat poly(1d) by factors of 275%, 335%, and 440%, respectively, while those same gases exhibited average increases of 155%, 210%, and 233% in the other three composites. As $[C_2mim]$-$[Tf_2N]$ has the largest molar volume of the four RTILs included in the composite membranes (Table 3), it may be occupying more space between polymer chains and enabling more rapid gas diffusion through the composite. The molar volumes of the other $[C_2mim][X]$ salts are similar to each other and less than that of $[C_2mim][Tf_2N]$, and those composites all exhibited very similar gas permeabilities of ca. 42 barrers. This work indicates that the molar volume of the "free" RTIL incorporated in these poly(RTIL)-RTIL composite gas separation membranes correlates quite well with gas permeability.

The nature of the "free" RTIL had a much smaller effect on the ideal separation selectivities of the composite membranes. While each of the composite poly(RTIL)-RTIL membranes had ideal selectivities for $CO_2/N_2$ and $CO_2/CH_4$ less than that of neat poly(1d), little difference in separation performance exists between the various composites. Gas pair selectivities ranged from 36 to 39 for $CO_2/N_2$ and 24 to 27 for $CO_2/CH_4$, with the composites containing $[C_2mim]$ $[Tf2N]$ and $[C_2mim][SbF_6]$, respectively, at the minima and maxima of those ranges. The selectivity data of SILMs containing three of the RTILs for $CO_2/N_2$ and $CO_2/CH_4$ separations have previously been reported and is summarized in Table 5.

TABLE 5

Ideal Selectivity Data Previously Reported for $[C_2mim][X]$ SILMs

| SILM | | ideal selectivity | |
|---|---|---|---|
| | | $CO_2/N_2$ | $CO_2/CH_4$ |
| $[C_2mim]$ | $Tf_2N$ | 20 | 11 |
| | dca | 61 | 20 |
| | OTf | 35 | N/A |

With the exception of neat $[C_2mim][dca]$ in ideal $CO_2/N_2$ separations, poly(RTIL)-RTIL composites containing these RTILs as "free" ion pairs exceed the selectivities of those SILMs. Separation of $CO_2$, $N_2$, and $CH_4$ in SILMs is primarily achieved through solubility differences, with diffusion selectivity having little or no impact on the separation of these gases. SILMs have much higher permeabilities than poly(RTILs), as diffusion through a dense liquid film is much faster than that through a dense solid. In polymer membranes, diffusion differences also often play a significant role in separation. Poly(RTIL) membranes have previously shown to exhibit favorable solubility and diffusion differences for $CO_2/CH_4$ separation. $CO_2/N_2$ separation was also favored by a large solubility difference between the two gases but was hindered by the slightly more rapid diffusion of $N_2$. Poly(RTIL)-RTIL composites are hybrids with properties of both classes of materials. Permeability is increased relative to a neat poly(RTIL) with the presence of "free" RTIL, yet the polymer component can still impart a diffusion separation selectivity mechanism that is not available with SILMs. Poly(RTIL)-RTIL composites offer a highly modular membrane platform with tailored chemistry and tunable gas permeability and selectivity.

Example 7

Performance of Poly(RTIL)-RTIL Composites Relative to Other Polymer Membranes

As the ideal selectivities of the membrane with the highest permeability are only slightly less than those of membranes with lower permeabilities, a minimal "flux-selectivity tradeoff" exists in these poly(RTIL)-RTIL composites. This is due to the inherent selectivities of both the poly(RTIL) and "free" RTIL components in $CO_2/N_2$ and $CO_2/CH_4$, allowing for increasing permeability without sacrifice to selectivity. This is a very unique and powerful feature of poly(RTIL)-RTIL composites and their use as gas separation membranes.

Figure 13:
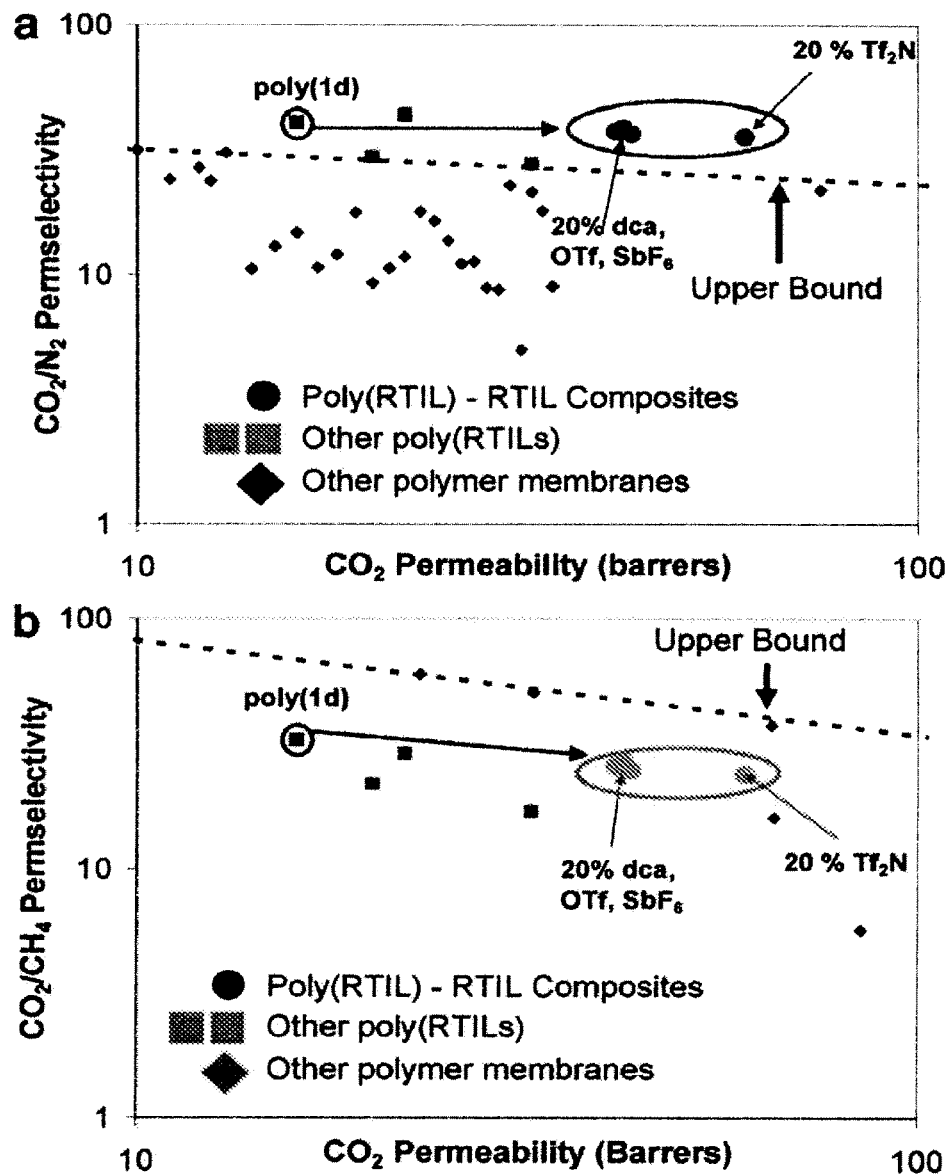
FIG. 13a shows a "Robeson plot" for $CO_2/N_2$ annotated to include poly(RTIL)-RTIL composite membranes of FIG. 12.
FIG. 13b shows a "Robeson plot" for $CO_2/CH_4$ annotated to include poly(RTIL)-RTIL composite membranes of FIG. 12.

"Robeson plots" are a widely used metric for evaluating and visualizing the progress in membrane science. These charts plot gas pair selectivity against the permeability of the membrane to one of the gases. Polymers that lie closer to the top right quadrant are potentially more viable for use in industrial processes. An apparent "upper bound" exists on the chart that was traditionally defined by glassy membranes with large diffusion selectivities. Parts a and b of FIG. 13 are "Robeson plots" for $CO_2/N_2$ and $CO_2/CH_4$ annotated to include poly(RTIL)-RTIL composites.

These "Robeson plots" indicate the $CO_2/N_2$ is a more favorable separation than $CO_2/CH_4$ for poly(RTIL)-RTIL composite gas separation membranes. Poly(RTIL)-RTIL composite membranes lie above the "upper bound" for $CO_2/N_2$ separation, indicating they are superior to many other polymer membranes for this application. The fact that poly(RTIL)-RTIL composites continue to positively deviate from this line gives promise to the pursuit of future research with these materials. It is not surprising that $CO_2/CH_4$ separation remains below the "upper bound" in poly(RTIL)-RTIL composite membranes, as our previous models and data suggest that RTIL-based systems are much less likely to outperform the best polymer materials for this separation.

Poly(RTIL)-RTIL composite membranes containing 20 mol % of a "free" RTIL were fabricated from readily synthesized and/or commercially available components. The permeabilities of membranes to $CO_2$, $N_2$, and $CH_4$ were determined. The inclusion of a "free" RTIL component was found to increase the permeability of each gas by approximately 2-4 time that of an analogous polymer membrane without a "free" RTIL component. Gas permeability was greatest in the composite membrane that contained the "free" RTIL with the largest molar volume. Poly(RTIL)-RTIL composite membranes exhibited ideal gas separation selectivities slightly less than an analogous polymer without a "free" RTIL component but were higher than what can be achieved in most SILMs. When viewed on "Robeson plots", poly(RTIL)-RTIL composite membranes exceeded the "upper bound" for $CO_2/N_2$ separation but fall short for $CO_2/CH_2$. While poly(RTIL)-RTIL composites are approximately an order of magnitude less permeable than some SILMs, much room remains for improvement.

During the course of these and other experiments, no phase separation between poly(RTIL) and RTIL components has been observed. The applied pressure of approximately 2 atm was not sufficient to separate the "free" RTIL from the poly(RTIL) component. Ionic interactions appear to hold the "free" RTIL within the polymer matrix, preventing its release where a typical SILM would fail. It is anticipated that the strength of such interactions are quite strong and that applied pressure alone will not be sufficient to separate the RTIL from the poly(RTIL) matrix.

Example 8

Effect of Amount of Unpolymerized RTIL on Membrane Properties

To investigate the effect of the amount of unpolymerized RTIL had on the permeability and selectivity of composite membranes, thin film membranes were constructed using an unpolymerized RTIL [C2mim] present in amounts from 0%, 20%, 40% and 60% by weight. The following polymerizable styrene monomer and vinyl monomer were used as the poly(RTILs):

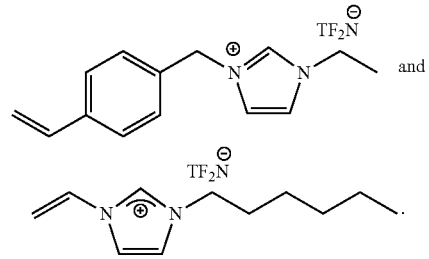

The styrene or vinyl monomer was added to a [$C_2$mim][Tf2N] mixture and then stirred overnight (12-24 hours). Subsequently, a crosslinker, divinylbenzene (0.0132 g) and a photoinitiator, 2-hydroxy-2-methylpropiophenone (0.01 g) were added. Finally, the mixture was homogenized on a vibrating mixer or stirred using a magnetic stir bar. The solution was casted between two Rain-X®-coated glass plates. The membrane was then baked in an Ultraviolet crosslinker oven (CL-1000, UVP) for at least 6 hours.

Free standing membranes were obtained from these procedures, the compositions of which are presented in Table 6. A membrane called by e.g. styrene (80-20), means that the membrane contains of 80 wt % of the styrene polymer, and 20 wt % of [$C_2$mim][$Tf_2$N]. Vinyl (80-20) membrane means that the membrane contains of 80 wt % of the vinyl polymer, and 20 wt % of [$C_2$mim][$Tf_2$N]. The thickness of each membrane is shown in Table 6.

TABLE 6

| Name | m [$C_2$mim][Tf2N] (gram) | m poly(RTIL) (gram) | Thickness (μm) |
|---|---|---|---|
| Styrene (80-20) | 0.4 | 1.6 | — |
| Styrene (60-40) | 0.8 | 1.2 | 142 |
| Styrene (40-60) | 1.2 | 0.8 | 142 |
| Vinyl (100) | — | 2.0 | 142 |
| Vinyl (80-20) | 0.4 | 1.6 | 142 |
| Vinyl (40-60) | 1.2 | 1.8 | 142 |

Single-gas permeation experiments using $CO_2$, $CH_4$, and $N_2$ (99.99% purity, Airgas) were performed at 296 K using a time-lag apparatus. The experiments were conducted with a driving force of 1 to 1.5 atm in the upper stream, and vacuum on the downstream. All fresh membranes were typically degassed under dynamic vacuum (<1 Torr) overnight (~12 hours), and then degassed for at least 20 hours between each run. The steady state permeability was calculated using the steady state flux. The ideal selectivity is calculated by the ratio of the permeability of the faster permeating gas over the slower one.

The $CO_2$, $N_2$ and $CH_4$ permeability and $CO_2/CH_4$ and $CO_2/N_2$ selectivity of all the styrene and vinyl based poly (RTIL) membranes are presented in Tables 7 and 8 respectively. Tables 7 and 8 present the selectivity and permeability of the membranes with respect to the different gasses. The selectivity and permeability for neat $[C_2mim][Tf_2N]$ and the styrene poly(RTIL) without $[C_2mim][Tf_2N]$ were known from previous experiments.

TABLE 7

| Name | P $CO_2$ (barrers) | P $N_2$ (barrers) | P $CH_4$ (barrers) | P $CO_2/N_2$ | P $CO_2/CH_4$ |
|---|---|---|---|---|---|
| Styrene (100-0) | 9.2 | 0.3 | 0.2 | 32.0 | 39.0 |
| Styrene (80-20) | 44.0 | 1.1 | 1.6 | 39.0 | 27.0 |
| Styrene (60-40) | 108.1 | 3.1 | 4.9 | 35.0 | 22.0 |
| Styrene (40-60) | 257.3 | 8.0 | 12.9 | 32.0 | 20.0 |
| Styrene (0-100) | 686 | 22 | 48 | 31.2 | 14.3 |

TABLE 8

| Name | P $CO_2$ (barrers) | P $N_2$ (barrers) | P $CH_4$ (barrers) | P $CO_2/N_2$ | P $CO_2/CH_4$ |
|---|---|---|---|---|---|
| Vinyl (100-0) | 67.3 | 4.6 | 6.3 | 14.5 | 10.6 |
| Vinyl (80-20) | 97.3 | 5.1 | 8.8 | 19.1 | 11.1 |
| Vinyl (40-60) | 285.8 | 13.4 | 20.8 | 21.3 | 13.8 |
| Vinyl (0-100) | 686 | 22 | 48 | 31.2 | 14.3 |

As shown in Tables 7 and 8, increasing the amount of the unpolymerized RTIL increases the permeability of the membrane for each gas. Increasing the amount of the unpolymerized RTIL significantly lowered the selectivity for $CO_2/CH_4$ for the styrene poly(RTIL), but had less of an effect for $CO_2/N_2$ selectivity and for the vinyl poly(RTIL). The membranes made from the vinyl poly(RTIL) generally had higher permeability but slightly lower selectivity.

Example 9

Synthesis of an Ammonium-Based Ionene

Ammonium-based ionenes were synthesized by reacting a N,N,N',N' tetramethylalkyldiamine with a dibromoalkane (Scheme 1). Reactions were done in a minimal amount of methanol to keep the reactants and products in solution (25-50 wt %). Reactions were carried out at reflux for 1-5 days. Specifically N,N,N',N'-tetramethylhexanediamine was reacted with dibromohexane in methanol at reflux for 48 hours. The polymer was then ion exchanged from $Br^-$ to $Tf_2N^-$. The polymer was dissolved in water and a solution of $LiTf_2N$ was slowly added. The ion exchanged polymer quickly crashed out and was left to stir for 24 hours. The solids were then filtered. Composites of the anion-exchanged ionene were then blended with RTIL. Specifically $[C_6mim][Tf_2N]$ and $[N_{8111}][Tf_2N]$. A specific amount of ionene and RTIL were dissolved in a minimal amount of DMSO in a evaporation dish. Once completely dissolved, the solution was heated to 100° C. and the DMSO was allowed to evaporate at atmospheric pressure for about 4 hours or until most all the DMSO has evaporated. The sample was then placed in a vacuum oven and the remaining DMSO was pulled off. The resulting material was a solid homogeneous material. Composite were made with RTIL with 20-50% $[C_6mim][Tf_2N]$ and 50% ammonium RTIL.

Example 10

Surface Resistivity Measurements for Use as Antistatic Materials

A polymer film generated as shown in Scheme 2 (R1=R2=$(CH_2)_{10}$, Z1=Z2=H, Y=$CH_3$, X=Br) was tested for static dissipative and antistatic capabilities. Surface resistance was measured with Monroe Electronics, Model 272A Surface Resistance Meter and probe setup as provided. The measurement apparatus was able to determine surface resistivity at 10V and 100V, both voltages of which were measured. Film was used as provided for the surface resistivity testing.

The antistatic film was placed on top of the insulated sample plate and permitted to equilibrate for approximately 30 minutes. The wiring between the meter and the probe was connected. The probe electrode protective cap was removed and the electrode surfaces were examined for contamination and cleaned per instructions. The meter was switched on and also permitted to equilibrate for approximately 30 minutes prior to collecting data. The meter was switched to the 10 V setting for initial analysis. The probe provides a fixed weight, constant pressure to the surface of the film to maintain the electrode contact on the surface of the film during measurement. No additional force was applied other than what the weighted probe provides. The probe was then placed on top of the film and the measurement taken when the resistance value stabilized which was typically 3 to 5 seconds after placing the probe on the film surface. Between measurements the film was turned over, the probe replaced and a new measurement taken. Each time the probe was repositioned the film/electrode interface was examined to ensure that the electrode surfaces were in complete contact with the film. Upon completion of the measurement of at the 10 V level, the meter was reset to 100 V and the measurement process repeated. The collected data is listed below in Table 9.

TABLE 9

Surface resistivity of poly(RTIL) materials, 10 V and 100 V.

| Reading | Surface Resistivity (ohms/cm$^2$) |
|---|---|
| 10 V Potential | |
| 1 | 5.1 × 10$^9$ |
| 2 | 5.1 × 10$^9$ |
| 3 | 4.9 × 10$^9$ |
| Avg. | 5.0 × 10$^9$ |
| Std Dev | ±1.2 × 10$^8$ |
| 100 V Potential | |
| 1 | 4.3 × 10$^9$ |
| 2 | 4.4 × 10$^9$ |
| 3 | 4.2 × 10$^9$ |
| Avg. | 4.3 × 10$^9$ |
| Std Dev | ±1.0 × 10$^9$ |

As is seen from the data, the poly(RTIL) polymer has surface resistivity suitable for an antistatic agent, i.e., greater than 10$^9$. The antistatic materials of the present invention can be used as surface coatings (which are sprayed or otherwise applied to a surface), surface laminates, or additives blended into the base polymer or substrate material. The poly(RTIL) materials are less corrosive, have improved optical clarity, can meet FDA and USP approval for use around food and medical devices, and additionally can be produced at a lower cost than typical antistatic materials. The poly(RTIL) materials also have a higher temperature processability for polymers like polycarbonate, nylon, polyurethane, polyimide/amides. Furthermore, the structures of the poly(RTIL) and poly(RTIL)-RTIL composites can be modified to ensure compatibility with the host polymer or substrate while minimizing any impact of the properties of the host polymer or substrate.

Example 11

Water Miscibility of Vicinal Diol-Functionalized Imidazolium-Based RTILS

Vicinal diol-functionalized, imidazolium-based RTILs containing the Tf$_2$N anion were selected because this anion does not form HF and often leads to RTILs with more favorable properties (e.g., lower viscosity, higher thermal stability). It was found that by varying the length of the n-alkyl group on these diol-functionalized alkylimidazolium RTILs, their miscibility in water can be adjusted to be completely water miscible or immiscible.

The Tf$_2$N anion has been described as a hydrophobic RTIL anion, although many Tf$_2$N-containing RTILs are somewhat hygroscopic. For this reason, it was surprising when certain imidazolium-based RTILs containing vicinal diol-functionalized cations and Tf$_2$N anions (RTILs 7 and 9 in Scheme 5) were completely miscible with water. Furthermore, it was determined that the water-miscibility of these RTILs could be controlled by changing the length of the N-alkyl group on the cation or varying substitution at the 2-position of the imidazolium cation core.

Curiosity about these diol-RTILs was driven by the attempted anion exchange of 1-(2,3-dihydroxypropyl)-3-methylimidazolium chloride (RTIL 1 in Scheme 4) to the Tf$_2$N anion using typical aqueous procedures which did not produce a water immiscible precipitate, as has come to be expected from imidazolium-based RTILs with Tf$_2$N anions. This unusual result prompted the synthesis of derivatives 7-12 in Scheme 5 with varying substitution of R and R'. Compounds 1-6 were prepared in excellent yield by stirring 1-chloro-2,3-propanediol with the corresponding imidazole reagent at 130° C. for 48 hours (Scheme 4). The reaction was attempted using various solvents (EtOH, CH$_3$CN, toluene) at reflux and was incomplete after several days. However, N-alkylation proceeded most effectively as a neat (solvent-free) reaction. The reaction mixture was then placed under dynamic vacuum (<1 torr) at 130° C. for another 48 hours to remove any residual starting materials. Prior syntheses of RTILs containing the same cation were conducted in refluxing toluene and required repeated washing with CH$_3$CN, while our methods require no additional organic solvents. All of the imidazolium chloride salts were water-miscible, viscous, brown-colored oils except RTIL 2, which was a solid. The products were carried on without further purification as they were quite pure as confirmed by $^1$H NMR analysis.

Scheme 4

| RTIL | R  | R' | Yield |
|------|----|----|-------|
| 1    | Me | H  | 100%  |
| 2    | Me | Me | 100%  |
| 3    | Et | H  | 94%   |
| 4    | Pr | H  | 95%   |
| 5    | Bu | H  | 92%   |
| 6    | Bn | H  | 97%   |

The chloride salts were then ion-exchanged to give the corresponding Tf$_2$N-containing RTILs 7-12 (Scheme 5), all of which were slightly viscous, brown liquids. The choice of Tf$_2$N anion source and solvent for this reaction were determined by the water miscibility of the final product. The water immiscible RTILs 8, and 10-12 were produced using standard conditions with LiTf$_2$N in water. Upon mixing, the RTILs formed a separate layer from water and were diluted with EtOAc and washed repeatedly with water until qualitatively halide free (as confirmed by lack of a precipitate upon addition of AgNO$_3$ to the aqueous washings). The water-miscible RTILs (7 and 9) were prepared using CH$_3$CN as the solvent and KTf$_2$N. KTf$_2$N was chosen because lithium salts often have relatively high solubilities in organic solvents, which could lead to residual Li-containing impurities. The final products were isolated by filtering the KCl by-product and evaporation of the solvent under dynamic vacuum at 65° C. RTIL 11 was also prepared using the KTf$_2$N/CH$_3$CN protocol and found to still be water immiscible, indicating that the solubility properties of these RTILs are independent of the method used to produce them.

Scheme 5

| RTIL | R  | R' | Solvent/M           | Yield | H$_2$O Miscible |
|------|----|----|---------------------|-------|-----------------|
| 7    | Me | H  | CH$_3$CN/K          | 100%  | Yes             |
| 8    | Me | Me | H$_2$O/Li           | 64%   | No              |
| 9    | Et | H  | CH$_3$CN/K          | 100%  | Yes             |
| 10   | Pr | H  | H$_2$O/Li           | 60%   | No              |
| 11   | Bu | H  | H$_2$O/Li           | 44%   | No              |
| 12   | Bn | H  | H$_2$O/Li           | 95%   | No              |

1-(2,3-Dihydroxypropyl)-3-alkylimidazolium Tf$_2$N RTILs with N-alkyl groups larger than ethyl (RTILs 10-11)

were immiscible with water (i.e., they form a separate layer when mixed with water) at ambient temperature. The same behavior was observed when the alkyl chain is replaced with a benzyl group (RTIL 12). Increasing the hydrophobicity of the cation by increasing the hydrocarbon content renders the RTIL product water-immiscible. Replacing the proton at the 2-position of the imidazolium cation with a methyl group (RTIL 8) gives a RTIL that is not miscible with water, while the protio analog (RTIL 7) is miscible. Whether the increased hydrophobicity of RTIL 8 is due simply to higher hydrocarbon content by adding the methyl group or a more complex mechanism involving effects of substitution at the 2-position on the imidazolium ring is not clear at this time, and is beyond the scope of this work.

It has been previously reported that the hydrophilicity of an RTIL can be adjusted by mixing it with water-soluble, inorganic salts (e.g., $K_3PO_4$). To ensure that the unique behaviors of RTILs 7 and 9 were a result of the cation structure and not ionic impurities, they were analyzed for potassium ($K^+$) and chloride ($Cl^-$) ion content. $K^+$ analysis was conducted using an inductively coupled plasma (ICP) instrument, and $Cl^-$ analysis by ion chromatography (IC). The residual $K^+$ contents of 7 and 9 were 680 and 610 ppm, and $Cl^-$ concentrations were 104 and 71 ppm, respectively. Because these values are quite low, the water miscibility of the RTIL can be attributed to the nature of the cation and not inorganic salt impurities. Additionally, the water content of RTILs 7-12 was determined by Karl Fischer titration to be less than 500 ppm in all cases.

It appears that the vicinal diol functional group on the cation was essential to the water miscibility of these RTILs. Another $Tf_2N$-containing imidazolium salt 13 (Scheme 6) with two alcohol groups on the cation was synthesized and found to be water immiscible. The symmetric imidazolium salt 13 is a constitutional isomer of RTIL 7, yet displays very different properties. This indicates that the miscibility of RTILs 7 and 9 is not due simply to increased polarity by adding multiple OH groups to the cation. The vicinal diol functionality has a unique effect on the miscibility of RTILs. Without wishing to be bound by any particular belief, the enhanced miscibility may be a consequence of enhanced hydrogen-bonding with water.

Scheme 6

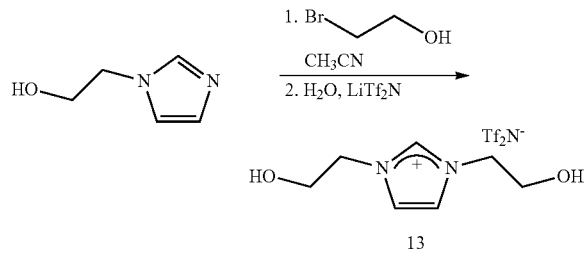

In conclusion, a series of six new imidazolium-$Tf_2N$ RTILs with a vicinal diol-substituted cation were prepared. It was found that the length of the alkyl substitution on the cation dictated the water miscibility of the RTIL, with methyl and ethyl substitution producing RTILs that were completely miscible in water, and longer alkyl homologues affording completely water-immiscible RTILs. Some imidazolium-based RTILs with a $Tf_2N$ anion were found to be completely water-miscible, and can have their water miscibility properties adjusted by systematic cation modifications. These RTILs may find utility in various applications as they are water-miscible but do not incorporate a traditional "hydrophilic" anion. Also see LaFrate et al., Industrial and Engineering Chemistry Research (2009), 48(19), 8757-8759, which is hereby incorporated by reference.

Example 11

Detailed Synthesis Information of Certain RTIL Compounds

The RTIL compounds of Example 10 were prepared as described below. Unless otherwise noted, all reagents were purchased from commercial suppliers and were used without further purification, with the exception of 1-ethyl- and 1-propylimidazole, which were prepared following a literature procedure (Bara et al Ind. Eng. Chem. Res. 2007, 46, 5397-5404). $^1$H NMR spectra were recorded on a 400 MHz Varian instrument and $^{13}$C NMR were recorded at 100 MHz on the same instrument. NMR spectra are reported in ppm and were referenced to the solvent peak and processed using ACD Labs 5.0 software. ESI mass spectra were recorded using the Applied Biosystems QSTAR Hybrid LC/MS/MS System mass spectrometer. $K^+$ content was determined using an Applied Research Laboratories 3410+ inductively coupled plasma-optical emission spectrometer. $Cl^-$ content was determined using a Dionex Series 4500i Ion Chromatograph. Water content was measured using a Mettler Toledo DL32 Karl Fischer Coulometer. Elemental analyses were conducted by Galbraith Laboratories (Knoxville, Tenn.)

1-(2,3-Dihydroxypropyl)-3-methylimidazolium Chloride (RTIL 1)

1-Methylimidazole (8.21 g, 100 mmol) and 3-chloro-1,2-propanediol (11.05 g, 100.0 mmol) were stirred in a 130° C. oil bath for 48 h, after which the flask was placed under vacuum and stirring continued at 130° C. for another 48 h. The residue was then dissolved in $CH_3OH$, transferred to a tared flask and concentrated to afford the product as a viscous brown oil (19.3 g, 100%). $^1$H NMR: $\delta_H$ ppm (400 MHz; DMSO-$d_6$) 3.19-3.29 (m, 1H) 3.36-3.48 (m, 1H) 3.77 (dd, J=6.78, 4.21 Hz, 1H) 3.87 (s, 3H) 4.10 (dd, J=13.74, 7.69 Hz, 1H) 4.32 (dd, J=13.74, 3.11 Hz, 1H) 5.13 (br. s., 1H) 5.53 (d, J=5.13 Hz, 1H) 7.72 (t, J=1.74 Hz, 1H) 7.74 (t, J=1.74 Hz, 1H) 9.18 (s, 1H).

1-(2,3-Dihydroxypropyl)-2,3-dimethylimidazolium Chloride (RTIL 2)

1,2-Dimethylimidazole (9.61 g, 100 mmol) and 3-chloro-1,2-propanediol (11.05 g, 100.0 mmol) were stirred in a 130° C. oil bath for 48 h, after which the flask was placed under vacuum and stirring continued at 130° C. for another 48 h. The product was then stirred in refluxing ether for 24 h and filtered to afford a brown solid (20.29 g, 100%). $^1$H NMR: $\delta_H$ ppm (400 MHz; DMSO-$d_6$) 2.60 (s, 3H) 3.20-3.33 (m, 1H) 3.36-3.49 (m, 2H) 3.78 (s, 3H) 4.08 (dd, J=14.11, 7.88 Hz, 1H) 4.27 (dd, J=14.11, 3.11 Hz, 1H) 5.14 (t, J=5.50 Hz, 1H) 5.50 (d, J=5.68 Hz, 1H) 7.63 (d, J=2.01 Hz, 1H) 7.66 (d, J=2.20 Hz, 1H).

1-(2,3-Dihydroxypropyl)-3-ethylimidazolium Chloride (RTIL 3)

1-Ethylimidazole (2.40 g, 25.0 mmol) and 3-chloro-1,2-propanediol (2.76 g, 25.0 mmol) were stirred in a 130° C. oil bath for 48 h, after which the flask was placed under vacuum and stirring continued at 130° C. for another 48 h. The residue was then dissolved in CH₃OH, transferred to a tared flask and concentrated to afford the product as a viscous brown oil (4.88 g, 94%). ¹H NMR: $\delta_H$ ppm (400 MHz; DMSO-$d_6$) 1.41 (t, J=7.24 Hz, 3H) 3.23 (dd, J=11.17, 6.96 Hz, 1H) 3.37-3.47 (m, 1H) 3.70-3.86 (m, 1H) 4.11 (dd, J=13.74, 7.69 Hz, 1H) 4.22 (q, J=7.33 Hz, 2H) 4.33 (dd, J=13.74, 3.11 Hz, 1H) 5.19 (br. s., 1H) 5.59 (br. s., 1H) 7.78 (t, J=1.74 Hz, 1H) 7.85 (t, J=1.74 Hz, 1H) 9.33 (t, J=1.56 Hz, 1H).

1-(2,3-Dihydroxypropyl)-3-propylimidazolium Chloride (RTIL 4)

1-Propylimidazole (2.75 g, 25.0 mmol) and 3-chloro-1,2-propanediol (2.76 g, 25.0 mmol) were stirred in a 130° C. oil bath for 48 h, after which the flask was placed under vacuum and stirring continued at 130° C. for another 48 h. The residue was then dissolved in CH₃OH, transferred to a tared flask and concentrated to afford the product as a viscous brown oil (5.20 g, 95%). ¹H NMR: $\delta_H$ ppm (400 MHz; DMSO-$d_6$) 0.84 (t, J=7.42 Hz, 3H) 1.74-1.86 (m, 2H) 3.22 (dd, J=11.17, 6.96 Hz, 1H) 3.42 (dd, J=10.99, 4.95 Hz, 1H) 4.07-4.20 (m, 3H) 4.33 (dd, J=13.74, 3.11 Hz, 1H) 5.15 (br. s., 1H) 5.56 (br. s., 1H) 7.78 (t, J=1.74 Hz, 1H) 7.82 (t, J=1.83 Hz, 1H) 9.29 (t, J=1.47 Hz, 1H).

1-(2,3-Dihydroxypropyl)-3-butylimidazolium Chloride (RTIL 5)

1-Butylimidazole (12.42 g, 100.0 mmol) and 3-chloro-1,2-propanediol (11.05 g, 100.0 mmol) were stirred in a 130° C. oil bath for 48 h, after which the flask was placed under vacuum and stirring continued at 130° C. for another 48 h. The residue was then dissolved in CH₃OH, transferred to a tared flask, and concentrated to afford the product as a viscous brown oil (23.27 g, 92%). ¹H NMR: $\delta_H$ ppm (400 MHz; DMSO-$d_6$) 0.89 (t, 3H) 1.17-1.31 (m, 2H) 1.69-1.83 (m, 2H) 3.19-3.28 (m, 1H) 3.37-3.46 (m, 1H) 3.78 (dd, J=7.05, 4.49 Hz, 1H) 4.12 (dd, J=13.83, 7.60 Hz, 1H) 4.20 (t, J=7.14 Hz, 2H) 4.33 (dd, J=13.74, 3.11 Hz, 1H) 5.16 (br. s., 1H) 5.56 (d, J=5.31 Hz, 1H) 7.78 (t, J=1.74 Hz, 1H) 7.83 (t, J=1.74 Hz, 1H) 9.30 (t, J=1.47 Hz, 1H).

1-(2,3-Dihydroxypropyl)-3-benzylimidazolium Chloride (RTIL 6)

1-Benzylimidazole (3.95 g, 25.0 mmol) and 3-chloro-1,2-propanediol (2.76 g, 25.0 mmol) were stirred in a 130° C. oil bath for 48 h, after which the flask was placed under vacuum and stirring continued at 130° C. for another 48 h. The residue was then dissolved in CH₃OH and transferred to a tared flask and concentrated to afford the product as a viscous brown oil (6.50 g, 97%). ¹H NMR: $\delta_H$ ppm (400 MHz; DMSO-$d_6$) 3.18-3.30 (m, 1H) 3.37-3.49 (m, 1H) 3.73-3.86 (m, 1H) 4.15 (dd, J=13.74, 7.69 Hz, 1H) 4.36 (dd, J=13.74, 3.11 Hz, 1H) 5.21 (t, J=5.50 Hz, 1H) 5.49 (s, 2H) 5.62 (d, J=5.50 Hz, 1H) 7.32-7.50 (m, 5H) 7.80 (t, J=1.83 Hz, 1H) 7.86 (t, J=1.83 Hz, 1H) 9.49 (t, J=1.56 Hz, 1H).

1-(2,3-Dihydroxypropyl)-3-methylimidazolium Bis(trifluoromethanesulfonimide) (RTIL 7)

1-(2,3-Dihydroxypropyl)-3-methylimidazolium chloride (1, 1.71 g, 8.88 mmol) and KTf₂N (2.83 g, 8.88 mmol) were stirred in CH₃CN (10 mL) for 24 h, then filtered through Celite and concentrated to give an orange/brown oil (3.92 g, 100%). ¹H NMR: $\delta_H$ ppm (400 MHz; DMSO-$d_6$) 3.20-3.30 (m, 1H) 3.43 (dd, J=10.90, 4.67 Hz, 1H) 3.77 (dd, J=6.69, 4.49 Hz, 1H) 3.86 (s, 3H) 4.06 (dd, J=13.74, 8.06 Hz, 1H) 4.29 (dd, J=13.74, 2.93 Hz, 1H) 4.95 (br. s., 1H) 5.33 (d, J=4.95 Hz, 1H) 7.66-7.69 (m, 2H) 9.05 (s, 1H). ¹³C NMR: $\delta_C$ ppm (100 MHz; DMSO-$d_6$) 35.69, 52.17, 62.72, 119.51 (q, CF₃, J=322.64 Hz), 123.17, 123.20, 137.09. HRMS: Calc'd for C₁₆H₂₆F₆N₅O₈S₂ [A⁺][A⁺][B⁻]: 594.1127. Found: 594.1096. Elemental Analysis: Calc'd: C, 24.72%; H, 3.00%; N, 9.61%. Found: C, 24.54%; H, 2.88%; N, 9.37%. H₂O content: 423 ppm.

1-(2,3-Dihydroxypropyl)-2,3-dimethylimidazolium Bis(trifluoromethanesulfonimide) (RTIL 8)

1-(2,3-Dihydroxypropyl)-2,3-dimethylimidazolium chloride (2, 4.13 g, 20.0 mmol) and LiTf₂N (6.32 g, 22.0 mmol) were dissolved in water (50 mL) and stirred for 24 h. The mixture was then diluted with EtOAc (100 mL) and washed with water (5×25 mL) until no precipitate formed in the aqueous layer upon adding AgNO₃. The EtOAc layer was then dried over anhydrous MgSO₄, filtered, and concentrated to give the product as an orange/brown oil (5.87 g, 64%). ¹H NMR: $\delta_H$ ppm (400 MHz; DMSO-$d_6$) 2.58 (s, 3H) 3.29 (dd, J=10.99, 6.59 Hz, 1H) 3.44 (dd, J=10.99, 4.95 Hz, 1H) 3.76 (s, 4H) 4.04 (dd, J=14.56, 7.60 Hz, 1H) 4.23 (dd, J=14.29, 3.11 Hz, 1H) 4.94 (br. s., 1H) 5.23 (br. s., 1H) 7.55 (d, J=2.20 Hz, 1H) 7.59 (d, J=2.01 Hz, 1H). ¹³C NMR: $\delta_C$ ppm (100 MHz; DMSO-$d_6$) 9.62, 34.79, 50.95, 62.85, 70.30, 119.69 (q, CF₃, J=317.42 Hz), 121.96, 122.14, 145.18. HRMS: Calc'd for C₁₈H₃₀F₆N₅O₈S₂ [A⁺][A⁺][B⁻]: 622.1440. Found: 622.1438. Elemental Analysis: Calc'd: C, 26.61%; H, 3.35%; N, 9.31%. Found: C, 26.12%; H, 2.98%; N, 9.11%. H₂O content: 443 ppm.

1-(2,3-Dihydroxypropyl)-3-ethylimidazolium Bis(trifluoromethanesulfonimide) (RTIL 9)

1-(2,3-Dihydroxypropyl)-3-ethylimidazolium chloride (3, 2.85 g, 13.8 mmol) and KTf₂N (4.40 g, 13.8 mmol) were stirred in CH₃CN (10 mL) for 24 h, then filtered through Celite and concentrated to give an orange/brown oil (6.25 g, 100%). ¹H NMR: $\delta_H$ ppm (400 MHz; DMSO-$d_6$) 1.42 (t, J=7.24 Hz, 3H) 3.26 (dd, J=10.90, 6.69 Hz, 1H) 3.43 (dd, J=10.99, 4.95 Hz, 1H) 3.77 (br. s., 1H) 4.06 (dd, J=13.74, 8.06 Hz, 1H) 4.21 (q, J=7.33 Hz, 2H) 4.29 (dd, J=13.83, 3.02 Hz, 1H) 4.95 (br. s., 1H) 5.33 (br. s., 1H) 7.70 (t, J=1.74 Hz, 1H) 7.78 (t, J=1.74 Hz, 1H) 9.12 (t, J=1.56 Hz, 1H). ¹³C NMR: $\delta_C$ ppm (100 MHz; DMSO-$d_6$) 15.17, 44.16, 52.27, 62.78, 69.64, 119.51 (q, CF₃, J=321.87 Hz), 121.68, 123.33, 136.29. HRMS: Calc'd for C₁₈H₃₀F₆N₅O₈S₂ [A⁺][A⁺][B⁻]: 622.1440. Found: 622.1432. Elemental Analysis: Calc'd: C, 26.61%; H, 3.35%; N, 9.31%. Found: C, 26.20%; H, 3.08%; N, 9.03%. H₂O content: 452 ppm.

1-(2,3-Dihydroxypropyl)-3-propylimidazolium Bis(trifluoromethanesulfonimide) (RTIL 10)

1-(2,3-Dihydroxypropyl)-3-propylimidazolium chloride (4, 3.40 g, 15.4 mmol) and LiTf₂N (4.85 g, 16.9 mmol) were dissolved in water (40 mL) and stirred for 24 h. The mixture was then diluted with EtOAc (100 mL) and washed with water (5×25 mL) until no precipitate formed in the aqueous layer upon adding AgNO₃. The EtOAc layer was then dried over anhydrous MgSO₄, filtered and concentrated to give the product as an orange/brown oil (4.27 g, 60%). ¹H NMR: $\delta_H$ ppm (400 MHz; DMSO-$d_6$) 0.85 (t, J=7.42 Hz, 3H) 1.71-1.88 (m, 2H) 3.25 (dd, J=10.99, 6.78 Hz, 1H) 3.43 (dd, J=10.99, 4.95 Hz, 1H) 3.78 (br. s., 1H) 3.99-4.11 (m, 1H) 4.14 (t, J=7.05 Hz, 2H) 4.30 (dd, J=13.83, 3.02 Hz, 1H) 4.96 (br. s., 1H) 5.34 (br. s., 1H) 7.71 (t, J=1.74 Hz, 1H) 7.77 (t, J=1.74 Hz, 1H) 9.12 (t, J=1.47 Hz, 1H). $^{13}$C NMR: $\delta_C$ ppm (100 MHz; DMSO-$d_6$) 10.37, 22.97, 50.36, 52.32, 62.81, 69.67, 119.59 (q, $CF_3$, J=322.07 Hz), 122.00, 123.43, 136.69. HRMS: Calc'd for $C_{20}H_{34}F_6N_5O_8S_2$ [$A^+$][$A^+$][$B^-$]: 650.1753. Found: 650.1726. Elemental Analysis: Calc'd: C, 28.39%; H, 3.68%; N, 9.03%. Found: C, 28.06%; H, 3.15%; N, 8.60%. $H_2O$ content: 459 ppm.

1-(2,3-Dihydroxypropyl)-3-butylimidazolium Bis(trifluoromethanesulfonimide) (RTIL 11)

1-(2,3-Dihydroxypropyl)-3-butylimidazolium chloride (5, 5.09 g, 20.0 mmol) and $LiTf_2N$ (6.32 g, 22.0 mmol) were dissolved in water (50 mL) and stirred for 24 h. The mixture was then diluted with EtOAc (100 mL) and washed with water (5×25 mL) until no precipitate formed in the aqueous layer upon adding $AgNO_3$. The EtOAc layer was then dried over anhydrous $MgSO_4$, filtered, and concentrated to give the product as an orange/brown oil (4.27 g, 44%). $^1$H NMR: $\delta_H$ ppm (400 MHz; DMSO-$d_6$) 0.90 (t, 3H) 1.20-1.32 (m, 2H) 1.71-1.85 (m, 2H) 3.20-3.31 (m, 1H) 3.38-3.50 (m, 1H) 3.71-3.85 (m, 1H) 4.07 (dd, J=13.83, 7.97 Hz, 1H) 4.18 (t, J=7.14 Hz, 2H) 4.30 (dd, J=13.83, 3.02 Hz, 1H) 4.95 (br. s., 1H) 5.34 (d, J=5.13 Hz, 1H) 7.70 (t, J=1.74 Hz, 1H) 7.77 (t, J=1.74 Hz, 1H) 9.12 (t, J=1.47 Hz, 1H). $^{13}$C NMR: $\delta_C$ ppm (100 MHz; DMSO-$d_6$) 13.28, 18.83, 31.47, 48.58, 52.29, 62.80, 69.64, 119.54 (q, $CF_3$, J=322.24 Hz), 121.98, 123.39 136.68. HRMS: Calc'd for $C_{22}H_{38}F_6N_5O_8S_2$ [$A^+$][$A^+$][$B^-$]: 678.2066. Found: 678.2042. Elemental Analysis: Calc'd: C, 30.06%; H, 3.99%; N, 8.76%. Found: C, 29.94%; H, 3.83%; N, 8.47%. $H_2O$ content: 379 ppm.

1-(2,3-Dihydroxypropyl)-3-benzylimidazolium Bis(trifluoromethanesulfonimide) (RTIL 12)

1-(2,3-Dihydroxypropyl)-3-benzylimidazolium chloride (6, 2.04 g, 7.60 mmol) and $LiTf_2N$ (2.40 g, 8.30 mmol) were dissolved in water (20 mL) and stirred for 24 h. The mixture was then diluted with EtOAc (100 mL) and washed with water (5×25 mL) until no precipitate formed in the aqueous layer upon adding $AgNO_3$. The EtOAc layer was then dried over anhydrous $MgSO_4$, filtered, and concentrated to give the product as an orange/brown oil (3.76 g, 95%). $^1$H NMR: $\delta_H$ ppm (400 MHz; DMSO-$d_6$) 3.26 (dd, J=10.35, 7.05 Hz, 1H) 3.44 (dd, J=10.90, 4.85 Hz, 1H) 3.72-3.85 (m, 1H) 4.10 (dd, J=13.92, 8.06 Hz, 1H) 4.32 (dd, J=13.74, 2.93 Hz, 1H) 4.96 (br. s., 1H) 5.37 (d, J=4.95 Hz, 1H) 5.44 (s, 2H) 7.35-7.48 (m, 5H) 7.72 (t, J=1.74 Hz, 1H) 7.79 (t, J=1.74 Hz, 1H) 9.26 (t, J=1.56 Hz, 1H). $^{13}$C NMR: $\delta_C$ ppm (100 MHz; DMSO-$d_6$) 51.88, 52.39, 62.80, 69.56, 119.53 (q, $CF_3$, J=321.87 Hz), 122.09, 123.76, 128.22, 129.03, 134.95, 136.81. HRMS: Calc'd for $C_{28}H_{34}F_6N_5O_8S_2$ [$A^+$][$A^+$][$B^-$]: 746.1753. Found: 746.1760. Elemental Analysis: Calc'd: C, 34.67%; H, 3.35%; N, 8.18%. Found: C, 35.09%; H, 3.11%; N, 7.85%. $H_2O$ content: 483 ppm.

1,3-Bis-(2-hydroxyethyl)-imidazolium Bis(trifluoromethanesulfonimide) (Compound 13)

1-(2-hydroxyethyl)-imidazole (5.68 g, 50.7 mmol) was dissolved in $CH_3CN$ (45 mL), then 2-bromoethanol (6.97 g, 55.8 mmol) was added and the reaction heated to reflux and stirred for 16 h. After several hours, a white precipitate formed. The flask was then cooled, the solid filtered and washed with $Et_2O$ (250 ml) and dried under vacuum to produce 10.51 g of a white powder. 10.00 g of this white powder were dissolved in deionized $H_2O$ (50 mL) and $LiTf_2N$ (13.33 g, 46.42 mmol) was added. A yellow oil immediately formed at the bottom of the flask and reaction was stirred for several hours at room temperature. The oil was taken up in EtOAc (200 mL) and washed with deionized $H_2O$ (5×100 mL). The fourth and fifth aqueous washings were free of halides as confirmed lack of precipitate upon addition of by addition of $AgNO_3$. The organic phase was dried over anhydrous $MgSO_4$, followed by addition of activated carbon. This mixture was filtered through basic $Al_2O_3$, which was washed with EtOAc (100 mL). The filtrate was concentrated, and the product dried under vacuum at 65° C. overnight to produce 13 as a pale yellow, gel-like solid. (8.55 g, 46.3%). $^1$H NMR: $\delta_H$ ppm (400 MHz; DMSO-$d_6$) 3.74 (t, J=4.49 Hz, 4H) 4.15-4.32 (m, 4H) 5.17 (br. s., 2H) 7.72 (d, J=1.65 Hz, 2H) 9.10 (s, 1H).

Synthesis of Poly(RTIL) Thin Films

The styrene monomer shown in Formula 3 was synthesized as follows. Imidazole was alkylated with chloropropanediol and then treated with chloromethylstyrene to give the imidazolium chloride salt. Subsequent ion exchange to the Tf2N anion afforded the polymerizable RTIL monomer. When the diol-RTIL is exposed to UV light it can undergo photopolymerization (chain-addition photopolymerization) to produce a polymeric material. When this process was carried out between glass plates, a thin film was obtained.

Example 12

Water Vapor Flux Membranes Based on Vicinal Diol-Functionalized Imidazolium-Based RTILS A breathable membrane that demonstrates high water vapor flux was prepared using a diol-functionalized polymerizable room temperature ionic liquid. A novel monomer material was synthesized and used to fabricate thin films which were tested for their ability to transport water vapor. These materials were tested beside commercial breathable polymers for comparison.

Introduction

Breathable fabrics that can selectively transport water vapor are important for both work and leisure activities. For leisure, these materials are used for items that allow good "breathability" for evaporative cooling but resist dirt, wind, or liquid water penetration, such as foul weather clothing, packs, gloves, rainwear, skiwear, as well as linings and inserts for clothing. Work clothing includes survival suits, military protective clothing, clean room garments, wound dressings, and filtration. The materials themselves can be categorized as closely woven fabrics, microporous membranes, hydrophilic membranes and combinations of these materials. A key parameter is a minimum water vapor flux of 0.5 kg $m^{-2}$ $day^{-1}$.

Various materials have been studied for water vapor transport. Nafion™ is an ion-exchange membrane that has been evaluated for a variety of applications including fuel cells and chloro-alkali separations where water management is an important factor. Romero and Merida evaluated water transport under both water liquid-equilibrated and vapor-equilibrated conditions. They concluded that liquid equilibration conditions were superior since the water transport rate decreased substantially if the membrane-fluid interface became dry (Romero, T.; et al. J. Membrane Sci., 2009, 338, 135-144). Under vapor equilibration at 30° C., the water flux was approximately 3 kg m$^{-2}$ day$^{-1}$. The flux did not vary linearly with thickness, indicating the importance of the interfacial mass transfer resistance.

Potreck et al. investigated the water vapor transport of a hydrophilic, polyethylene oxide-based block copolymer (PEBAX 1074) (Potreck, J. et al., J. Membr. Sci., 2009, 2338, 11016). The primary applications were for dehydration of flue gas and air streams as well as natural gas dew pointing. They found that the water permeability increased exponentially at high water activity. They attributed this effect to swelling of the polymer under these conditions. The water vapor flux was approximately 7 kg m$^{-2}$ day$^{-1}$ at 30° C.

Dense polyimide membranes were evaluated for water vapor sorption and transport by Huang et al (Huang, J. et al., J. Appl. Polym. Sci. 87, 2306-2317). They studied five different polyimide materials. The best water transport was demonstrated using PDMA-50DDs/50ODA. Based on the permeability and thickness values reported, their water vapor flux was approximately 0.030 kg m$^{-2}$ day$^{-1}$ at 30° C.

Block copolymers of poly(butylene terephthalate) and poly(ethylene oxide) have also been evaluated for water transport properties (Gebben, J. Membr. Sci., 1996, 113, 323-329). The authors note that during physical activity, a person can evaporate 0.8 kg of water per hour, which corresponds to a heat loss of 1800 kJ. Removal of this water and heat load to the environment is a critical issue for clothing. Their experimental results showed a water vapor flux of approximately 2.8 kg m$^{-2}$ day$^{-1}$ at 30° C.

Further evidence of the importance of the water vapor transport properties for protective clothing was provided by Li et al (Text. Res. J., 2007, 78, 1057-1069). They studied the physiological response when wearing protective clothing. They used ten healthy adults and studied them wearing various protective clothing while engaging in different activities (treadmill exercise, working on a computer, and moving a mannequin). They monitored a number of physiological parameters and determined that moisture transport through the clothing material was the main physiological mechanism for reduced heat stress.

The objective of this study was the synthesis of a new type of dense, hydrophilic, ionic liquid-based polymer, and the evaluation of its water vapor transport properties. This material has a thickness-normalized water vapor flux of 140 kg m$^{-2}$ day$^{-1}$ μm at 25° C., when pro-rated for a membrane thickness of 1 μm. This result is based on a 152 μm thick test membrane film. This material offers several advantages over current state-of-the-art breathable materials. For example, unlike Nafion, there is no time delay before this material reaches peak water vapor flux and it lacks pores, which precludes clogging that affects performance of porous materials (i.e. ePTFE).

Room temperature ionic liquids (RTILs, 21, FIG. 14) are a unique class of ionic chemical compounds that are liquid at ambient temperature because of a large, unsymmetrical organic cation (typically imidazolium or ammonium) and a delocalized anion. Previous work in our labs has focused on polymerizable RTILs (poly(RTILs), 24, FIG. 14) used as thin films for gas separation applications (Carlise et al., Ind. Eng Chem. Res., 2008 (47), 7005-7012). These materials show remarkable permeability and selectivity for light gases ($CO_2$, $CH_4$, $N_2$, etc.), and the membrane properties can be tuned due to the modular nature of the RTIL monomer. Structural modifications to the monomer can change the hydrophilicity/hydrophobicity as well as the free volume of the resulting polymer. The properties of the RTIL can be easily modified by altering the cation structure through organic synthesis or by exchanging the anion. Polymerizable RTILs (22 and 23) are made by replacing one of the alkyl groups on the cation with a styrene or vinyl group.

A novel series of RTILs were recently prepared, which incorporate the common bis(trifluoromethanesulfonylimide) ($Tf_2N$) anion and a vicinal diol-functionalized cation (LaFrate et al., Industrial and Engineering Chemistry Research (2009), 48(19), 8757-8759). $Tf_2N$-containing RTILs are generally thought of as hydrophobic and they have low water solubility (Freire, M. G. et al. J. Phys. Chem. B, 2007, 111, 13082-13089). However, these diol-functionalized RTILs (FIG. 15) showed variable water miscibility based on the cation structure. Shorter alkyl chains on the cation (5 and 6) resulted in water soluble RTILs, while extending the alkyl chain or substituting the proton at the 2-position with a methyl group (7-10) gave RTILs that were not water-soluble. This unique behavior prompted the synthesis of a polymerizable diol RTIL monomer and the investigation of these materials for their ability to transport water vapor.

Figure 14:
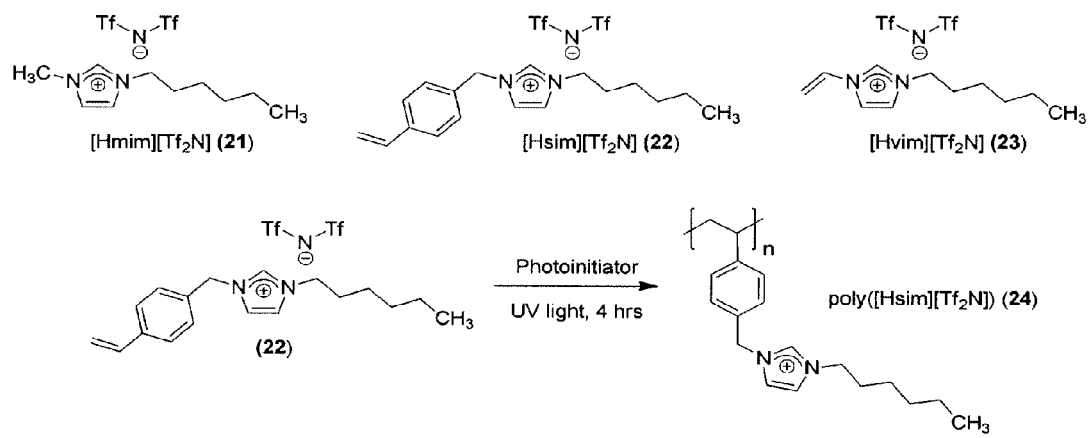
FIG. 14: Structures of RTILs and RTIL monomers and polymers.
Figure 15:
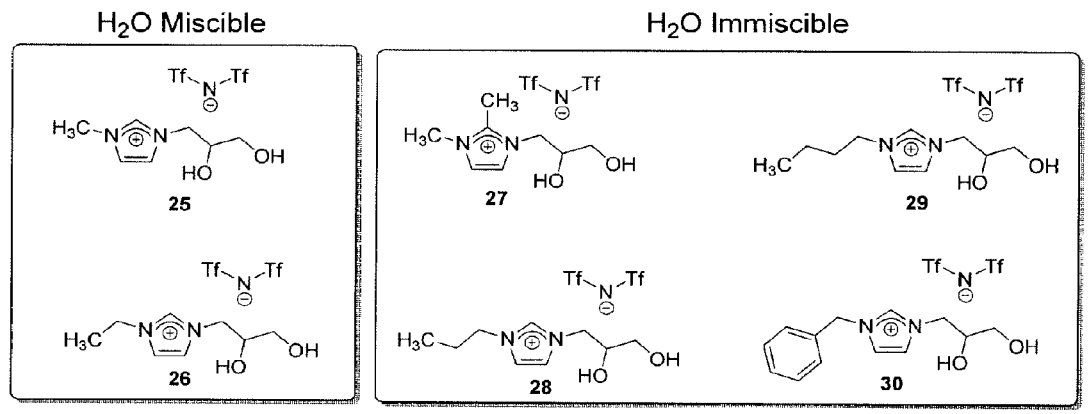
FIG. 15: Structures of diol RTILs and their bulk interactions with water.

This initial study for water vapor transport demonstrates the proof-of-concept for these materials. For future directions, RTILs have several advantages for flexible design of membrane materials. As shown in FIGS. 14 and 15, different functional groups can be attached to the imidazolium cation at the 1 and 3 positions and alternate anions can also be used to further modify the membrane properties. Various composite and copolymer structures can be formed that allow for further adjustments in membrane permeation and mechanical properties. Due to strong electrostatic interactions, non-polymerizable RTILs with similar or different chemical structure can be incorporated into the polymer to enhance the permeability as well as modify the physical and chemical properties of the membrane. These incorporated structures are stable since they will not migrate out of the film. Solid-liquid poly(RTIL)-RTIL composite structures have already been demonstrated for high permeability $CO_2/N_2$ separations (Bara, J. E. et al. Ind. Eng. Chem. Res., 2007, 46, 5397-5404).

Results and Discussion

Synthesis

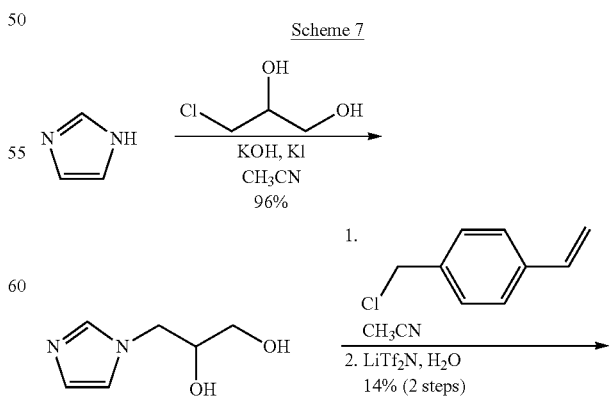

-continued

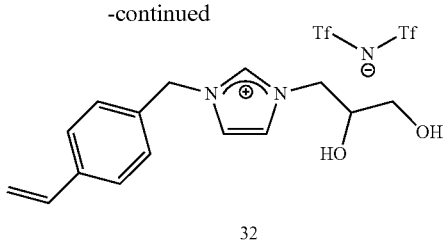

32

Early work involving poly(RTILs) focused on preparing styrene-based polymer materials (Bara, J. E. et al. Ind. Eng. Chem. Res., 2007, 46, 5397-5404), so a first attempt at a polymerizable analog of the diol-funtionalized RTIL was to replace the alkyl chain on the RTIL cation (FIG. 15) with a styrene group (22). Imidazole was alkylated with 1-chloro-2,3-propanediol in the presence of KOH and KI, to give 31 (Scheme 7), which was then quaternized with chloromethylstyrene and ion-exchanged to give the Tf$_2$N salt, 32. Autopolymerization of monomer 32 was a major problem, and several batches were lost, at which point BHT (a radical scavenger) began to be added to the product to curb this problem. It is also worth noting that the yield for this reaction was consistently quite low. Due to these issues, an alternative synthesis that incorporated a different polymerizable group on the RTIL cation was sought to be developed.

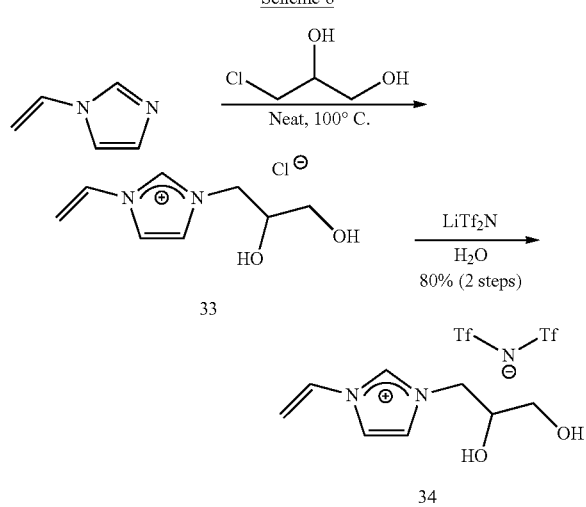

The most logical replacement for the styrene was a vinyl group (34). 1-Vinylimidazole is inexpensive, commercially available, and generally more robust and less prone to autopolymerization. It is also convenient that the polymerizable group is already present on the cation precursor, which streamlines the synthesis by eliminating one of the alkylation steps. Vinylimidazole was alkylated with 1-chloro-2,3-propanediol by stirring the neat (solvent-free) reaction at 100° C. for 2 days to afford 33 (Scheme 8). This reaction can be easily monitored by thin layer chromatography (TLC) because vinylimidazole absorbs UV and is the limiting reagent in the reaction. After all of the starting material was consumed by TLC, the chloride salt product was precipitated from ether and washed several times with organic solvents to remove impurities. Chloride salt 33 was ion exchanged with LiTf$_2$N to give 34 in 80% overall yield.

Not only is this product produced in higher yield and fewer steps than the styrene analog 32, it is much more stable and does not undergo autopolymerization. Monomer 34 can be heated to excess of 150° C., exposed to ambient light and is also less viscous than the styrene monomer, making it much easier to transfer. Small batches (10-30 g) of vinyl monomer 34 could be further purified using dry column vacuum chromatography (DCVC) (Pedersen, D. S.; Synthesis, 2001, 16, 2431-2434), to afford very pure monomer.

Membrane Fabrication

Figure 16:
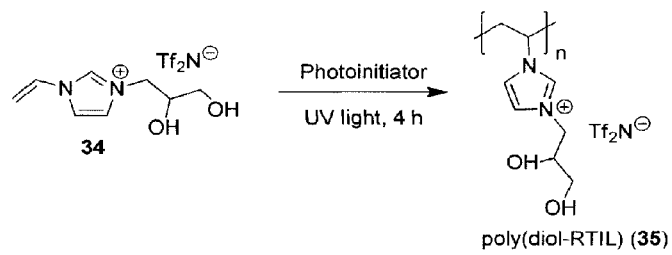
FIG. 16: Structure of a diol-RTIL monomer and the poly(diol-RTIL polymer).

Thin-film poly(diol-RTIL) membranes were prepared using monomer 34 with a commonly used procedure (Bara, J. E. et al. J. Membrane Sci., 2008, 321, 3-7). The resulting films were optically clear and mechanically robust when a cross-linker was employed (FIG. 16 shows the monomer and resulting polymer). Membranes that were used for water transport testing were made using a support material without crosslinker. It was found that crosslinking provided mechanical stability to the membrane but also dramatically reduced its water transport properties (see below). Membranes that were tested for water vapor transport were supported on a polysulfone (Supor®) material to improve mechanical stability. The monomer was mixed with photoinitiator and poured onto the support and pressed between quartz plates and polymerized under UV light. The supported membranes ranged in thickness from 140 to 160 μm (caliper method). A detailed protocol for membrane fabrication follows in the section labeled Supporting Information.

Water Vapor Transport Testing

Many different methods have been used to test water transport, from complex cross-flow systems using a carrier gas to simple human trials in the field. A straight-forward method was chosen whereby the driving force for water vapor transport is a constant relative humidity (RH) differential. A test cell is filled with water and covered with the membrane material to be tested (or left open as a control) and paced in an arid environment (dessicator or glove box). The relative humidity in the cell is high (□90% RH), and water vapor migrates across the membrane into the dry air (1-5% RH).

Initial tests focused on the dessicator method, which worked very well for smaller sample sets. Cells were placed in a dessicator filled with activated DriRite desiccant, and humidity was monitored using an analog humidity gauge. When more than six cells were placed in the dessicator for testing, the relative humidity in the dessicator would increase from less than 5% to over 20%. Because it is a static system, equilibrium is reached when the DrieRite dessicant becomes partially saturated. For larger scale experiments, an alternate method was employed which uses a constant flow of dry N$_2$ gas in a portable glovebox (containing desiccant and a balance) to carry away humid air. It is imperative that relative humidity outside the cells remains constant, since it provides the driving force for the experiment and could lead to discrepancies in water vapor flux through the membrane. Using this glovebox method, humidity remained constant (1% RH) over the course of the experiment, even with 15 test cells present. The glovebox method is advantageous over the dessicator because the cells remain in the test environment for the entire experiment (even during weighing). Detailed procedures for both methods of water vapor transport testing can be found in the supporting information. Flux values, which represent the amount of water vapor moving across a given area of membrane over time, can be easily calculated from this data and used to compare membrane performance.

Several basic experiments were conducted using the dessicator water vapor transport testing method to examine important factors that might affect membrane performance and to determine key structure-property relationships. Data plots from these experiments can be found in the supporting information. The effect of monomer purity on membrane performance was investigated first. Supported membranes were prepared using monomer 34 at various levels of purity (crude, semi-pure and pure) under identical processing conditions and then tested simultaneously. Removal of major impurities by liquid-liquid extraction and stirring with activated charcoal gave a semi-pure membrane that showed 10% higher water vapor flux than the crude material. Further purification of 34 by DCVC, resulted in a film that had 3% higher flux than the semi-crude analog. These differences in flux can be attributed to copolymerization of impurities which disrupt the continuous diol-RTIL network in the polymer, which is responsible for water vapor transport. For this reason, the purest form of monomer 34 was used for all future membrane fabrication. However, the performance difference between the semi-crude and pure product is small (3%), so for large-scale applications the expensive and time-consuming column chromatography purification could be eliminated with minimal effect on membrane transport function.

Because a supported membrane system is being employed, it is important to test the support material without any poly(diol-RTIL) present to ensure that the polymer material, not the support, is facilitating water vapor transport. Unsupported poly(diol-RTIL) films were also prepared to test the opposite effect. When the 100-μm polysulfone (Supor) support was tested using the dessicator method, its flux was 5% lower than that of an open cell in the same data set, while the supported-poly(diol-RTIL) membrane flux was 13% lower than the blank. This shows that the Supor support provides minimal resistance to the movement of water vapor. In a similar test, supported and unsupported poly(diol-RTIL) films showed nearly identical flux values when tested side by side, indicating that the poly(diol-RTIL) is responsible for water vapor transport.

Finally, the effect of polymer cross-linking on membrane performance was examined. Poly(diol-RTIL) films were fabricated under similar conditions with varying amounts of crosslinker (0, 5 and 10 mol %). The membrane that contained 5 mol % cross-linker had 35% lower water vapor flux than the pure poly(diol-RTIL) film. Increasing the cross-linker concentration from 5 to 10 mol % resulted in a 36% decrease in flux. This result is expected because the cross-linker effectively tightens the polymer network in the membrane and subsequently causes an increase in resistance to water vapor permeability.

With a basic understanding of membrane performance and structure-property relationships, the water vapor transport properties of the poly(diol-RTIL) films was tested alongside commercial breathable polymers. Initial tests were conducted using the dessicator method, however due to the large number of test cells and increased amount of water evaporating, the humidity in the dessicator increased over the course of the experiment. This caused the flux values to decrease over time as the humidity increased. To solve this problem, an alternative method was sought which used a carrier gas to sweep away the humid air. A test procedure using a glove box worked well and humidity stayed constant for the entire experiment. The results from this experiment are presented in FIG. 17 and Table 10.

TABLE 10

Water vapor transport results from glovebox test.
Membrane thickness, water uptake after 12.5 h experiment,
flux and thickness-normalized flux to 1 μm.

| Membrane | Thickness (μm) | Water Uptake (wt %) | Flux (kg m$^{-2}$ day$^{-1}$) | Thickness-Normalized Flux (kg m$^{-2}$ · day$^{-1}$ μm) |
|---|---|---|---|---|
| Poly(diol-RTIL) (35) | 152 | 2.6 | 0.937 | 142 |
| Nafion117 | 178 | 4.4 | 1.36 | 243 |
| ePTFE | N/A | −13 | 1.12 | N/A |
| Omniflex ® | N/A | 0 | 1.13 | N/A |
| Blank | N/A | N/A | 1.49 | N/A |

Figure 17:
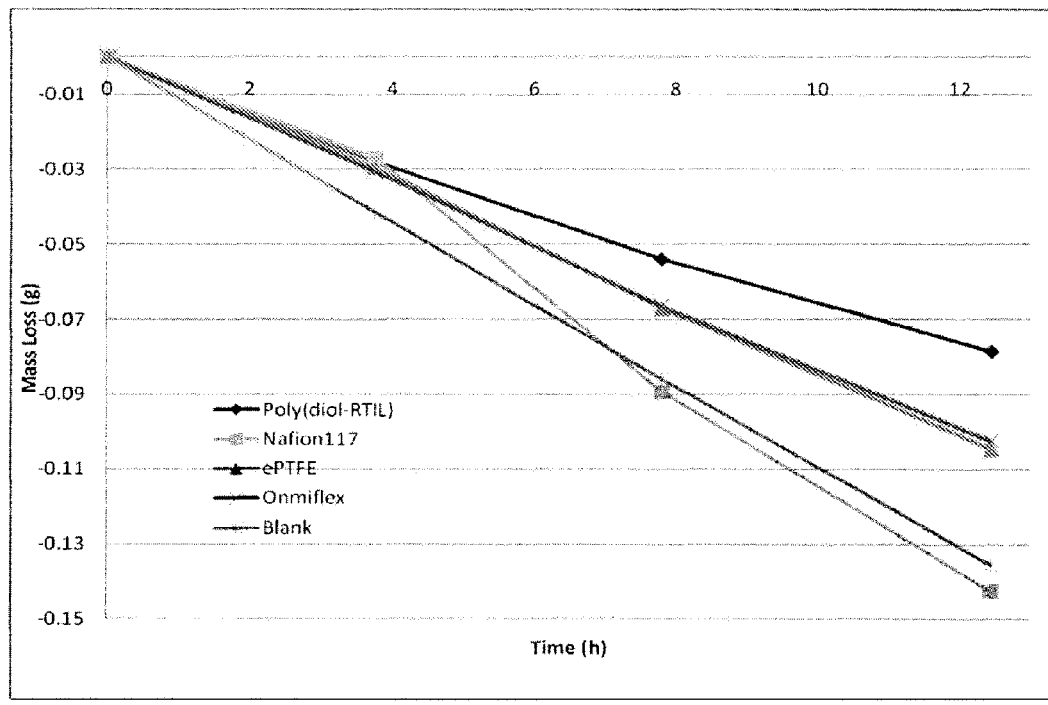
FIG. 17: Representative water vapor transport test plot. Data points are the average of three independent sample runs performed in the same round of testing. This data was obtained using the glovebox test method.

The poly(diol-RTIL) membrane fabricated from DCVC-purified monomer 34 was tested simultaneously with other commercial breathable materials: Nafion-117, porous ePTFE, and Omniflex®, and also compared with an open cell without any membrane present (FIG. 17, Table 10). Nafion-117 is a dense, highly acidic, ionic fluoropolymer produced by DuPont, and is used mainly in fuel cell applications. Porous poly(tetraflouroethylene) (ePTFE) is a polymer that is used to make Gore-Tex®, a well-known commercial material that efficiently transports water vapor. Omniflex® is a porous polyurethane film made by Argotech that is used mainly for recreational outdoor clothing.

As can be seen in FIG. 17 and Table 10, Nafion-117 showed the highest steady state flux of all the membranes under these test conditions. It is worth noting that the Nafion membrane's performance increased dramatically after several hours. Nafion-117 transports water vapor most effectively when the polymer is hydrated, which causes the material to swell and water vapor flux to increase. The membranes were weighed before and after the transport test and Nafion showed the largest average water uptake at 4.4 wt % after 12.5 h, while the poly(diol-RTIL) only absorbed 2.6 wt % water and the flux remained steady. Curiously, the ePTFE membrane lost mass (13 wt %) over the course of the experiment. Often Gore-Tex® and other ePTFE-based materials are coated with a polyurethane material that helps prevent clogging of pores with sweat, dirt and other debris. It is possible that this coating was dissolved by water during testing, resulting in a lower membrane mass.

Both of the porous materials, ePTFE and Omniflex®, performed slightly worse than Nafion-117 under these conditions. The water vapor transport of these materials depends on the number and size of pores in the film and is limited by their maximum density. Because the transport mechanism is quite different from that of a dense film like Nafion or the poly(diol-RTIL), it is difficult to make performance comparisons. These materials were included because they are common commercial materials, but their use is mainly limited to recreational outdoor clothing and accessories.

The poly(diol-RTIL) had lower flux than all of the commercial membranes but is still quite breathable with a flux of nearly 1 kg H$_2$O vapor per square meter of material per day. When the membrane performance is normalized for thickness from 152 μm to 1 μm, the thickness-normalized water vapor flux is over 140 kg m$^{-2}$ day$^{-1}$ μm. This value is orders of magnitude greater than the ideal value of 0.5 kg m$^{-2}$·day$^{-1}$ μm given by Mukhopadhyay et al (J. Ind. Text. 2008, 37, 225-262), so the utility of this material as a breathable film is still viable. Furthermore, the poly(diol-RTIL) films offer several advantages over the commercial breathable membranes. Unlike Nafion, which is also a dense film material, the poly(diol-RTIL) membrane exhibits no "time-lag" to reach peak flux and is also more flexible, making is more amenable to protective clothing applications. The poly(diol-RTIL) material lacks pores, so unlike ePTFE and Omniflex®, its performance cannot be compromised by clogging of the pores. Poly(RTILs) are modular by nature and the monomer can easily be modified through organic synthesis to tune membrane properties. The transport properties can be fine tuned by forming co-polymers or composites with other RTIL-based compounds, which is not possible with these commercial materials.

The mechanism for water vapor transport is thought to involve the diol functionality on the poly(RTIL) cation. A control membrane was prepared using a relatively hydrophobic RTIL monomer ([Hvim][Tf$_2$N], 23, FIG. 14) with an alkyl chain in place of the diol moiety. This membrane had a water vapor flux of 0.081 kg m$^{-2}$·day$^{-1}$, while the poly (diol-RTIL) membrane flux was 1.240 kg m$^{-2}$·day$^{-1}$ under identical conditions. The "traditional" poly(RTIL) shows a low level of water transport which may be attributed to the ionic nature of the polymer, but the flux increases by over 15-fold when the n-hexyl group is replaced with the diol. The proposed transport mechanism relies on hydrogen-bonding between the diol oxygens on the RTIL cation and one of the water molecule's protons. This allows the water to interact favorably with the polymer chain and to be absorbed into the membrane. Once in the polymer matrix, water molecules can shuttle from one diol group to the next, eventually making their way across the membrane.

Conclusions

A novel, water-vapor-breathable, dense thin film material was prepared based on a diol-functionalized, polymerizable RTIL, 34. The basic structure-property relationships of this poly(diol-RTIL) in the form of supported membranes were examined, and it was found that polymer crosslinking decreased membrane performance. Tests were performed to confirm that the diol-RTIL polymer component of the supported membrane is responsible for transporting water. Although the poly(diol-RTIL) films did not perform as well as some commercial high water vapor transport membranes, they offer several advantages to these materials. The poly (diol-RTIL) membranes tested here are relatively thick (~150 μm), so the production of thinner films should lead to enhanced absolute performance. Other RTIL-based monomers inspired by monomer 34 may be prepared with alternate cation substitution and different anions and their membrane morphology studied using a variety of methods to help elucidate the mechanism of water transport. Another focus is poly(RTIL)/RTIL composite materials which showed significant increase in permeability of light gases and may enhance water vapor transport compared to poly(RTILs).

Supporting Information

General Considerations

All reagents were purchased from reputable commercial suppliers (Aldrich, TCI America and 3M) and were used without further purification. Supor® (polysulfone support material) was purchased from Pall, Inc (Ann Arbor, Mich.). UHP grade N$_2$ was used for water transport tests conducted using the glove box method. $^1$H NMR spectra were recorded on a 300 MHz Varian instrument and $^{13}$C NMR were recorded at 75 MHz on the same instrument. NMR spectra are reported in ppm and were referenced to the solvent peak and were processed using MestReNova (v. 5.3.3) software. ESI mass spectra were recorded using the Applied Biosystems QSTAR Hybrid LC/MS/MS System mass spectrometer. A UVP Inc. CL-1000 Ultraviolet Crosslinker was used to conduct polymerization reactions.

Experimental

Monomer Synthesis 1-(2,3-Dihydroxypropyl)-imidazole (31)

Imidazole (3.40 g, 50.0 mmol), pulverized potassium hydroxide (5.61 g, 100 mmol), and potassium iodide (8.30 g, 50.0 mmol) were suspended in CH$_3$CN (100 mL). 3-Chloro-1,2-propanediol (8.29 g, 75.0 mmol) was added, and the mixture was stirred at reflux for 24 h. After cooling to room temperature, additional CH$_3$CN (150 mL) was added to the reaction, which was then filtered through Celite and concentrated. The crude product was then suspended in CH$_2$Cl$_2$ (250 mL), heated to reflux and stirred overnight, and then decanted. The product was still slightly impure by $^1$H NMR, so the CH$_2$Cl$_2$ wash process was repeated once, to afford a white solid (6.82 g, 96%) after drying in vacuo. $^1$H NMR (400 MHz, DMSO) δ 7.54 (t, J=1.0 Hz, 1H), 7.11 (t, J=1.2 Hz, 1H), 6.84 (t, J=1.0 Hz, 1H), 5.08 (s, 1H), 4.83 (s, 1H), 4.05 (dd, J=13.9, 3.6 Hz, 1H), 3.84 (dd, J=14.0, 7.2 Hz, 1H), 3.70-3.58 (m, 1H), 3.31 (dt, J=13.8, 9.0 Hz, 3H), 3.19 (dd, J=11.0, 6.5 Hz, 1H).

1-(2,3-Dihydroxypropyl)-3-(D-styryl)-imidazolium Bis(trifluoromethanesulfonimide) (32)

1-(2,3-Dihydroxypropyl)-imidazole (31, 6.80 g, 48 mmol) was partially dissolved in CH$_3$CN (200 mL) with heating. Chloromethylstyrene (10.2 mL, 72.0 mmol) was added and the reaction was stirred at 65° C. for 20 h. After cooling, the mixture was partially concentrated and poured into Et$_2$O (500 mL), generating a white precipitate. The precipitate was dissolved in H$_2$O (200 mL) and washed with Et$_2$O (2×100 mL), then EtOAc (2×100 mL) and finally CH$_2$Cl$_2$ (2×100 mL). LiTf$_2$N (20.6 g, 72.0 mmol) was added to the water layer, and the mixture was stirred overnight. A separate phase formed, which was extracted into CH$_2$Cl$_2$ (2×150 mL), washed with H$_2$O (5×100 mL), and then dried over MgSO$_4$, filtered and concentrated. A few grains of BHT were mixed into the final product to prevent unwanted radical autopolymerization. The product was an orange oil (3.72 g, 14%). $^1$H NMR (400 MHz, DMSO) δ 9.24 (t, J=1.4 Hz, 1H), 7.78 (t, J=1.8 Hz, 1H), 7.72 (t, J=1.8 Hz, 1H), 7.53 (d, J=8.2 Hz, 2H), 7.40 (d, J=8.2 Hz, 2H), 6.74 (dd, J=17.7, 11.0 Hz, 1H), 5.43 (s, 2H), 5.37 (d, J=5.2 Hz, 1H), 5.30 (dd, J=10.9, 0.8 Hz, 1H), 4.96 (t, J=5.5 Hz, 1H), 4.32 (dd, J=13.8, 3.0 Hz, 1H), 4.10 (dd, J=13.8, 8.0 Hz, 1H), 3.83-3.74 (m, 1H), 3.44 (dt, J=10.3, 5.1 Hz, 1H), 3.30-3.21 (m, 1H).

1-(2,3-Dihydroxypropyl)-3vinylimidazolium Bis(trifluoromethanesulfonimide) (34)

1-Vinylimidazole (47.1 g, 500 mmol) and 1-chloro-2,3-propanediol (126 mL, 1500 mmol) were combined in a flask and heated to 100° C. for 48 h, at which point the reaction was complete by TLC (eluant: 10% CH$_3$OH/EtOAc). After cooling to room temperature, the mixture was poured into Et$_2$O (2.5 L) and stirred vigorously at ambient temperature for 4 h. The product was then scraped from the sides of flask and broken up with spatula. EtOAc (2 L) was then added, and the mixture stirred for 6 hours with periodic gentle heating using a heat gun. The EtOAc was decanted and fresh EtOAc (1.5 L) was added, stirred overnight and decanted.

¹H NMR of the crude chloride salt showed some impurities, so it was dissolved in H$_2$O (500 mL) and washed with CH$_2$Cl$_2$ (4×100 mL) and then EtOAc (6×100 mL). LiTf$_2$N (158 g, 550 mmol) was added to the H$_2$O layer and stirred overnight. A separate layer formed, which was extracted into EtOAc (2×300 mL) and washed with H$_2$O (6×100 mL), dried over MgSO$_4$ and filtered. Activated carbon was added to the EtOAc solution, and the resulting mixture was stirred for 2 days, then filtered through Celite, and finally concentrated to give the product as an orange oil (180 g, 80%). Small batches (20-40 g) were purified using the dry column vacuum chromatography method described by Pedersen and Rosenbohm (Synthesis, 2001, 16, 2431-2434) using gradient elution from 2.5% MeOH/CHCl$_3$ to 20% MeOH/CH$_2$Cl$_2$ to afford quite pure product. The amount of MeOH was increased by 2.5% after each 100 mL fraction of eluent. When 20% MeOH/CHCl$_3$ was reached, the solvent was switched to 20% MeOH/CH$_2$Cl$_2$. ¹H NMR (300 MHz, DMSO) δ 9.42 (t, J=1.5 Hz, 1H), 8.18 (t, J=1.8 Hz, 1H), 7.84 (t, J=1.7 Hz, 1H), 7.33 (dd, J=15.7, 8.8 Hz, 1H), 5.96 (dd, J=15.7, 2.4 Hz, 1H), 5.42 (dd, J=8.8, 2.4 Hz, 2H), 4.97 (s, 1H), 4.34 (dd, J=13.7, 3.0 Hz, 1H), 4.10 (dd, J=13.8, 8.2 Hz, 1H), 3.89-3.69 (m, 1H), 3.61-3.06 (m, 6H). ¹³C NMR (75 MHz, DMSO) δ 135.97, 128.85, 124.20, 119.53 (q, CF$_3$, J=321.8 Hz), 118.58, 108.55, 69.51, 62.76, 52.70. MS: m/z=169.1 (cation, C$_8$H$_{14}$N$_2$O$_2$$^+$). CHN elemental analysis of the compound was attempted but the compounds did not burn cleanly (often observed with RTILs with Tf$_2$N anion), so copies of ¹H and ¹³C NMR spectra of the monomer are included in this supporting information in lieu of elemental analysis for purity.

Supported Membrane Fabrication

Monomer 34 was mixed with photoinitiator (2-hydroxypropiophenone, 2 wt %) using a vortexer and poured onto a 250-mm diameter Supor® (100 μm polysulfone) support material. The monomer on support was then pressed between two quartz plates covered with Rain-X (commercial hydrophobic, anti-stick coating for glass) to prevent sticking. After manually pressing to remove bubbles, the plates were clipped together using binder clips and placed in a UV oven (UVP Inc., CL-1000 Ultraviolet Crosslinker) and polymerized for 4 h at 0.15 J/cm² power setting and flipped halfway through. The membrane was scraped from the plates carefully using a razorblade. The thickness of each membrane was measured using a caliper micrometer. All supported membranes had thicknesses of 140-160 μm. Membranes were stored between Parafilm sheets (to prevent sticking) in plastic bags. Unsupported membranes were prepared in a similar fashion, but with the monomer poured directly onto the Rain-X coated quartz plates.

Water Vapor Transport Testing

Membrane samples were cut using a 25-mm sharpened punch die. The membranes were then placed in a 15-mm I.D. PVC cell made from inexpensive parts available at a hardware store. One end of a plumbing union was plugged using a hollow PVC bolt, while the other end was left open. The membrane was placed in the middle of the union, seated on an o-ring. The union was joined and placed on the bench top. One hand was placed on top on the cell and used to press down firmly, while screwing on the union collar, so as not to torque the membrane. In some experiments, one cell was left blank (i.e. open, without any membrane in place) for use as a control to demonstrate maximum water transport without any sample in the transport path. The same test cell set up was used for all experiments, however two different methods were used for testing water vapor transport.

Desiccator Method

The cells were weighed and then placed in a medium-sized dessicator containing DriRite dessicant (454 g), which was placed in a 120° C. overnight to ensure dryness. The dessicator was sealed and humidity was monitored using an analog hygrometer. The cells were removed from the dessicator and weighed periodically. Intervals of less than 12 hours were avoided to prevent error from opening and closing the dessicator which could cause humidity fluctuations. The mass of water lost from each cell was plotted against time and used to calculate the membrane flux.

This method worked well for sample sets of six or less, however, when more than six cells were placed in the dessicator the relative humidity would gradually increase from less than 5% to over 20% over the course of the experiment. With that much water vapor present in a closed system, the humidity increases until an equilibrium is reached. Humidity fluctuations are detrimental to the experiment because the difference in relative humidity between the inside of the cell and the dessicator are the driving force for the experiment. When larger sample sets were required a glove box with nitrogen flow (to sweep away humid air) was employed. The absolute flux numbers for a sample are different under the dessicator and glove box conditions, but the relative values between samples are consistent.

Glove Box Method

The cells were placed in a portable acrylic glove box connected to a N2 tank maintained at constant output pressure with two-stage pressure regulator connected to the tank. A diffuser tube was made by plugging one end of a foot-long piece of Tygon tubing and poking several holes in the tube. A windscreen was made using glass plates to block the cells from air flow and to prevent air currents from introducing experimental error. A balance and container of DrieRite (dessicant) were placed in the glove box and it was purged for one hour at 10 psi N2. The flow was then turned down to 4 psi and the cells were weighed periodically. The mass of water lost from each cell was plotted against time and used to calculate the membrane flux where $$\text{Flux} = \frac{\text{mass loss}}{(\text{surface area}) \times (\text{time})}.$$

See also LaFrate et al., Ind. Eng. Chem. Res., Article ASAP; DOI: 10.1021/ie100227h, 2010, hereby incorporated by reference.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. Some references provided herein are incorporated by reference to provide details concerning sources of starting materials, additional starting materials, additional reagents, additional methods of synthesis, additional methods of analysis, additional biological materials, additional peptides, chemically modified peptides, additional cells, and additional uses of the invention. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. A composition comprising:
   (a) a polymerized room-temperature ionic liquid (RTIL) comprising a plurality of RTIL-based repeating units of general formula:

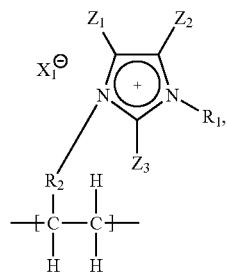

wherein:
   $R_1$ is selected from the group consisting of hydrogen and optionally substituted branched and unbranched alkyl, alkenyl, alkynyl, and aryl groups having 1 to 20 carbon atoms;
   $R_2$ is selected from the group consisting of a bond and optionally substituted branched and unbranched alkylene, alkenylene, alkynylene, and arylene groups having 1 to 12 carbon atoms,
   $X_1$ is an anion,
   $Z_1$, $Z_2$ and $Z_3$ are independently selected from the group consisting of hydrogen and optionally substituted branched and unbranched alkyl, alkenyl, alkynyl, and aryl groups having 1 to 12 carbon atoms, and
   the number of repeating units in the RTIL polymer is from 2 to 100,000; and,
   (b) an unpolymerized RTIL of formula:

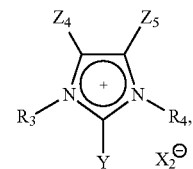

wherein:
   $R_3$ and $R_4$ are independently selected from the group consisting of optionally substituted branched and unbranched alkyl, alkenyl, alkynyl, and aryl groups having 1 to 20 carbon atoms,
   $X_2$ is an anion,
   Y is selected from the group consisting of hydrogen and optionally substituted branched and unbranched alkyl, alkenyl, and alkynyl groups having 1 to 12 carbon atoms,
   $Z_4$ and $Z_5$ are independently selected from the group consisting of hydrogen, and optionally substituted branched and unbranched alkyl, alkenyl, and alkynyl groups having 1 to 12 carbon atoms;
   wherein the unpolymerized RTIL is between 5 mol % to 60 mol % of the total RTIL of the composition, and
   wherein at least one of $R_1$, $R_3$ or $R_4$ is substituted with at least one hydroxyl group.

2. The composition of claim 1, wherein Y, Z, $Z_2$, $Z_3$, $Z_4$, and $Z_5$ are independently selected from the group consisting of hydrogen and optionally substituted branched and unbranched alkyl groups having 1 to 4 carbon atoms.

3. The composition of claim 1, wherein Y is hydrogen or methyl, and $Z_1$, $Z_2$, $Z_3$, Z4, and $Z_5$ are hydrogen.

4. The composition of claim 1, wherein the polymerized RTIL is:

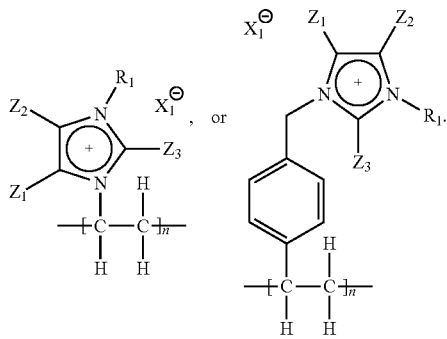

5. The composition of claim 1, wherein $R_1$, $R_3$ and $R_4$ are independently selected from the group consisting of optionally selected branched and unbranched alkyl, alkenyl, alkynyl, and aryl groups having 1 to 10 carbon atoms.

6. The composition of claim 1, wherein $R_1$ is

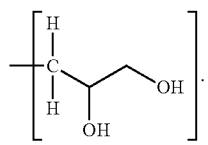

7. The composition of claim 1, wherein the polymerized RTIL comprises:

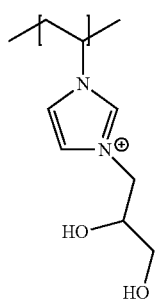

where $X^-$ is an anion selected from the group consisting of a bistrifluoromethylsulfonyl)imide ion ($Tf_2N^-$), a halide ion, a hexafluorophosphate ion ($PF_6^-$), a tetrafluoroborate ion ($BF_4^-$), a dicyanamide ion ($N(CN)_2^-$), a sulfonated ion and a fluorinated sulfonated ion.

8. The composition of claim 1, wherein the unpolymerized RTIL is:

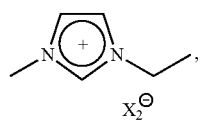

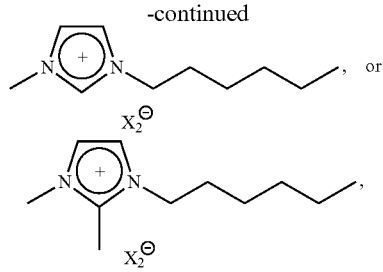

9. The composition of claim 1, wherein between 10 mol % to 35 mol % of the total RTIL of the composition is unpolymerized RTIL.

10. A membrane comprising a first layer and an opposing second layer, the first and second layers each comprising a polymerized RTIL, wherein an unpolymerized RTIL is between the first and second layers,
wherein the polymerized RTIL comprises a plurality of RTIL-based repeating units of general formula:

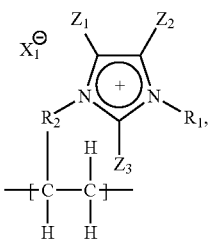

wherein:
$R_1$ is selected from the group consisting of hydrogen and optionally substituted branched and unbranched alkyl, alkenyl, alkynyl, and aryl groups having 1 to 20 carbon atoms;
$R_2$ is selected from the group consisting of a bond and optionally substituted branched and unbranched alkylene, alkenylene, alkynylene, and arylene groups having 1 to 12 carbon atoms,
$X_1$ is an anion,
$Z_1$, $Z_2$ and $Z_3$ are independently selected from the group consisting of hydrogen and optionally substituted branched and unbranched alkyl, alkenyl, alkynyl, and aryl groups having 1 to 12 carbon atoms, and
the number of repeating units in the RTIL polymer is from 2 to 100,000; and
wherein the unpolymerized RTIL is:

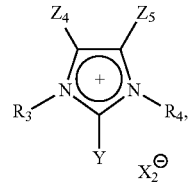

wherein:
$R_3$ and $R_4$ are independently selected from the group consisting of optionally substituted branched and unbranched alkyl, alkenyl, alkynyl, and aryl groups having 1 to 20 carbon atoms,
$X_2$ is an anion, Y is selected from the group consisting of hydrogen and optionally substituted branched and unbranched alkyl, alkenyl, and alkynyl groups having 1 to 12 carbon atoms, $Z_4$ and $Z_5$ are independently selected from the group consisting of hydrogen and optionally substituted branched and unbranched alkyl, alkenyl, and alkynyl groups having 1 to 12 carbon atoms;

wherein the unpolymerized RTIL is between 5 mol % to 60 mol % of the total RTIL comprised in or on the membrane, and wherein at least one of $R_1$, $R_3$ or $R_4$ is substituted with at least one hydroxyl group.

11. The membrane of claim 10, wherein the membrane has a $CO_2$ permeability ranging from 16 to 44 barrers.

12. The membrane of claim 10, wherein the membrane has a carbon dioxide/methane ($CO_2/CH_4$) separation selectivity of 37 or greater.

13. The membrane of claim 10, wherein the membrane has a carbon dioxide/nitrogen ($CO_2/N_2$) separation selectivity of 40 or greater.

14. The membrane of claim 10, wherein the thickness of the membrane ranges from 50 nm to 200 μm.

15. A method for separating a first gas component from a gas mixture comprising at least a first and a second gas component, the method comprising the steps of:
(a) providing a membrane having a feed and a permeate side and being selectively permeable to the first gas component over the second gas component;
(b) applying a feed stream including the first and the second gas components to the feed side of the membrane; and
(c) providing a driving force sufficient for permeation of the first gas component through the membrane, thereby producing a permeate stream enriched in the first gas component from the permeate side of the membrane;
wherein the membrane comprises:
(i) a polymerized room-polymerized ionic liquid (RTIL) comprising a plurality of RTIL-based repeating units of general formula:

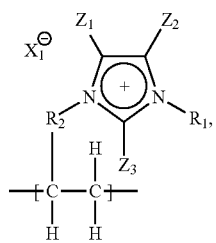

wherein:
$R_1$ is selected from the group consisting of hydrogen and optionally substituted branched and unbranched alkyl, alkenyl, alkynyl, and aryl groups having 1 to 20 carbon atoms;

$R_2$ is selected from the group consisting of a bond and optionally substituted branched and unbranched alkylene, alkenylene, alkynylene, and arylene groups having 1 to 12 carbon atoms, $X_1$ is an anion, $Z_1$, $Z_2$ and $Z_3$ are independently selected from the group consisting of hydrogen and optionally substituted branched and unbranched alkyl, alkenyl, alkynyl, and aryl groups having 1 to 12 carbon atoms, and the number of repeating units in the RTIL polymer is from 2 to 100,000; and (ii) unpolymerized RTIL of formula:

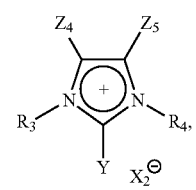

wherein:
$R_3$ and $R_4$ are independently selected from the group consisting of optionally substituted branched and unbranched alkyl, alkenyl, alkynyl, and aryl groups having 1 to 20 carbon atoms, $X_2$ is an anion, Y is selected from the group consisting of hydrogen and optionally substituted branched and unbranched alkyl, alkenyl, and alkynyl groups having 1 to 12 carbon atoms, $Z_4$ and $Z_5$ are independently selected from the group consisting of hydrogen, and optionally substituted branched and unbranched alkyl, alkenyl, and alkynyl groups having 1 to 12 carbon atoms;

wherein the unpolymerized RTIL is between 5 mol % to 60 mol % of the total RTIL of the composition, and wherein at least one of $R_1$, $R_3$ or $R_4$ is substituted with at least one hydroxyl group.

16. The method of claim 15, wherein the first gas component is carbon dioxide ($CO_2$) and the second gas component is methane ($CH_4$).

17. The method of claim 15, wherein the first gas component is carbon dioxide ($CO_2$) and the second gas component is nitrogen gas ($N_2$).

18. The method of claim 15, wherein the thickness of the membrane ranges from 50 nm to 200 μm.

19. The method of claim 15, wherein the membrane has a carbon dioxide/methane separation selectivity of at least 20 or a carbon dioxide/nitrogen gas separation selectivity of at least 32.

* * * * *